US012676753B1

(12) United States Patent
Kaliski, Jr. et al.

(10) Patent No.: US 12,676,753 B1
(45) Date of Patent: Jul. 7, 2026

(54) METHODS AND SYSTEMS FOR GENERATING AND UPDATING MERKLE TREES FOR AN EVOLVING DATA SERIES AND APPLICATIONS THEREOF

(71) Applicant: VeriSign, Inc., Reston, VA (US)

(72) Inventors: Burton S. Kaliski, Jr., McLean, VA (US); Andrew Fregly, Reston, VA (US); Joseph Harvey, Clifton, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 16 days.

(21) Appl. No.: 18/137,966

(22) Filed: Apr. 21, 2023

Related U.S. Application Data

(60) Provisional application No. 63/429,093, filed on Nov. 30, 2022, provisional application No. 63/416,909,
(Continued)

(51) Int. Cl.
H04L 29/06 (2006.01)
H04L 9/32 (2006.01)

(52) U.S. Cl.
CPC .......... H04L 9/3247 (2013.01); H04L 9/3242 (2013.01)

(58) Field of Classification Search
CPC ........................... H04L 9/3247; H04L 9/3242
See application file for complete search history.

(56) References Cited

U.S. PATENT DOCUMENTS 10,009,181 B2    6/2018  Kaliski, Jr. et al.
10,116,450 B1 *  10/2018  Brown ................... H04L 9/3239
(Continued)

FOREIGN PATENT DOCUMENTS

CN        110602239 A  *  12/2019  ............. G06F 21/64
WO    WO-2019093574 A1 *  5/2019  ........... H04L 9/0643

OTHER PUBLICATIONS

Verisign IDF 2021-3508 <https://verisign.lecorpio.com/Runtime/EntityObject.aspx?TypeId=fce3012f-6660-489d-b174-53a05e5bb4d2&ObjectId=40cef332-7da4-41c6-8706-79250ace544a&AddToNavigationHistory=true&DashboardID=9bbc9031-4583-45fe-9c88-5757f1cde6bf>, Flattened Signatures Extension to Synthesized Zone-Signing Keys Approach.
(Continued)

*Primary Examiner* — Tri M Tran

(74) *Attorney, Agent, or Firm* — Lee & Hayes, P.C.

(57) ABSTRACT

A computer-implemented method for authenticating messages relative to a hash-based data authentication structure includes producing a first signed data structure that includes one or more node hash values from the hash-based data authentication structure. The node hash values are selected according to a selected strategy and configured to authenticate messages relative to the hash-based data structure. The method further includes producing a second signed data structure that is a modified version of the first signed data structure. The method further includes enabling a signed data structure provider to provide to a verifier the first signed data structure and the second signed data structure. The method further includes enabling an authentication path provider to provide to the verifier an authentication path formed relative to the first signed data structure or the second signed data structure. The verifier determines whether to use the first signed data structure and performs a verification procedure.

18 Claims, 24 Drawing Sheets

Related U.S. Application Data filed on Oct. 17, 2022, provisional application No. 63/406,699, filed on Sep. 14, 2022, provisional application No. 63/356,973, filed on Jun. 29, 2022.

(56) References Cited

U.S. PATENT DOCUMENTS

| | | | |
|---|---|---|---|
| 10,153,905 | B2 | 12/2018 | Kaliski, Jr. |
| 11,025,407 | B2 * | 6/2021 | Kaliski, Jr. .............. H04L 9/50 |
| 2013/0055369 | A1 | 2/2013 | Kumar et al. |
| 2014/0181984 | A1 | 6/2014 | Kundu et al. |
| 2017/0272250 | A1 | 9/2017 | Kaliski, Jr. |
| 2018/0159689 | A1 | 6/2018 | Keuffer et al. |
| 2020/0364911 | A1 | 11/2020 | Benzakour et al. |
| 2021/0184864 | A1 | 6/2021 | Wentz et al. |
| 2024/0380856 | A1 | 11/2024 | Dmitrii et al. |

OTHER PUBLICATIONS

B. Kaliski, Securing the DNS in a Post-Quantum World: Hash-Based Signatures and Synthesized Zone Signing Keys, Jan. 2021, https://blog.verisign.com/security/securing-the-dns-in-a-post-quantum-world-hash-based-signatures-and-synthesized-zone-signing-keys/.

R. C. Merkle, "A Digital Signature Based on a Conventional Encryption Function", Advances in Cryptology—CRYPTO '87. Lecture Notes in Computer Science. vol. 293, doi:10.1007/3-540-48184-2_32, ISBN 978-3-540-18796-7.

M. Müller et al., Retrofitting Post-Quantum Cryptography in Internet Protocols: A Case Study of DNSSEC <https://dl.acm.org/doi/10.1145/3431832.3431838>, ACM SIGCOMM CCR, 2020.

M. Müller, Making DNSSEC Future Proof <https://research.utwente.nl/en/publications/making-dnssec-future-proof>, Ph.D. Thesis, U. Twente, 2021.

P. Hoffman, Quantum Computing and the DNS <https://www.icann.org/en/system/files/files/octo-031-11feb22-en.pdf>, ICANN OCTO-031, 2022.

G.J. Beernink, Taking the Quantum Leap: Preparing DNSSEC for Post Quantum Cryptography <http://essay.utwente.nl/89509/1/Beernink_MA_EEMCS.pdf>, M.Sc. Thesis, U. Twente, 2022.

S. Jafarli, Providing DNS Security in Post-Quantum Era with Hash-Based Signatures <http://essay.utwente.nl/89552/>, M.Sc. Thesis, U. Twente, 2022.

A. Fregly and R. van Rijswijk-Deij, Stateful Hash-Based Signatures for DNSSEC <https://datatracker.ietf.org/doc/draft-afrvrd-dnsop-stateful-hbs-for-dnssec/>, Internet-Draft, 2022.

J. Jansen, Use of SHA-2 Algorithms with RSA in DNSKEY and RRSIG Resource Records for DNSSEC <https://www.rfc-editor.org/info/rfc5702>, RFC 5702, Oct. 2009.

P. Hoffman and W.C.A. Wijngaards, Elliptic Curve Digital Signature Algorithm (DSA) for DNSSEC <https://www.rfc-editor.org/info/rfc6605>, RFC 6605, Apr. 2012.

O. Sury and R. Edmonds, Edwards-Curve Digital Security Algorithm ( <https://www.rfc-editor.org/info/rfc8080>EdDSA <https://www.rfc-editor.org/info/rfc8080>) for DNSSEC <https://www.rfc-editor.org/info/rfc8080>, RFC 8080, Feb. 2017.

A. Huelsing et al., XMSS: <https://www.rfc-editor.org/info/rfc8391>eXtended <https://www.rfc-editor.org/info/rfc8391>Merkle Signature Scheme <https://www.rfc-editor.org/info/rfc8391>, RFC 8391, May 2018.

D. McGrew, M. Curcio and S. Fluhrer. Leighton—<https://www.rfc-editor.org/info/rfc8554>Micali <https://www.rfc-editor.org/info/rfc8554> Hash-Based Signatures <https://www.rfc-editor.org/info/rfc8554>. RFC 8554, Apr. 2019.

P. Wouters and O. Sury, Algorithm Implementation Requirements and Usage Guidance for DNSSEC <https://www.rfc-editor.org/info/rfc8624>, RFC 8624, Jun. 2019.

F. Li et al,. Proof-Infused Streams: Enabling Authentication of Sliding Window Queries on Streams <http://hadjieleftheriou.com/papers/vldb07.pdf>, VLDB 2007, Sep. 2007.

C. Papamanthou et al., Streaming Authenticated Data Structures <https://link.springer.com/content/pdf/10.1007/978-3-642-38348-9_22.pdf>, Eurocrypt 2013, May 2013.

L. Reyzin and S. Yakoubov, Efficient Asynchronous Accumulators for Distributed PKI <https://link.springer.com/chapter/10.1007/978-3-319-44618-9_16>, SCN 2016, Aug. 2016. ('authors version <https://eprint.iacr.org/2015/718.pdf>).

U.S. Appl. No. 17/827,576, filed May 27, 2022.

Arends, R., Austein, R., Larson, M., Massey, D., Rose, S.: DNS Security Introduction and Requirements. IETF (2005). https://doi.org/10.17487/RFC4033.

Attrapadung, N., Libert, B., Peters, T.: Computing on authenticated data: New privacy definitions and constructions. In: Wang, X., Sako, K. (eds) Advances in Cryptology—ASIACRYPT 2012, LNCS, vol. 7658, pp. 367-385. Springer, Berlin, Heidelberg (2012). https://doi.org/10.1007/978-3-642-34961-4_23.

Baldimtsi, F., Chalkias, K., Chatzigiannis, P., Kelkar, M.: Truncator: Time-space Tradeoff of Cryptographic Primitives, In: Cryptology ePrint Archive, Paper 2022/1581, https://eprint.iacr.org/2022/1581, last accessed Nov. 18, 2022.

Barker, W., Polk, W., Souppaya, M.: Getting Ready for Post-Quantum Cryptography: Exploring Challenges Associated with Adopting and Using Post-Quantum Cryptographic Algorithms, NIST Cybersecurity White Paper, Apr. 28, 2021. https://doi.org/10.6028/NIST.CSWP.04282021.

Boneh, D., Gentry, C., Lynn, B., Shacham, H.: Aggregate and verifiably encrypted signatures from bilinear maps. In: Biham, E. (ed.) Advances in Cryptology—EUROCRYPT 2003, LNCS, vol. 2656, pp. 416-432. Springer, Berlin, Heidelberg (2003). https://doi.org/10.1007/3-540-39200-9_26.

Bünz, B., Kiffer, L., Luu, L., Zamani, M.: FlyClient: Super-light clients for cryptocurrencies. In: 2020 IEEE Symposium on Security and Privacy (SP), pp. 928-946. IEEE (2020), https://doi.org/10.1109/SP40000.2020.00049.

Champine, L.: Streaming Merkle Proofs within Binary Numeral Trees. In: Cryptology ePrint Archive, Paper 2021/038. https://eprint.iacr.org/2021/038, last accessed Oct. 18, 2022.

Chase, M., Kohlweiss, M., Lysyanskaya, A., Meiklejohn, S.: Malleable signatures: New definitions and delegatable anonymous credentials. In 2014 IEEE 27th Computer Security Foundations Symposium, pp. 199-213. IEEE (2014). https://doi.org/10.1109/CSF.2014.22.

Cooper, D., Santesson, S., Farrell, S., Boeyen, S., Housley, R., Polk, W.: RFC 5280, Internet X.509 Public Key Infrastructure Certificate and Certificate Revocation List (CRL) Profile. IETF (2008). https://doi.org/10.17487/RFC5280.

Crosby, S., Wallach, D.: Efficient data structures for tamper-evident logging. In Proceedings of the 18th USENIX Security Symposium, pp. 317-334. USENIX Association (2009). https://dl.acm.org/doi/abs/10.5555/1855768.1855788.

Decker, C., Wattenhofer, R.: Bitcoin transaction malleability and MtGox. In: Kuty?owski, M., Vaidya, J. (eds.) Computer Security—ESORICS 2014, LNCS, vol. 8173, pp. 313-326. Springer, Cham (2014). https://doi.org/10.1007/978-3-319-11212-1_18.

Draft Call for Additional Digital Signature Schemes for the Post-Quantum Cryptography Standardization Process, NIST, https://csrc.nist.gov/csrc/media/Projects/pqc-dig-sig/documents/call-for-proposals-dig-sig-sept-2022.pdf, last accessed Oct. 18, 2022.

Driscoll, F.: Terminology for Post-Quantum Traditional Hybrid Schemes,. https://datatracker.ietf.org/doc/draft-driscoll-pqt-hybrid-terminology, last accessed Oct. 18, 2022. Work in progress.

Goyal, R., Vaikuntanathan, V.: Locally Verifiable Signature and Key Aggregation, In: Cryptology ePrint Archive, Paper 2022/179, https://eprint.iacr.org/2022/179, last accessed Oct. 18, 2022. To appear, Advances in Cryptology—CRYPTO 2022.

Hollenbeck, S., "Federated Authentication for the Registration Data Access Protocol (RDAP) using OpenID Connect", Work in Progress, Internet-Draft, draft-ietf-regext-rdap-openid-12, Mar. 2022, https://datatracker.ietf.org/doc/html/draft-ietf-regext-rdap-openid.

Huelsing, A., D. Butin, S. Gazdag et al. XMSS: extended Merkle Signature Scheme. IETF RFC 8391, DOI 10.17487/RFC8391 , May 2018. https://www.rfc-editor.org/info/rfc8391.

(56) References Cited

OTHER PUBLICATIONS

Hülsing, A., Rijneveld, J., Song, F.: Mitigating multi-target attacks in hash-based signatures. In: Cheng, CM., Chung, KM., Persiano, G., Yang, BY. (eds) Public-Key Cryptography—PKC 2016, LNCS, vol. 9614, pp. 387-416. Springer, Berlin, Heidelberg, 2016. https://doi.org/10.1007/978-3-662-49384-7_15.

Khaburzaniya, I., Konstantinos, C., Lewi, K., Malval, H.: Aggregating and thresholdizing hash-based signatures using STARKs. In: Proceedings of the 2022 ACM on Asia Conference on Computer and Communications Security, pp. 393-407. ACM, New York (2022). https://doi.org/10.1145/3488932.3524128.

Kudinov, M., Ronen, Hülsing, A., E. Yogev, E., SPHINCS+C: Compressing SPHINCS+ With (Almost) No Cost, In: Cryptology ePrint Archive, Paper 2022/778, https://eprint.iacr.org/2022/778, last accessed Nov. 18, 2022.

Migration to Post-Quantum Cryptography. NIST National Cybersecurity Center of Excellence. https://www.nccoe.nist.gov/crypto-agility-considerations-migrating-post-quantum-cryptographic-algorithms. Accessed Oct. 11, 2022.

National Security Agency. Announcing the Commercial National Security Algorithm Suite 2.0. Sep. 2022. https://media.defense.gov/2022/Sep/07/2003071834/-1/-1/0/CSA_CNSA_2.0_ALGORITHMS_.PDF. Accessed Oct. 11, 2022.

Papamanthou, C., Shi, E., Tamassia, R., Yi, K.: Streaming authenticated data structures. In: Johansson, T., Nguyen, P.Q. (eds.) Advances in Cryptology—EUROCRYPT 2013, LNCS, vol. 7881, pp. 353-370. Springer, Berlin, Heidelberg (2013). https://doi.org/10.1007/978-3-642-38348-9_22.

Post-Quantum Cryptography Standardization. NIST. https://csrc.nist.gov/projects/post-quantum-cryptography/post-quantum-cryptography-standardization. Accessed Oct. 11, 2022.

Reyzin, L., Yakoubov, S.: Efficient asynchronous accumulators for distributed PKI. In: Zikas, V., De Prisco, R. (eds) Security and Cryptography for Networks, SCN 2016, LNCS, vol. 9841, pp. 292-309. Springer, Cham, 2016. https://doi.org/10.1007/978-3-319-44618-9_16.

Sloane, N.J.A., Wilks, A.: a(n)=a(floor(n/2))+n; also denominators in expansion of 1/sqrt(1-x) are 2a(n); also 2n—number of 1's in binary expansion of 2n. In: The On-Line Encyclopedia of Integer Sequences, Entry A005187, https://oeis.org/A005187, last accessed Oct. 18, 2022.

Sloane, N.J.A.: The ruler function: 2a(n) divides 2n. Or, a(n)=2-adic valuation of 2n. in: The On-Line Encyclopedia of Integer Sequences, Entry A001511, https://oeis.org/A001511, last accessed Oct. 18, 2022.

Todd, P.: Merkle Mountain Ranges, https://github.com/opentimestamps/opentimestamps-server/blob/master/doc/merkle-mountain-range.md, last accessed Oct. 18, 2022.

Wouters, P. and O. Sury. Algorithm Implementation Requirements and Usage Guidance for DNSSEC. IETF RFC 8624, DOI 10.17487/RFC8624, Jun. 2019. https://www.rfc-editor.org/info/rfc8624.

U.S. Appl. No. 18/137,992, filed Apr. 21, 2023.

U.S. Appl. No. 18/219,522, filed Jul. 7, 2023.

Bradner, S., et al., Intellectual Propery Rights in IETF Technology:, BCP 79, RFC 8179, DOI 10.17487/RFC8179, May 2017, https://www.rfc-editor.org/info/rfc8179.

Eastlake, D., et al., "Randonmess Requirements for Security," BCP 106, RFC 4086, DOI 10.17487/RFC4086, https://www.rfc-editor.org/info/rfc4086.

Leiba, B., "Ambuigity of Uppercase vs Lowercase in RFC 2119 Key Words," BCP 14, RFC 8174, DOI 10.17487/RFC8174, May 2017, https://www.rfc-editor/og/info/rfc 8174.

"L. Reyzin and S. Yakoubov, Efficient Asynchronous Accumulators for Distributed PK<https://link.springer.com/chapter/10.1007/978-3-319-44618-9_16>, SCN 2016, Aug. 2016. ('authors version <https://eprint.iacr.org/2015/718.pdf>)".

Li, F., Yi, K., Hadjieleftheriou, M., Kollios, G.: Proof-infused streams: Enabling authentication of sliding window queries on streams. In: Proceedings of the 33rd International Conference on Very Large Data Bases, pp. 147-158. VLDB Endowment (2007). https://dl.acm.org/doi/10.5555/1325851.1325871.

McGrew, D., M. Curcio and S. Fluhrer. Leighton-Micali Hash-Based Signatures. IETF RFC 8554, DOI 10.17487/RFC8554, Apr. 2019. https://www.rfc-editor.org/info/rfc8554.

Merkle, R. Secrecy, Authentication, and Public Key Systems. Ph.D. thesis, Stanford University, 1979.

Hülsing, A., J. Rijneveld and F. Song. Mitigating multi-target attacks in hash-based signatures. In Public-Key Cryptography—PKC 2016, LNCS, vol. 9614, pp. 387-416. Springer, 2016. https://doi.org/10.1007/978-3-662-49384-7_15.

Huque, S., Shulman, H., Kerr, S., "Algorithm Negotiation in DNSSEC", Jul. 2018, pp. 1-17 https://datatracker.ietf.org/doc/draft-huque-dnssec-algnego/03/.

ICANN, "Registrar Data Escrow Specifications", Nov. 2007, pp. 1-8 https://www.icann.org/en/system/files/files/rde-specs-09nov07-en.pdf.

IETF, Charter "Post-Quantum Use in Protocols (pquip)", IETF, Jan. 2023, https://datatracker.ietf.org/doc/charter-ietf-pquip/.

IETF, Charter "Post-Quantum Use in Protocols (pquip)", IETF, Jan. 2023, https://datatracker.ietf.org/wg/pquip/about/.

Kaliski, B., "Preparing for Post-Quantum: Securing Internet Infrastructure for the Long Term", Cloudfest Mar. 22, 2023, pp. 1-13.

Kaliski, B., "Preparing for Post-Quantum: The DNSSEC Case", 6th International Symposium on Cyber Security, Cryptology and Machine Learning (CSCML 2022), Jun. 30-Jul. 1, 2022, pp. 1-43.

Kaliski, B., "Merkle Tree Ladder Mode: Reducing the Size Impact of NIST PQC Signature Algorithms in Practice", NIST Fourth PQC Standardization Conference, Dec. 2022, pp. 1-32 https://csrc.nist.gov/Presentations/2022/merkle-tree-ladder-mode.

Kaliski, B., Fregly, A., Harvey, J., Sheth, S., "Merkle Tree Ladder Mode: Reducing the Size Impact of NIST PQC Signature Algorithms in Practice", Video courtesy of RSA Conference, Apr. 2023, pp. 1-38.

Katz, J.: Analysis of a Proposed Hash-Based Signature Standard. In: Chen, L., McGrew, D., Mitchell, C. (eds) Security Standardisation Research. SSR 2016. LNCS, vol. 10074. Springer, Cham (2016). https://doi.org/10.1007/978-3-319-49100-4_12.

Khaburzaniya, I., Chalkias, K., Lewi, K., Malvai, H.: Aggregating and thresholdizing hash-based signatures using STARKs. In: Proceedings of the 2022 ACM on Asia Conference on Computer and Communications Security, pp. 393-407. ACM, New York (2022). https://doi.org/10.1145/3488932.3524128.

Kolbl, S., Lauridsen, L., Mendel, F., Rechberger, C., Efficient Short-Input Hashing for Post-Quantum Applications, in IACR Transactions on Symmetric Cryptology vol. 2016, No. 2, pp. 1-29, DOI 10.13154/tosc.v2016.i2.1-29, 2017.

Kuszmaul, J.: Verkle Trees, https://math.mit.edu/research/highschool/primes/materials/2018/Kuszmaul.pdf, last accessed Oct. 18, 2022.

Laurie, B., E. Messeri and R. Stradling. Certificate Transparency Version 2.0. IETF RFC 9162, DOI 10.17487/RFC9162, Dec. 2021. https://www.rfc-editor.org/info/rfc9162.

Lozano, G., ICANN, "Registry Data Escrow Specification", Nov. 2020, https://datatracker/ietf.org/doc/html/rfc8909.

Merkle, R.: Secrecy, Authentication, and Public Key Systems. Ph.D. thesis, Stanford University (1979). http://www.ralphmerkle.com/papers/Thesis1979.pdf, last accessed Feb. 13, 2023.

Migration to Post-Quantum Cryptography. NIST National Cybersecurity Center of Excellence. https://www.nccoe.nist.gov/crypto-agility-considerations-migrating-post-quantum-cryptographic-algorithms, last accessed Feb. 16, 2023.

Mockapetris, P.: RFC 1034, Domain Names—Concepts and Facilities. IETF (1987). https://doi.org/10.17487/RFC1034.

Moody, D., "NIST Status Update on the 3rd Round", "NIST 3rd PQC Standardization Conference", Jun. 2021, https://csrc.nist.gov/CSRC/media/Presentations/status-update-on-the-3rd-round/images-media/session-1-moody-nist-round-3-update.pdf.

Moody, D., "The Beginning to the End: The First NIST PQC Standards", PKC 2022, Mar. 8-11, 2022, Mar. 8, 2022, https://csrc.nist.gov/csrc/media/Presentations/2022/the-beginning-of-the-end-the-first-nist-pqc-standa/images-media/pkc2022-march2022-moody.pdf.

(56) References Cited

OTHER PUBLICATIONS

Moriarty, K., B. Kaliski, J. Jonsson et al. PKCS #1: RSA Cryptography Specifications Version 2.2. IETF RFC 8017, DOI 10.17487/RFC8017, Nov. 2016. https://www.rfc-editor.org/info/rfc8017.

Mosca, M., Piani, M., "Quantum Threat Timeline Report 2020," https://globalriskinstitute.org/download/quantum-threat-timeline-report-2020/.

Mosca, M., Piani, M., "Quantum Threat Timeline Report 2022", Global Risk Institute, Dec. 2022, https://globalriskinstitute.org/mp-files/2022-quantum-threat-timeline-report-dec.pdf/.https://globalriskinstitute.org/mp-files/2022-quantum-threat-timeline-report-dec.pdf/.

National Institute of Standards and Technology (NIST), "SP 800-131A Transitioning the Use of Cryptographic Algorithms and Key Lengths", Mar. 2019, https://nvlpubs.nist.gov/nistpubs/SpecialPublications/NIST.SP.800-131Ar2.pdf.

National Security Agency. Announcing the Commercial National Security Algorithm Suite 2.0. Sep. 2022, pp. 1-10. https://media.defense.gov/2022/Sep/07/2003071834/-1/-1/0/CSA_CNSA_2.0_ALGORITHMS_.PDF, last accessed Feb. 13, 2023.

NIST (National Institute of Standards and Technology), "SP 800-57 Recommendation for Key Management: Part 1—General", Oct. 2020, https://nvlpubs.nist.gov/nistpubs/SpecialPublications/NIST.SP.800-57pt1r5.pdf.

NIST CSRC, "PQC Standardization Process: Announcing Four Candidates to be Standardized, Plus Fourth Round Candidates", NIST, Jul. 5, 2022, https://csrc.nist.gov/news/2022/pqc-candidates-to-be-standardized-and-round-4.

Orman, H., Internet Security and Quantum Computing, Dec. 2021, https://eprint/iacr.org/2021/1637.pdf.

Peikert, C., Pepin, Z., Sharp, C.: Vector and functional commitments from lattices. In: Nissim, K., Waters, B. (eds.) Theory of Cryptography, TCC 2021, LNCS, vol. 13044, pp. 480-511. Springer, Cham (2021). https://doi.org/10.1007/978-3-030-90456-2_16.

Post-Quantum Cryptography Standardization. NIST. https://csrc.nist.gov/projects/post-quantum-cryptography/post-quantum-cryptography-standardization. Accessed Sep. 12, 2022.

Rescorla, D., "The Transport Layer Security Protocol Version 1.3", RFC 8446, DOI 10.17487/RFC8446, Aug. 2018, https://www.rfc-editor.org/rfc8446.

RFC 4523—The Secure Shell (SSH) Transport Layer Protocol.

RFC 5734—Extensible Provisioning Protocol (EPP) Transport over TCP.

RFC 6698—The DNS-Based Authentication of Named Entities (DANE) Transport Layer Security (TLS) Protocol.

RFC 6781—DNSSEC Operational Practices, Version 2. IETF.

RFC 7481—Security Services for the Registration Data Access Protocol (RDAP).

RFC 7525—Recommendations for Secure Use of Transport Layer Security (TLS) and Datagram Transport Layer Security (DTLS).

RFC 8162—Using Secure DNS to Associate Certificates with Domain Names for S/MIME.

RFC 8247—Algorithm Implementation Requirements and Usage Guidance for the Internet Key Exchange Protocol Version 2 (IKEv2).

RFC 8301—Cryptographic Algorithm and Key Usage Update to DomainKeys Identified Mail (DKIM).

RFC 8310—Usage Profiles for DNS over TLS and DNS over DTLS.

RFC 8332—Use of RSA Keys with SHA-256 and SHA-512 in the Secure Shell (SSH) Protocol.

Fregly, Andrew, Projecting Impact of Post Quantum Cryptography on Registry Operations, ROW11—Jun. 21, 2022.

Fregly, Andrew, Projecting Impact of Post-Quantum Cryptography on Registry Operations, CENTR Workshop, May 31, 2023.

Schwabe, P., D. Stebila and T. Wiggers. Post-quantum TLS without handshake signatures. In Proceedings of the 2020 ACM SIGSAC Conference on Computer and Communications Security, pp. 1461-1480. ACM, 2020. https://dl.acm.org/doi/abs/10.1145/3372297.3423350.

Shor, P.W., "Polynomial time algorithms for prime factorization and discrete logarithms on a quantum computer," SIAM Review 41.2 (1999): 303-332.

Sikeridis, D., Huntley, S., Ott, D., Devetsikiotis, M.: Intermediate certificate suppression in post-quantum TLS: An approximate membership querying approach, In: CoNEXT '22: Proceedings of the 18th International Conference on Emerging Networking Experiments and Technologies, pp. 35-42. ACM (2022). https://dl.acm.org/doi/abs/10.1145/3555050.3569127.

Sikeridis, D., Kampanakis, P., Devetsikiotis, M.: Post-quantum authentication in TLS 1.3: a performance study. In: Network and Distributed Systems Security (NDSS) Symposium 2020, The Internet Society (2020). https://dx.doi.org/10.14722/ndss.2020.24203.

Sloane, N.J.A. The ruler function: 2a(n) divides 2n. Or, a(n)=2-adic valuation of 2n. Entry A001511 in the On-Line Encyclopedia of Integer Sequences. https://oeis.org/A001511. Accessed Oct. 11, 2022.

David Benjamin, "Batch Signing for TLS," Internet-Draft, Jul. 29, 2019, https://datatracker.ietf.org/doc/draft-davidben-tls-batch-signing/00/.

David Benjamin, "Batch Signing for TLS," Internet-Draft, Sep. 13, 2019, https://datatracker.ietf.org/doc/draft-davidben-tls-batch-signing/01/.

David Benjamin, "Batch Signing for TLS," Internet-Draft, Nov. 1, 2019, https://datatracker.ietf.org/doc/draft-davidben-tls-batch-signing/02/.

David Benjamin, "Batch Signing for TLS," Internet-Draft, Jan. 13, 2020, https://datatracker.ietf.org/doc/draft-ietf-tis-batch-signing/00/.

Diana Berbecaru, "MBS-OCSP: An OCSP based certificate revocation system for wireless environments," IEEE, 2004, pp. 267-272.

Abe, M., Chase, M., David B., et al. Constant-size structure-preserving signatures: Generic constructions and simple assumptions. Journal of Cryptology 29(4):833-878. Springer, 2016. https://doi.org/10.1007/s00145-015-9211-7.

Ahn, J.H., Boneh, D., Camenisch, J., Hohenberger, S., Shelat, A., and Waters, B., Computing on authenticated data. Journal of Cryptology 28(2), 351-395. Springer, 2015. https://doi.org/10.1007/s00145-014-9182-0.

Alagic, G., Apon, D., Cooper D., et al. NIST IR 8413-upd1: Status Report on the Third Round of the NIST Post-Quantum Cryptography Standardization Process. NIST, Jul. 2022; includes updates as of Sep. 26, 2022. https://doi.org/10.6028/NIST.IR.8413-upd1.

Arends, R., Austein, R., Larson, M., Massey, D., Rose, S., "DNS Security Introduction and Requirements", RFC 4033, DOI 10.17487/RFC4033, Mar. 2005, pp. 1-21, https://www.rfc-editor.org/info/rfc4033.

Attrapadung, N., B. Libert and T. Peters. Computing on authenticated data: New privacy definitions and constructions. In Advances in Cryptology—ASIACRYPT 2012, LNCS, vol. 7658, pp. 367-385. Springer, 2012. https://doi.org/10.1007/978-3-642-34961-4_23.

Aumasson, J.-P., D.J. Bernstein, W. Beullens, et al. SPHINCS+ Submission to the NIST post-quantum project, v.3.1. Jun. 10, 2022. https://sphincs.org/data/sphincs+-r3.1-specification.pdf. Accessed Oct. 11, 2022.

Bai, S., L. Ducas, E. Kiltz, et al. CRYSTALS-Dilithium Algorithm Specifications and Supporting Documentation (Version 3.1). Feb. 8, 2021. https://pq-crystals.org/dilithium/data/dilithium-specification-round3-20210208.pdf. Accessed Oct. 11, 2022.

Barker, W., W. Polk and M. Souppaya. Getting Ready for Post-Quantum Cryptography: Exploring Challenges Associated with Adopting and Using Post-Quantum Cryptographic Algorithms. NIST Cybersecurity White Paper, Apr. 28, 2021. https://doi.org/10.6028/NIST.CSWP.04282021.

Benaloh, J. and M. de Mare. One-way accumulators: A decentralized alternative to digital signatures. In Advances in Cryptology—EUROCRYPT '93, LNCS, vol. 765, pp. 274-285. Springer, 1993. https://doi.org/10.1007/3-540-48285-7_24.

Ben-Sasson, E., Bentov, I., Horesh, Y., Riabzev, M.: Scalable, Transparent, and Post-Quantum Secure Computational Integrity. In: Cryptology ePrint Archive, Paper 2018/046, https://eprint.iacr.org/2018/046, last accessed Oct. 18, 2022.

(56)         References Cited

OTHER PUBLICATIONS

Black, Paul E., "Quantum Computation," in Paul E. Black (ed.), Dictionary of Algorithms and Data Structures, Dec. 17, 2007, https://www.nist.gov/dads/HTML/quantumComputation.html, last accessed Feb. 16, 2023.
Boneh, D., C. Gentry, B. Lynn and H. Shacham. Aggregate and verifiably encrypted signatures from bilinear maps. In Advances in Cryptology—EUROCRYPT 2003, pp. 416-432. Springer, 2003. https://doi.org/10.1007/3-540-39200-9_26.
Bos, J.W., Hülsing, A., Renes, J., van Vredendaal, C.: Rapidly Verifiable XMSS Signatures, Cryptology ePrint Archive, Paper 2020/898, https://eprint.iacr.org/2020/898, last accessed Feb. 13, 2023.
Bünz, B., L. Kiffer, L. Luu and M. Zamani. FlyClient: Super-light clients for cryptocurrencies. In 2020 IEEE Symposium on Security and Privacy (SP), pp. 928-946. IEEE, 2020. https://doi.org/10.1109/SP40000.2020.00049.
Buterik, V.: Verkle Trees, https://vitalik.ca/general/2021/06/18/verkle.html, last accessed Oct. 18, 2022.
Catalano, D., Fiore, D.: Vector commitments and their applications. In: Kurosawa, K., Hanaoka, G. (eds.) Public-Key Cryptography—PKC 2013, LNCS, vol. 7778, pp. 55-72. Springer, Berlin, Heidelberg (2013). https://doi.org/10.1007/978-3-642-36362-7_5.
Champine, L. Streaming Merkle Proofs within Binary Numeral Trees. Cryptology ePrint Archive, Paper 2021/038. 2021. https://eprint.iacr.org/2021/038.
Chase, M., Kohlweiss, M., Lysyanskaya, A., and Meiklejohn, S., Malleable signatures: New definitions and delegatable anonymous credentials. In 2014 IEEE 27th Computer Security Foundations Symposium, pp. 199-213. IEEE, 2014. https://doi.org/10.1109/CSF.2014.22.
Cooper, D., Santesson, S., Farrell, S., Boeyen, S., Housley, R., Polk, W.: RFC 5280, "Internet X.509 Public Key Infrastructure Certificate and Certificate Revocation List (CRL) Profile", RFC 5280, DOI 10.17487/RFC5280, May 2008. https://www.rfc-editor.org/info/rfc5280.
Cooper, D.A., D. Apon, Q.H. Dang et al. NIST Special Publication 800-208: Recommendation for Stateful Hash-Based Signature Schemes. NIST, Oct. 2020. https://doi.org/10.6028/NIST.SP.800-208.
Crosby, S. and D. Wallach. Efficient data structures for tamper-evident logging. In Proceedings of the 18th USENIX Security Symposium, pp. 317-334. USENIX Association, 2009. https://dl.acm.org/doi/abs/10.5555/1855768.1855788.
CRYSTALS: Cryptographic Suite for Algebraic Lattices, https://pq-crystals.org/.
Damas, J., Graff, M., Vixie, P., "Extension Mechanisms for DNS (EDNS(0))", STD 75, RFC 6891, DOI 10.17487/RFC6891, Apr. 2013, https://www.rfc-editor.org/info/rfc6891.
Day in the Life of the Internet Traces, DNS-OARC, https://www.dns-oarc.net/oarc/data/catalog, last accessed Feb. 13, 2023.
Decker, C. and R. Wattenhofer. Bitcoin transaction malleability and MtGox. In Computer Security—ESORICS 2014, LNCS, vol. 8713, pp. 313-326. Springer, 2014. https://doi.org/10.1007/978-3-319-11212-1_18.
Draft Call for Additional Digital Signature Schemes for the Post-Quantum Cryptography Standardization Process. NIST. https://csrc.nist.gov/csrc/media/Projects/pqc-dig-sig/documents/call-for-proposals-dig-sig-sept-2022.pdf. Accessed Sep. 12, 2022.
Driscoll, F. Terminology for Post-Quantum Traditional Hybrid Schemes. Internet-Draft draft-driscoll-pqt-hybrid-terminology-00, Jul. 8, 2022. https://datatracker.ietf.org/doc/draft-driscoll-pqt-hybrid-terminology. Work in progress.
Ducas, L., et al., CRYSTALS-Dilithium: A Lattice-Based Digital Signature Scheme, IACR Transactions on Crytographic Hardware and Embedded Systems vol. 0, No. 0, pp. 1-31, https://eprint.iacr.org/2017/633.
FIPS Pub 180-4: Secure Hash Standard. NIST, U.S. Department of Commerce, Aug. 2015. https://doi.org/10.6028/NIST.FIPS.180-4. https://nvlpubs.nist.gov/nistpubs/FIPS/NIST.FIPS.180-4.pdf, downloaded Aug. 10, 2023.

FIPS Pub 81: DES Modes of Operation. National Bureau of Standards, U.S. Department of Commerce, Dec. 2, 1980. https://doi.org/10.6028/NBS.FIPS.81.
Fluhrer, S.: Further Analysis of a Proposed Hash-Based Signature Standard. In: Cryptology ePrint Archive, Paper 2017/553, https://eprint.iacr.org/2017/553, last accessed Feb. 13, 2023.
Fouque P.-A., J. Hoffstein, P. Kirchner, et al. Falcon: Fast-Fourier Lattice-based Compact Signatures over NTRU Specification v1.2. Jan. 10, 2020. https://falcon-sign.info/falcon.pdf. Accessed Oct. 11, 2022.
Fregly, A., "Research Agenda for a Post-Quantum DNSSEC," OARC 40, Feb. 16-17, 2023, pp. 1-10, https://indico.dns-oarc.net/event/46/.
Fregly, A., et al., "Merkle Tree Ladder Mode: Reducing the Size Impact of NIST PQC Signature Algorithms in Practice," NIST Fourth PQC Standardization Conference, Nov. 29-Dec. 1, 2022, pp. 1-32, https://csrc.nist.gov/Events/2022/fourth -pqc-standardization-conference.
Fregly, A., Harvey, J., Kaliski, B., Sheth, S., "Merkle Tree Ladder Mode: Reducing the Size Impact of NIST PQC Signature Algorithms in Practice", Conference Paper, LNCS vol. 13871, Abstract, pp. 1-2.
Fregly, A., Harvey, J., Kaliski, B., Sheth, S., "Merkle Tree Ladder Mode: Reducing the Size Impact of NIST PQC Signature Algorithms in Practice", Dec. 15, 2022, pp. 1-41.
Fregly, A., Harvey, J., Kaliski, B., Sheth, S., "Merkle Tree Ladder Mode: Reducing the Size Impact of NIST PQC Signature Algorithms in Practice", in Rosulek, M. (editor), Lecture Notes in Computer Science, vol. 13871, CT-RSA 2023—Cryptographers Track at the RSA Conference, pp. 415-441, DOI 10.1007/978-3-031-30872-7_16, Springer, 2023. Preliminary version available at https://eprint.iacr.org/2022/1730.pdf.
Fregly, A., Harvey, J., Kaliski, B., Sheth, S., "Merkle Tree Ladder Mode: Reducing the Size Impact of NIST PQC Signature Algorithms in Practice", License to Publish Proceedings Papers, SpringerNature, Feb. 13, 2023, pp. 1-5.
Fregly, A., Harvey, J., Kaliski, B., Sheth, S., "Merkle Tree Ladder Mode: Reducing the Size Impact of NIST PQC Signature Algorithms in Practice", May 1, 2023, pp. 1-42.
Fregly, A., Harvey, J., Kaliski, B., Sheth, S., Merkle Tree Ladder Mode: Reducing the Size Impact of NIST PQC Signature Algorithms in Practice, Feb. 13, 2023, pp. 1-27.
Fregly, A., Harvey, J., Kaliski, B., Sheth, S., "Merkle Tree Ladder Mode: Reducing the Size Impact of NIST PQC Signature Algorithms in Practice", "Topics in Cryptology—CT-RSA" conference paper, Apr. 19, 2023, https://link.springer.com/chapter/10.1007/978-3-031-30872-7_16.
Fujiwara,K., Vixie, P., "Fragmentation Avoidance in DNS", Work in Progress, Internet-Draft, draft-ietf-dnsop-avoid-fragmentation-05, Jun. 2021, https://datatracker.letf.org/doc/draft-ieft-dnsop-avoid-fragmentation.
Goertzen, J., Stebila, D., "Post-Quantum Signatures in DNSSEC via Request-Based Fragmentation", University of Waterloo, Nov. 2022, pp. 1-18 https://s3.amazonaws.com/files.douglas.stebila.ca/files/research/papers/EPRINT-GoeSte22.pdf.
Goyal, R. and V. Vaikuntanathan. Locally Verifiable Signature and Key Aggregation. Cryptology ePrint Archive, Paper 2022/179. To appear, Advances in Cryptology—CRYPTO 2002, pp. 1-50, https://eprint.iacr.org/2022/179.
Goyal, R., Vaikuntanathan, V.: Locally Verifiable Signature and Key Aggregation, In: , Dodis, Y., Shrimpton, T. (eds), Advances in Cryptology—CRYPTO 2022, LNCS, vol. 13508, pp. 761-791. Springer, Cham (2022). https://doi.org/10.1007/978-3-031-15979-4_26.
Grilo, A.B., Hövelmanns, K., Hülsing, A., Majenz, C.: Tight adaptive reprogramming in the QROM. In: Tibouchi, M., Wang, H. (eds) Advances in Cryptology—ASIACRYPT 2021, LNCS, vol. 13090, pp. 637-667. Springer, Cham (2021). https://doi.org/10.1007/978-3-030-92062-3_22.
Harvey, J., draft-harvey-cfrg-mtl-mode, Merkle Tree Ladder Mode (MTL) Signatures, IETF-117, slides 1-6, Jul. 25, 2023.

(56) References Cited

OTHER PUBLICATIONS

Harvey, J., Kaliski, B., Fregly, A., Sheth, S., Merkle Tree Ladder Mode (MTL) Signatures, Internet-Draft: draft-harvey-cfrg-htl-mode-00, Published Jul. 10, 2023, pp. 1-68.

Sloane, N.J.A. and A. Wilks. a(n)=a(floor(n/2))+n; also denominators in expansion of 1/sqrt(1-x) are 2a(n); also 2n—number of 1's in binary expansion of 2n. Entry A005187 in the On-Line Encyclopedia of Integer Sequences. https://oeis.org/A005187. Accessed Oct. 11, 2022.

SPHINCS+: Stateless Hash-Based Signatures. https://sphincs.org/. Accessed Sep. 12, 2022.

Stern, J., D. Pointcheval, J. Malone-Lee and N.P. Smart. Flaws in applying proof methodologies to signature schemes. In Advances in Cryptology—CRYPTO 2002, pp. 93-110. Springer, 2002. https://doi.org/10.1007/3-540-45708-9_7.

Submission Requirements and Evaluation Criteria for the Post-Quantum Cryptography Standardization Process, NIST, https://csrc.nist.gov/CSRC/media/Projects/Post-Quantum-Cryptography/documents/call-for-proposals-final-dec-2016.pdf, last accessed Feb. 13, 2023.

Sury, O., "DNS Flag Day 2020", Sep. 2020, https://www.isc.org/blogs/dns-flag-day-2020-2.Work in Progress, Internet-Draft, draft-ietf-dnsop-avoid-fragmentation-05, Jun. 2021, https://datatracker/ietf.org/doc/draft-ietf-dnsop-avoid-fragmentation/.

Todd, P. Merkle Mountain Ranges. 2012. https://github.com/opentimestamps/opentimestamps-server/blob/master/doc/merkle-mountain-range.md. Accessed Oct. 11, 2022.

Yuan, Q., M. Tibouchi and M. Abe. Security notions for stateful signature schemes. IET Information Security 16 (1):1-17. Wiley Online Library, 2022. https://doi.org/10.1049/ise2.12040.

Andy Fregly to pqc-forum@list.nist.gov , "Re: Request for feedback on possible SPHINCS+ variant", Jan. 5, 2023, https://groups.google.com/a/list.nist.gov/g/pqc-forum/c/LUczQNCw7HA/m/l65HGBZ5AgAJ—comments on the ability of MTL mode in "batch" mode to reduce the number of underlying signature operations.

Burt Kaliski to pqc-forum@list.nist.gov, "Re: Request for feedback on possible SPHINCS+ variant", Jan. 13, 2023, https://groups.google.com/a/list.nist.gov/g/pqc-forum/c/LUczQNCw7HA/m/9GovatAOBQAJ—confirms Verisign's intent to address questions about intellectual property "if and as we promote MTL mode as a candidate for standardization".

Burt Kaliski to cfrg@ietf.org, "Re: [CFRG] Fw: New Version Notification for draft-harvey-cfrg-mtl-mode-00.txt", Jul. 25, 2023, https://mailarchive.ietf.org/arch/msg/cfrg/OX6cbbAgbaVE8wFI8QjGt1_bwWQ/—responds to a question about how MTL mode would be used with DNSSEC, in connection with a question about intellectual property.

Joe Harvey to cfrg@ietf.org, "[CFRG] Fw: New Version Notification for draft-harvey-cfrg-mtl-mode-00.txt", Jul. 21, 2023, https://mailarchive.ietf.org/arch/msg/cfrg/9BILaWo1CS_64Fs29JQX4GdUVRc/—forwards an announcement of the publication of the MTL mode Internet-Draft.

Joe Harvey to cfrg@ietf.org, "Re: [CFRG] Fw: New Version Notification for draft-harvey-cfrg-mtl-mode-00.txt", Jul. 28, 2023, https://mailarchive.ietf.org/arch/msg/cfrg/Hnkw99CUj7nk__1tQ5J3it9ft_8/—responds to a question about the benefits of MTL mode.

Burt Kaliski, "Next Steps in Preparing for Post-Quantum DNSSEC", Verisign blog, Jul. 20, 2023, https://blog.verisign.com/security/post-quantum-dnssec-preparation/—provides an overview of MTL mode and announces the MTL mode Internet-Draft and IPR disclosure.

David Benjamin, Devon O'Brien , Bas Westerbaan, "Merkle Tree Certificates for TLS", Internet-Draft, https://datatracker.ietf.org/doc/draft-davidben-tls-merkle-tree-certs/00/, Mar. 10, 2023; updated version, https://datatracker.ietf.org/doc/draft-davidben-tls-merkle-tree-certs/01/, Sep. 8, 2023—proposes the use of Merkle trees "as a size optimization over more conventional mechanisms with post-quantum signatures".

Orie Steele, Henk Birkholz, Maik Riechert, et al., "Concise Encoding of Signed Merkle Tree Proofs", Internet-Draft, Mar. 13, 2023, https://datatracker.ietf.org/doc/draft-steele-cose-merkle-tree-proofs/00/—describes "a format for Merkle Tree Root Signatures" and other structures related to Merkle trees.

Dennis Jackson, "Abridged Compression for WebPKI Certificates", Internet-Draft, Jul. 6, 2023 https://datatracker.ietf.org/doc/draft-jackson-tis-cert-abridge/00/—defines a method that "smooths the transition to post-quantum certificates by eliminating the root and intermediate certificates from the TLS certificate chain without impacting trust negotiation".

Foteini Baldimtsi, Konstantinos Chalkias, Panagiotis Chatzigiannis, Mahimna Kelka, "Truncator: Time-space Tradeoff of Cryptographic Primitives", IACR ePrint, Nov. 14, 2022, https://eprint.iacr.org/2022/1581—presents "mining-based techniques to reduce the size of various cryptographic outputs without loss of security"; updated version, Jan. 20, 2023, https://eprint.iacr.org/archive/2022/1581/20230120:154540—references the Fregly et al. IACR ePrint.

Panos Kampanakis, Tancrède Lepoint, "Do we need to change some things? Open questions posed by the upcoming post-quantum migration to existing standards and deployments", IACR ePrint, Feb. 2, 2023, https://eprint.iacr.org/2023/266—"motivates more research and possible standards updates related to the upcoming quantum-resistant cryptography migration" and references the Fregly et al. IACR ePrint.

Carlos Aguilar-Melchor, Martin R. Albrecht, Thomas Bailleux, et al., "Batch Signatures, Revisited", IACR ePrint, Apr. 4, 2023, https://eprint.iacr.org/2023/492—revisits "batch signatures (previously considered in a draft RFC, and used in multiple recent works), where a single, potentially expensive, "inner" digital signature authenticates a Merkle tree constructed from many messages" and discusses security and application considerations.

Kaliski Jr. et al., "Methods and Systems for Generating and Updating Merkle Trees for an Evolving Data Series and Applications Thereof," U.S. Appl. No. 18/137,966, filed Apr. 21, 2023, 139 Specification and 24 Figures.

Kaliski Jr. et al., "Methods and Systems for Generating and Updating Merkle Trees for an Evolving Data Series and Applications Thereof," U.S. Appl. No. 63/356,973, filed Jun. 29, 2022.

Kaliski Jr. et al., "Methods and Systems for Generating Condensed Signatures for an Evolving Data Series and Applications Thereof," U.S. Appl. No. 63/406,699, filed Sep. 14, 2022, 48 pages Specification and 5 Figures.

Fregly et al., "Methods and Systems for Generating Condensed Signatures for an Evolving Data Series and Applications Thereof," U.S. Appl. No. 63/416,909, filed Oct. 17, 2022, 70 pages Specification and 6 Figures.

Kaliski Jr. et al., "Methods and Systems for Generating Condensed Signatures for an Evolving Data Series and Applications Thereof," U.S. Appl. No. 63/429,093, filed Nov. 30, 2022, 91 pages Specification and 6 Figures.

Kaliski Jr. et al., "Systems and Methods for Integrating a Signature Algorithm Into an Application," U.S. Appl. No. 63/667,601, filed Jul. 3, 2024; 13 pages Specification.

* cited by examiner

Tree Structure
300

Tree Structure
400

Merkle Tree Authenticator for Data Series Batch

Merkle Tree Authenticator for Original Data Series

Updated Merkle Tree Authenticator with One Node Newly Calculated

1900

2100

2200

2500

Provisioning System　　　　　　　　　　Name Server (Prover)

| Provisioning System | Name Server (Prover) |
|---|---|
| 1. Construct Hash Tree incl. Initial Tree Root from Data Set | |
| 2. Publish Initial Tree Root as Synthesized Public Key | |
| 3. Transmit Data Set | 1'. Receive Data Set |
| 4. Transmit Information Sufficient to Provide Signatures Relative to Initial Tree Root | 2'. Receive Information Sufficient to Provide Signatures Relative to Initial Tree Root |
| | 3'. Provide Data Record |
| | 4'. Provide Signature on Data Record Relative to Initial Tree Root |
| 5. Update Data Set | |
| 6. Update Hash Tree Based on Updated Data Set, incl. Updated Tree Root | |
| 7. Publish Updated tree Root as Synthesized Public Key | |
| 8. Transmit Information Sufficient to Update Data Set | 5'. Receive Information Sufficient to Update Data Set |
| 9. Transmit Information Sufficient to Provide Signatures Relative to Updated Tree Root | 6'. Receive Information Sufficient to Provide Signatures Relative to Updated Tree Root |
| | 7' . Provide Data Record |
| | 8' . Provide Signature on Data Record Relative to Updated Tree Root |

FIG. 25

METHODS AND SYSTEMS FOR GENERATING AND UPDATING MERKLE TREES FOR AN EVOLVING DATA SERIES AND APPLICATIONS THEREOF

CROSS REFERENCE TO RELATED APPLICATIONS

The application claims the benefit of U.S. Provisional Patent Application No. 63/356,973 filed Jun. 29, 2022, U.S. Provisional Patent Application No. 63/406,699 filed Sep. 14, 2022, U.S. Provisional Patent Application No. 63/416,909 filed Oct. 17, 2022, and U.S. Provisional Patent Application No. 63/429,093 filed Nov. 30, 2022, which are incorporated herein by reference in their entireties. This application incorporates by reference U.S. Patent Application Ser. No. 18/137,992, filed Apr. 21, 2023, "METHODS AND SYSTEMS FOR GENERATING CONDENSED SIGNATURES FOR AN EVOLVING DATA SERIES AND APPLICATIONS THEREOF".

FIELD

The systems and methods described herein relate to a general model for data series authentication schemes (DSAS) and provide a framework for the use of Merkle trees to create public keys.

BACKGROUND

A hash, such as a cryptographic hash or fingerprint, is a function that can input any of a variety of computer-interpretable objects and derive a fixed-size output. This output may be represented as a string, e.g., a hexadecimal number. Cryptographic hashes typically have other useful properties, such as preimage resistance (or "irreversibility") and collision resistance.

Asymmetric cryptography refers to cryptography that utilizes a key pair that includes of a public key and a private key. A message or other data may be encrypted by applying an encryption algorithm under control of the public key, and an encrypted message or other data may be decrypted by applying a conjugate decryption algorithm and under control of the private key to the encrypted message. Asymmetric cryptography includes such well-known algorithms as the Rivest-Shamir-Adleman (RSA) technique, as well as the Diffie-Hellman family of techniques. Notably, the security of such asymmetric cryptography typically relies on the difficulty of solving certain algebraic problems using standard computers.

A signature, such as a digital signature, is the result of applying a private key of an asymmetric cryptographic key pair to a computer-interpretable object. The corresponding public key of the asymmetric cryptographic key pair may be published or otherwise made available by the signing entity to the verifying party. The object may first be hashed as part of the signature process. A verifying party can verify the signature by applying the public key to the signature and comparing the result to the object or the hash of the object, or otherwise by determining that the signature corresponds to the object or its hash, depending on the scheme. If the comparison results in a match or correspondence, then the signature is valid; otherwise the signature is invalid. Digital signatures typically confer authentication (e.g., binding the signed object to the signer), non-repudiation (e.g., assuring that the signed object was indeed signed by the signing entity), and/or object integrity (e.g., assuring that the signed object has not changed since being signed). The process of validating a signature may confirm that one or more of the aforementioned properties hold for the signed object. A public/private key pair that supports digital signatures may or may not also support encryption and decryption operations.

A certificate, such as a digital certificate, is a package that may include information identifying a public key (e.g., the key itself or a hash of the key), together with information identifying the owner of the key, and a digital signature on at least some of the package contents. The certificates may have an expiration date, which may be represented in the package contents. The digital signature may be produced (i.e., signed) by a trusted party, such as a certification authority. A digital certificate may provide any entity that trusts the party that signed the certificate with the ability to validate that the signed public key is indeed associated with the party identified in the certificate. Thus, certificates may be used to protect data, encrypt transactions, and/or enable secure communications, among other uses. An example standard for certificates is the X.509 standard, promulgated by the International Telecommunications Union's Standardization sector.

A certification or certificate authority is an entity that provides digital certificates. Thus, certification authorities are trusted third parties, which verify the identities of parties engaged in some communication. Certification authorities may issue many certificates per minute. Certification authorities are identified with the computer servers that provide the certificates.

A certificate status responder is an entity that provides the status of a digital certificate, e.g., as valid, expired, or revoked. The status may be provided on demand to users that are relying on the certificate. By way of explanatory example, a first user may wish to communicate securely with a second user, e.g., by using the second user's public key to encrypt a message or other data. However, the first user may wish to verify that the second user's public key is authentic and actually associated with the second user. To do this, the first user obtains a certificate for the public key of the second user. However, the certificate, which is signed by a trusted third-party certification authority, may have expired, been revoked, or otherwise be invalid. Verifying the certification authority's signature on the certificate does not necessarily verify the current validity of the certificate. The first user thus wishes to verify the current status of the second user's certificate. To do so, the first user utilizes a certificate status responder. The certificate status responder receives a status request that includes an identification of the certificate in question, e.g., in the form of a serial number or other identifier. The certificate status responder may receive the request from the first user, or may receive the request from the second user according to a so-called stapling approach. Based on the serial number or other certificate identifier, the certificate status responder may retrieve a status of the certificate from the certification authority that issued it, or from its own records (e.g., if the certificate status responder is itself also a certification authority that issued the second user's certificate). The certificate status responder generates a response that includes information indicating the status of the second user's certificate and a signature produced by the certificate status responder's private key. The certificate status responder then returns the response to the requesting party. If the requesting party is the second user per a stapling approach, then the second user includes the response in an initial communication with the first user; otherwise, the certificate status responder returns the status certificate to the first user. The first user then uses the public key of the certificate status responder to verify the signature on the response, thereby obtaining a validated status of the second user's certificate. An example certificate status responder protocol is the Online Certificate Status Protocol ("OCSP"). A certificate status responder is identified herein with the hardware computer servers that perform the responses.

An identity provider may provide a user's online identity to an online application. By way of explanatory example, a user may wish to access an online resource, such as a service. The user directs the user's computer to the online resource, e.g., by entering or clicking on a URL in a browser. The online resource redirects the user's computer to an identity provider. The user's computer, e.g., a browser executing thereon, may have an open session active with the identity provider from a previous login to the identity provider, or the user may log in to the identity provider at this point. The identity provider generates a package of information that includes an identifier of the user's identity, adds a signature, and provides it to the user's computer or to the online resource. The user's browser may then redirect back to the online resource. The online resource then validates the signature. At this point, the user can access the online resource without separately logging in to it. An example known identity provider protocol is associated with the Security Assertion Markup Language ("SAML"). An identity provider is identified herein with the server computers through which the identity provider provides its services.

A code signer may provide signatures on computer code, such as software images, executables and scripts. A user wishing to execute the code may confirm that the code has not been altered before executing by validating the signature. Typically, a developer provides the code to a code signer server computer (which is identified with the code signer entity). The code signer signs the code (or an image or representation of the code, such as a hash) and returns the signature to the developer. Later, a user wishing to validate the code can authenticate the signature using the code signer's public key. A code signer is identified herein with the server computers through which the code signer provides its services.

A payment authority entity may provide signatures on online payments. A payer may wish to have his or her payment to a payee validated. The payer interacts with a payment authority, which signs the payment to the payee. In some embodiments, the payer itself may be the payment authority. In others, a trusted third party, such as a payment service, may be the payment authority. Later, any party can validate the transaction by confirming the signature on the payment. A payment authority is identified herein with the server computers through which the payment authority provides its services.

The Domain Name System (DNS) is a hierarchical distributed naming system for resources, such as those provided by computer servers, connected to the internet. It associates domain names to addresses of resources, such as Internet Protocol (IP) addresses, and other related information. The DNS thus allows computers and humans to access networked resources using names.

The DNS is typically organized into one or more zones, a unit of organization of authoritative name data for the DNS. The DNS relies on extensive delegation of such authority. In that respect, the term "child" refers to an entity of record to which a "parent" entity delegates certain authority, such as name resolution authority, for a domain, or portion thereof. In this context, the terms "parent" and "child" are also generally identified with the respective zones (e.g., a parent zone and one or more child zones within the parent zone).

BRIEF SUMMARY

According to an embodiment, a computer-implemented method for authenticating messages relative to a hash-based data authentication structure is provided. The method includes producing a first signed data structure, wherein the first signed data structure includes one or more node hash values from the hash-based data authentication structure, wherein the node hash values are selected according to a selected strategy and configured to authenticate messages relative to the hash-based data structure. The method further includes producing a second signed data structure, wherein the second signed data structure is a modified version of the first signed data structure. The method further includes enabling a signed data structure provider to provide to a verifier the first signed data structure and the second signed data structure. The method further includes enabling an authentication path provider to provide to the verifier an authentication path formed relative to the first signed data structure or the second signed data structure. The verifier determines whether to use the first signed data structure based on an authentication path, and performs a verification procedure.

In addition to one or more of the features described herein, or as an alternative, further embodiments of the method may include that the verification procedure includes the verifier: obtaining the first signed data structure; obtaining an authentication path formed relative to the second signed data structure; and determining based on information associated with the authentication path whether the authentication path can be verified relative to the first signed data structure.

In addition to one or more of the features described herein, or as an alternative, further embodiments of the method may include that the verification procedure further includes the verifier: obtaining a third signed data structure from the signed data structure provider responsive to determining that the authentication path cannot be verified relative to the first signed data structure; and verifying the authentication path relative to the first signed data structure or the third signed data structure.

In addition to one or more of the features described herein, or as an alternative, further embodiments of the method may include that the verification procedure further includes the verifier: verifying the authentication path relative to the first signed data structure responsive to determining that the authentication path can be verified relative to the first signed data structure.

In addition to one or more of the features described herein, or as an alternative, further embodiments of the method may include that the selected strategy includes at least one or more of a full strategy, a single strategy, a basic binary strategy, an extended binary, a spaced strategy, a variable spaced strategy, a bounded strategy, a spaced and bounded strategy, a spaced extended binary strategy, and a bounded extended binary strategy.

In addition to one or more of the features described herein, or as an alternative, further embodiments of the method may include that the hash-based data authentication structure is a tree structure.

In addition to one or more of the features described herein, or as an alternative, further embodiments of the method may include that the hash-based data authentication structure is a tree structure that changes over time.

In addition to one or more of the features described herein, or as an alternative, further embodiments of the method may include that producing the first signed data structure includes using grouping elements that are to be added to a data series into data series batches that have identifiers that start at one greater than a highest element identifier in a current data series authenticated by the verifier.

In addition to one or more of the features described herein, or as an alternative, further embodiments of the method may include creating a long-lived data structure for a data series based on a subseries of the data series that is anticipated not to change during a period of time.

In addition to one or more of the features described herein, or as an alternative, further embodiments of the method may include constructing multiple data structures that can be used as authenticators for subsets of an expanding data series.

In addition to one or more of the features described herein, or as an alternative, further embodiments of the method may include producing and using multiple reference values from multiple data structures, wherein the multiple data structures include an unbalanced data structure having subtrees from which the reference values are obtained.

In addition to one or more of the features described herein, or as an alternative, further embodiments of the method may include performing a batch updating process using a merge method, wherein an initial authenticator is created with a number of leaves that is a largest power of two that is less than or equal to a number of resource record sets in a data series.

In addition to one or more of the features described herein, or as an alternative, further embodiments of the method may include that the strategy authenticates long-lived data elements that are anticipated not to change during a period of time, and wherein another strategy authenticates changing data elements.

In addition to one or more of the features described herein, or as an alternative, further embodiments of the method may include publishing one or more hash values in the data structure as synthesized public keys.

In addition to one or more of the features described herein, or as an alternative, further embodiments of the method may include that the synthesized public keys are used as domain name system security extension (DNSSEC) key signing keys and DNSSEC zone signing keys.

In addition to one or more of the features described herein, or as an alternative, further embodiments of the method may include publishing, in an internet public key infrastructure (PKI) as a synthesized public key, information sufficient to validate a root node of the first signed data structure.

According to an embodiment computer-implemented method for authenticating messages relative to a hash-based data authentication structure is provided. The method includes obtaining from a signed data structure provider a first signed data structure, wherein the first signed data structure includes one or more node hash values from the hash-based data authentication structure, wherein the node hash values are selected according to a selected strategy and configured to authenticate messages relative to the hash-based data structure. The method further includes obtaining from an authentication path provider an authentication path formed relative to a second signed data structure, wherein the second signed data structure is a modified version of the first signed data structure. The method further includes determining based on information associated with the authentication path whether the authentication path can be verified relative to the first signed data structure. The method further includes responsive to determining that the authentication path cannot be verified relative to the first signed data structure, obtaining from the signed data structure provider a third signed data structure, wherein the third signed data structure is a modified version of the first signed data structure. The method further includes verifying the authentication path relative to the first signed data structure or the third signed data structure.

In addition to one or more of the features described herein, or as an alternative, further embodiments of the method may include that the selected strategy includes at least one or more of a full strategy, a single strategy, a basic binary strategy, an extended binary, a spaced strategy, a variable spaced strategy, a bounded strategy, a spaced and bounded strategy, a spaced extended binary strategy, and a bounded extended binary strategy.

In addition to one or more of the features described herein, or as an alternative, further embodiments of the method may include that at least one Merkle tree node is used to perform the determining and the verifying.

In addition to one or more of the features described herein, or as an alternative, further embodiments of the method may include publishing one or more hash values in the data structure as synthesized public keys.

BRIEF DESCRIPTION OF THE DRAWINGS

FIG. 25 depicts an example flow diagram of a computer implemented method, according to an embodiment.

Various embodiments are described in detail below with reference to the accompanying drawings, in which like reference numerals represent like elements.

DETAILED DESCRIPTION

Figure 1:
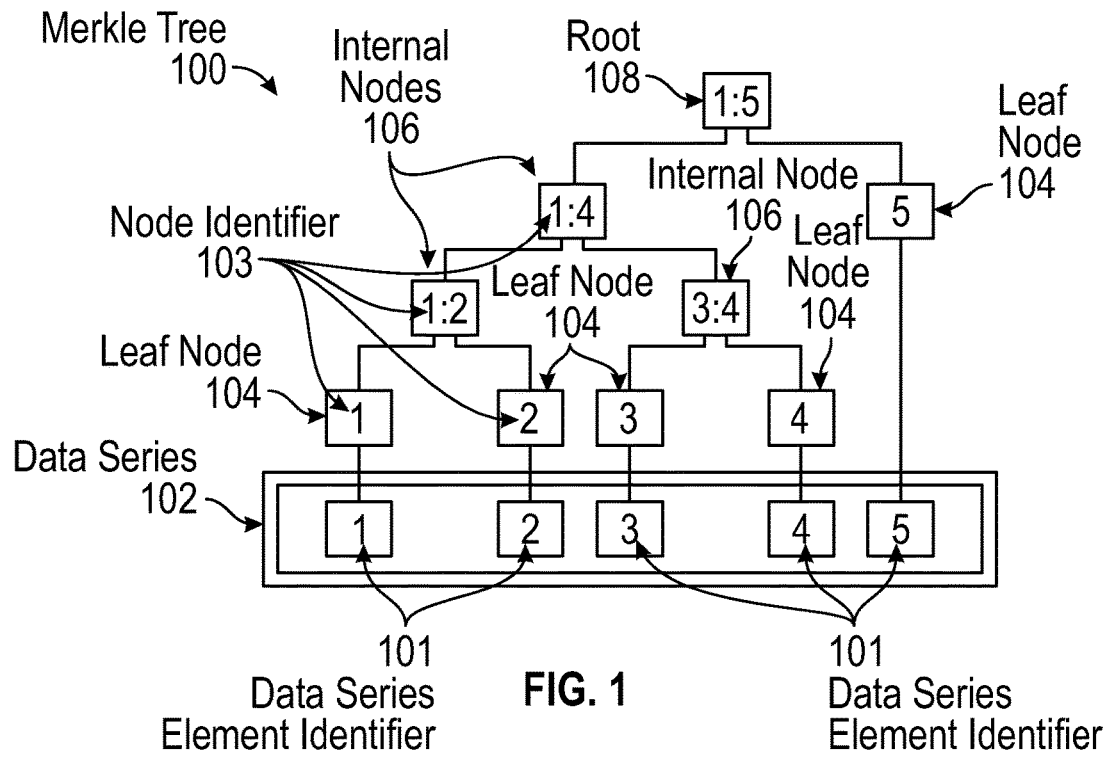
FIG. 1 illustrates an example Merkle tree, according to an embodiment.

According to an exemplary embodiment, methods for efficient generation and updating of Merkle trees as data series authenticators for an evolving data series are disclosed. The methods address tree creation, tree updating when data elements are added, removed, or updated in a data series authenticated by a Merkle tree, merging non-overlapping data series and creating or updating a Merkle tree authenticator to authenticate the merged data series, extracting subtrees of a Merkle tree authenticator as Merkle tree authenticators in their own right.

According to another exemplary embodiment, methods are defined for removing nodes from a Merkle tree authenticator that are no longer used for authenticating a data series. These methods allow a Merkle tree authenticator to be garbage collected after it is updated to authenticate an updated data series.

According to another exemplary embodiment, the disclosed methods allow applications to determine Merkle tree authenticator structure (i.e., to determine which nodes are child nodes of other nodes) and node identifiers (i.e., the identifiers to be input to hashing operations and/or to be used to identify nodes' locations within the authenticator structure) deterministically even when the Merkle tree is not fully balanced as occurs when the Merkle tree authenticates a data series that has a number of elements that is not a power of 2. (Determinism in this context means that the structure and the identifiers are determined through a specific algorithm using basic parameters, such as the lowest and highest leaf identifiers of leaves in the tree, in contrast to the structure being described as information about the tree nodes themselves, as in a conventional tree-based data structure.) In some embodiments where data series element identifiers include a series of consecutive positive integers, the structure of a Merkle tree authenticator is determined by a function that determines tree structure and child node identifiers based on the leftmost (L) and rightmost (R) identifiers of the data series elements that are authenticated by the node, and a calculated split point that determines L and R values for the node's child nodes. In these embodiments and potentially other embodiments, [L:R] values serve as a component of the node identifiers. In some embodiments, the function that calculates the split point results in Merkle tree structures that uses minimal recalculation of nodes when a Merkle tree authenticator is updated to authenticate an updated data series. Variations of these embodiments may use starting or ending data series element identifiers along with the count of the number of leaves that are descendants of a node as inputs to a function that calculates split points. Other identifier schemes may be used for Merkle tree node identifiers and as input to a function that determines split points. The methods are also readily adaptable to identifier schemes that collate based on an ordered set of possible identifiers as the methods for determining split points and consequent Merkle tree structures and node identifiers would still apply though using additional calculations to map the identifiers onto a sequential number scheme.

According to another embodiment, inputs for calculating hashes that include nodes in a Merkle tree authenticator or a witness (i.e., information by which a data series element's association with a Merkle tree authenticator may be verified) include either a data series element or the hash values of child nodes of a node. Additional inputs to hash calculation may be used to make it harder to perform second pre-image attacks on the hashes. These inputs may include combinations in whole or in part of the following: node identifier, child node identifiers, root node identifier, tree identifier, data series identifier for the data element a witness applies to. Other inputs may be included in hash calculations. In some embodiments, some of the inputs used in the hash calculation for a node may be considered to be elements of a node identifier. In some embodiments, a tree identifier may include a random value. In some embodiments, a tree identifier may include the node identifier for the root node that includes the reference value.

In embodiments for deterministic identification of Merkle tree node identifiers, Merkle tree leaf identifiers may initially include a consecutive series of positive integers starting at 1 and corresponding to data series identifiers to provide flexibility. Furthermore, internal node identifiers may include a pair of identifiers, the lowest (leftmost) identifier and highest (rightmost) leaf identifiers of leaves that are descendants of a node (e.g., direct child node(s), grandchild node(s), etc.). In some embodiments, a data series may have data elements removed from the beginning of the data series or the end of the data series and the data series element identifiers for the remaining data series elements determine the lowest and highest leaf identifiers for an authenticating Merkle tree.

According to another exemplary embodiment, methods are disclosed for selecting subseries of a data series such that a Merkle tree authenticator for a subseries will be a subtree of a Merkle tree authenticator for a containing subseries. In such cases, the root node of the subtree may be used as a reference value, and witnesses derived from the subtree used to authenticate data elements from the subseries.

In some embodiments, a subseries may be selected such that a Merkle tree authenticator for the subseries is not a subtree of a Merkle tree authenticator for a containing subseries. In this scenario, at least one node in the subtree will not have a corresponding node in the Merkle tree authenticator for the containing subseries. In these embodiments, the disclosed methods may be used to construct a Merkle tree authenticator for the subseries.

According to another exemplary embodiment, methods are disclosed for the use of tree identifiers and node identifiers as inputs to hashes that include nodes in Merkle trees. When this is done, trees with the same tree identifier may be merged. Merkle trees created with these methods may be merged so long as the identifiers for the data series for each of the Merkle tree authenticators to be merged have no identifiers in common. In some embodiments, the sets of identifiers for the data series for each of the Merkle tree authenticators to be merged may be adjacent to one another, i.e., the highest identifier for one data series may be desired to be one less than the lowest identifier in another data series.

According to another exemplary embodiment, methods are disclosed for splitting Merkle trees into separate trees each of which can be updated with one of the deterministic update algorithms. For example, the separate trees may be independent trees (e.g., with no ancestors or dependencies on other trees). As another example, the separate trees may be independent from each other (e.g., a modification to a first tree would not cause modification to a second tree) and therefore may be considered to have independent root nodes, though the separate trees may still be subtrees or different parts of a single tree or an encompassing subtree. The split functions may preserve node identifiers which are used as inputs to calculate hashes that include nodes so as to not use any recalculation of the nodes, or to use minimal recalculation of nodes, in the Merkle trees resulting from a split. These methods may also use a tree identifier as an input in calculating nodes. In this case, the tree identifier of the tree being split is used for the sub-trees, otherwise the nodes in a sub-tree will be recalculated with the tree identifier for the sub-tree. The re-use of tree identifiers and node identifiers in trees created by splitting supports efficient subsequent merge operations involving trees created this way so long as the merged trees have the same tree identifiers, the merged tree uses the same tree identifier, and the trees to be merged are composed from data series which have identifier sets that are disjoint.

According to another exemplary embodiment, methods are disclosed for creating witnesses for data series elements using a deterministic algorithm. These methods identify nodes to use as witness elements using a derivative of an algorithm used for tree construction and updating. The derivative algorithm determines the set of sibling nodes for verification of a data series element and inserts the sibling nodes into witnesses. The sibling nodes are siblings to nodes that will be calculated during verification.

In some embodiments, witnesses may include hashes, and identifiers for witness elements are determined by a verifier using a derivative of the tree construction algorithm.

In some embodiments, node identifiers may be included in witnesses with distinct node identifiers associated with each node in the witness and with each node to be calculated during verification. This approach is applicable to use cases where the identifier for the reference value is not known and therefore node identifiers cannot be determined. This approach may also be applicable to Merkle tree labeling schemes that do not have a deterministic algorithm for determining node identifiers, such as algorithms that base the structure of the Merkle tree and its node identifiers on the values of data elements. In this case, node identifiers may be generated using an arbitrary algorithm during Merkle tree construction and stored in association with the nodes they apply to. During witness generation, the node identifiers associated with the Merkle tree nodes including the witness may be included in the witness in association with the nodes they are applicable to and nodes to be calculated during verification.

According to another exemplary embodiment, methods are disclosed for ordering and updating data series elements to optimize reference value lifespans. These methods may take into account or determine ordering based on: age of a reference, number of desired reference values, likelihood of a reference value being invalid, age of a data element; relationship of a data element to other data elements; machine learning to identify elements likely to change and elements unlikely to change; natural re-ordering based on placing new/updated elements in groupings within an encompassing data series; re-ordering based on removing modified or deleted elements from a data series; using indirection to re-order data elements so that physical ordering is distinct from logical ordering; minimization of the number of elements moved during re-ordering; maximizing the number of consecutive elements that are re-ordered as a group. Other methods are possible.

According to another exemplary embodiment, methods are disclosed for publishing reference values for a series of Merkle tree authenticators for an evolving data series so as to perform a desired trade-off between likelihood that published witnesses will be verifiable against a published reference value, and the number of published reference values and/or witnesses. The methods may take into account factors, such as limited validity periods of reference values and witnesses, constraints in transport mechanisms that limit the number of reference values that may be retrieved by a verifier, and caching algorithms used for witnesses and reference values.

In addition to addressing the incremental evolution of a Merkle tree authenticator for a changing data series, the methods disclosed address changes to the data series as set operations on the data series that when reflected in updates to Merkle trees may maximize the life of reference values.

In general, the algorithms seek to create sets that maximize the number of consecutive data series elements that are projected not to change and to preserve the identifiers used for those elements. Merkle trees authenticating a data series will then have larger subtrees that are unchanged due to data series updates. The methods cover cases where: data elements are deleted from the data series and marked as deleted; data series are split due to gaps formed by deletions; data series are compacted to eliminate gaps formed by deletions; minimizing the size of Merkle trees created as authenticators for a data series that is evolving or changing over time; efficient creation/updating of Merkle tree authenticators when data series elements are updated with a new value; efficient creation/update of Merkle tree authenticators when data series elements are deleted; data series reordering so that long lived reference values may be created based on Merkle tree authenticators for subseries of a data series. These methods take into consideration the structure of the Merkle tree(s) authenticators for the data series and use various optimization algorithms in identifying subseries to be authenticated by long-lived reference values from subtrees. The identification of subseries and reference values for them may include a trade-off analysis relative to the number of elements authenticated by a reference value; the frequency of changes to the data series or to subseries that may be authenticated by reference values; the expected life of a reference value; the number of reference values used to authenticate the entire data series; the frequency with which a reference value may be used for verification. Other factors may be used in the trade-off analysis. A factor in assessing data series changes is determination of the number of Merkle tree nodes that are to be calculated due to changing values in the data series or changing identifiers for data series elements.

In some embodiments, Merkle tree ladders may be used to model and optimize key management for Merkle Tree Public Keys (MTPKs). A rung in a Merkle tree ladder corresponding to a Merkle tree may correspond to a node in the Merkle tree. Any node in the Merkle tree can be a rung on a corresponding Merkle tree ladder. Rungs of a Merkle tree ladder may collectively authenticate the data records in the data series associated with a Merkle tree. To verify a data record, the Merkle tree ladder may be used to derive a public key while an authentication path from the data record to the derived public key may be used as a signature that may be verified relative to the public key. In some embodiments, the nodes in a Merkle tree ladder may include nodes from multiple Merkle trees. In some embodiments, the multiple Merkle trees may serve to authenticate subsets of a data series where the data records in the subsets include a consecutive series of data records. In some embodiments, the multiple Merkle trees may authenticate non-overlapping subsets of a data series. In some embodiments, the non-overlapping subsets may include a consecutive set of data records in a data series. In some embodiments, the distinct Merkle trees may be merged into a larger Merkle tree that authenticates a consecutive set of data records having the data series subsets authenticated by the distinct Merkle trees.

In some embodiments, when one or more data records in the data series associated with a Merkle tree change, nodes in the Merkle tree may be added or updated. When nodes in the Merkle tree are added or updated, the Merkle tree ladder may also be evolved. A new Merkle tree ladder may be used by a verifier when an existing Merkle tree ladder cannot authenticate a data record. In a first perspective, a Merkle tree ladder having a smaller number of rungs may be preferred as this Merkle tree ladder may save memory and network bandwidth. In a second perspective, a Merkle tree ladder that can be used for authenticating a greater number of data records without being replaced may be preferred. A number of strategies for constructing a Merkle tree ladder may exist.

Methods and Optimizations for Creating and Maintaining Data Series Having DNS Resource Record Sets (RRsets) and Merkle Tree Public Keys (MTPKs) that Authenticate the RRsets.

According to some exemplary embodiments, systems and methods are disclosed for implementing the novel methods disclosed in relation to Merkle trees in the Domain Name System (DNS) context. These systems and methods provide optimizations, among other benefits, for creating and maintaining data series having RRsets, and Merkle Tree Authenticators and MTPKs that authenticate the RRsets.

According to another exemplary embodiment, methods are disclosed that allow for MTPK tree construction algorithms and node identifier schemes for Domain Name System Security Extensions (DNSSEC) authentication based on Merkle tree authenticator construction and node identifier schemes. In some embodiments, deterministic creation of authentication paths in MTPK signatures are defined based on the witness construction algorithms for Merkle tree authenticators. In some embodiments, methods for verification of a DNS Resource Record Set against a MTPK using a MTPK signature are disclosed based on verification algorithms for Merkle tree authenticators.

According to another exemplary embodiment, methods are disclosed for ordering a zone's RRsets into at least one data series which is then authenticated by at least one MTPK. While the canonical ordering used for computing a ZONEMD record could be used, for example, other ordering methods may be used to maximize the lifespan of MTPKs. The various methods for data series ordering for Merkle tree authenticators may be applied to ordering RRsets as a data series authenticated by one or more MTPKs. These methods seek to optimize the life of MTPKs, optimize the number of MTPKs in the resulting DNSKEY RRset, determine how often MTPKs should be generated, and to determine how a data series including RRsets may be partitioned to support multiple MTPKs over time. In some embodiments, data elements are grouped according to their likelihood to be changed. Ordering may take into account: RRset age, registrant, registrar, domain activity, domain prioritization based on a ranking function, name server, most recently updated, least recently updated and predictive based on machine learning. Other methods are possible.

According to another exemplary embodiment, methods are disclosed for handling delete, update, and append operations for a data series including RRsets authenticated by a MTPK. These methods are based on methods applicable to Merkle tree authenticators, and applicable to reference values and witnesses derived from Merkle tree authenticators. In an embodiment, a sliding tree approach may be used whereby new and changed RRsets are added to the end (right side) of a data series and no longer valid RRsets are deleted from the front (left side) of the data series, and the Merkle tree is then updated to reflect the modified data series. In other embodiments, methods may optimize the evolution of a Merkle tree that authenticates a data series where deletions from the data series are not supported and new or changed RRsets are appended to the data series. In some embodiments, unmodified RRsets may be appended to the end of the data series so as to allow a subtree of the Merkle tree authenticator for the overall data series to be used to authenticate RRsets that are currently valid. Some embodiments minimize recalculation of nodes when MTPK Merkle trees are updated such that the number of nodes to be calculated is on the order of delta*$\log_2$(N) where N is the number of elements in the data series and delta is the number of new, changed or deleted data series elements. In some embodiments where it is not anticipated that the data series will change during the lifespan of a MTPK, methods are disclosed that will minimize the number of levels in the MTPK Merkle tree.

According to another exemplary embodiment, methods are disclosed for dynamic creation of MTPKs and signatures based on data series ranges. The dynamic methods are based on methods applicable to Merkle tree authenticators, reference values and witnesses that enable these capabilities. The motivation for dynamic creation could be based on the following factors: the frequency of changes to RRsets in a zone; the frequency of publishing MTPKs; the size and composition of a zone; desired computational capabilities; and/or operational complexity. Other factors may also provide motivation.

According to another exemplary embodiment, methods are disclosed for dynamic batch creation of MTPK resource record signatures (RRSIGs). In some embodiments, it may be more efficient to generate signatures on an as-needed basis. In addition to the previously noted factors for dynamic creation of MTPKs and signatures based on data series ranges, dynamic creation may be performed as a consequence of assessing factors, such as: impact on DNS query response time; percentage of signed RRsets expected to be returned during the lifespan of a MTPK; likelihood that a signed RRset will be included in a DNSSEC response during the lifespan of a MTPK; signature validity periods of RRSIGs; and/or TTLs for cached RRSIGs.

According to another exemplary embodiment, methods are disclosed for selecting ranges of RRsets in a data series to be authenticated by a MTPK. These methods use the techniques described above for RRset ordering to define subseries of RRsets and define MTPKs to authenticate those subseries. In some cases, the MTPK Merkle tree for a subseries may be a subtree of a MTPK Merkle tree that authenticates an encompassing data series. In other cases where the subseries' starting and ending identifiers are such that a MTPK Merkle tree authenticating the subseries would not be a subtree of MTPK Merkle tree authenticator for an encompassing data series, a new MTPK Merkle tree may be created as an authenticator for the subseries.

According to another exemplary embodiment, methods are disclosed for evolving MTPK Merkle trees as RRsets are changed, deleted, or added to a zone for purposes including: maximizing the life span of MTPKs; optimizing the number of MTPKs in the DNSKEY RRset; minimizing signature sizes taking into account Merkle tree size and subtree sizes; and/or selecting data series elements for subtrees based on expected frequency of responses containing signatures derived from the subtrees.

According to another exemplary embodiment, methods are disclosed for publishing MTPKs into the DNSKEY RRset so as to perform a desired trade-off between likelihood that cached RRSIGs will be verifiable against a current MTPK or cached MTPK in a DNSKEY RRset, and the number of MTPKs in the DNSKEY RRset. For example, a cached RRSIG may be made verifiable against a current MTPK if the RRSIG had an MTPK signature on it relative to a previous MTPK when initially received (or possibly no MTPK signature on it at all). In this way, a verifiable RRSIG may be used at some later time. This scenario might occur when a resolver, such as a DNS resolver, is responding to a client query with the DO bit set (the DO bit may be included in a DNS query and is an abbreviation for "DNSSEC OK", where if the DO bit is set (DO=1), then the client is DNSSEC-aware, and it is OK for the DNS server to return DNSSEC data in a response). In such cases, the resolver may be able to produce an MTPK signature from other data it has cached relative to the current MTPK. The methods take into account factors, such as limited validity periods for signatures, user datagram protocol (UDP) maximum transmission units (MTUs) that limit the effective size of the DNSKEY RRset, and resolver caching algorithms. Other factors may also be taken into account.

According to another exemplary embodiment, methods are disclosed for minimizing authentication path sizes. Resolvers may indicate in a DNS query that they have cached a partial authentication path applicable to the desired signature, resulting in a truncated authentication path being returned in the query response. The truncated authentication path could then be concatenated with a cached partial authentication path to form a complete authentication path. Authentication paths may also include references to authentication path elements that have been cached, thus allowing a resolver to reconstruct the authentication path based on the references. In another method, at least a portion of a MTPK Merkle tree may be cached by a resolver, and the resolver could construct an authentication path based on the RRset identifier provided in a query response or based on references to MTPK Merkle tree nodes. According to one or more embodiments described herein, another concept similar to the verifiable instance identifier (VIID) concept described in U.S. patent application Ser. No. 17/827,576, incorporated herein by reference, is that if a resolver is holding a MTPK including its Merkle tree, the authoritative name server can return the leaf ID for the RRset, and the resolver can then construct the authentication path itself and then verify the RRset against the MTPK. To facilitate performing this process efficiently, a resolver can provide in the DNS query the highest leaf index it can authenticate, for example.

According to another exemplary embodiment, methods are disclosed for minimizing query and response sizes. Resolvers that support sessions with clients may utilize the established session to determine client state to optimize responses. Client state may include, for example, any MTPK records cached by a client, partial authentication paths known by the client, or other attributes, such as the timestamp of the client's last request. Resolvers may apply this state when responding to a client request to identify the pertinent records. Alternatively, the resolver may use the client state to push records to a client over an existing connection to reduce the need for a client to explicitly query for records. According to one or more embodiments described herein, this same capability can be used for pushing information from an authoritative name server to a resolver. Furthermore, an authoritative server can provide leaf nodes to resolvers via an out-of-band method that allows resolvers to build their own Merkle Trees that are compatible with MTPK public keys that the authoritative is serving.

Moreover, this disclosure includes a method to handle DNSSEC-specific issues due to the way DNSSEC specifies the use of key tags. Key tags are embedded in RRSIG Resource Records (RRs) and are part of the input to the signature calculation performed using a DNSKEY private key, along with the RRset being signed. A DNSKEY is a DNS record type that contains a public signature verification key. Key tag values are calculated from the corresponding public key using elements of the DNSKEY RR as input, including the public key from the DNSKEY RR. When an MTPK is computed from the RRset and other elements of the RRSIG RR, it results in a new MTPK value which can validate the RRSIG. The key tag that results from the new MTPK value must match the key tag that was included in the elements in the RRSIG RR that were input to the signature operation, which results in a recursive loop problem where the MTPK value must be known before signing the RRset but signing the RRset determines the MTPK. Moreover, a method to avoid the recursive loop is disclosed herein. When a MTPK is created, an arbitrary key tag value is chosen for inclusion as an element of the RRSIG RR. In some embodiments, an additional fixing value is then appended to or otherwise associated with the MTPK computed from the RRset, the key tag and other inputs, such that the subsequent key tag calculation on the combination of the fixing value and the MTPK will result in a match to the chosen key tag. The public key included in the DNSKEY record would then include both the fixing value and the MTPK (or another value derived from both and from which at least the MTPK may be recovered). In an embodiment, the fixing value can be determined by successively trying values in the range of 0 to 65535 until the calculated key tag matches the desired key tag. Alternatively, the fixing value could be mathematically determined according to an inverse of the key tag calculation algorithm.

In some embodiments, Merkle trees may also be used to minimize the size of the DNSKEY RRset. This approach addresses the issue of DNSKEY RRset sizes causing responses to exceed UDP MTUs. The approach uses a DNSKEY RRset including two RRs, one for the KSK and one for the ZSK. The public key fields of these RRs are MTPKs that authenticate the actual public keys. In some embodiments, the actual public keys could be embedded or referenced in RRSIGs along with a MTPK authentication path verifiable with the MTPK KSK or ZSK. In some embodiments, the actual public keys could reside in a new RR type that is signed by a MTPK KSK or ZSK. In these embodiments, a hash or other identifier of the signing key could be included in an RRSIG record as a signature element and used as an identifier for selecting the actual public key in the RRset of the new RRtype including the actual public keys.

In some embodiments, signatures on DNS resource records that are intended to be verified with MTPKs may be formed differently than in an ordinary signature scheme. The difference is that, for the ordinary signature scheme, the public key may be generated before it is known which records will be signed, whereas in the MTPK approach, the public key may be obtained after the records to be signed are available. In this sense, the MTPK is a synthesized ZSK, in that the ZSK is computed from the records that are signed by it. The delay in the synthesized ZSK becoming known introduces potential complications in the process for generating a signature on the synthesized public key using a key at the next level of the DNSSEC key hierarchy. In a conventional scenario where the public key is non-synthesized, the next-level signature may be generated on a periodic basis, for instance in predetermined intervals, such as once a quarter (i.e., once every 3 months) in a key signing ceremony, and the next-level signature may be applied to one or more public keys to be used for a period of time until the next key signing ceremony. This scenario is not applicable to synthesized public keys generated between ceremonies, so a different key-signing approach may be used. Some embodiments may avoid the drawback by taking the approach of introducing a non-synthesized ZSK as a mid-level key and "flattening" a KSK signature on the non-synthesized ZSK and a non-synthesized ZSK signature on the synthesized ZSKs into a single level.

In DNSSEC, a key tag is 16-bit checksum of public key bytes. Key tags are embedded in RRSIG RRs and are part of the input to the signature calculation performed using a DNSKEY private key, along with the RRset being signed. Key tag values are calculated from the corresponding DNSKEY public key using elements of the DNSKEY RR as input, including the public key from the DNSKEY RR. When the RRset and elements of the RRSIG RR are signed by an MTPK in the synthesized zone-signing approach, it results in a new MTPK value which can validate the RRSIG. The key tag that results from the new MTPK value must match the key tag that was included in the elements of the RRSIG RR that were input to the signature operation, which results in a recursive loop problem where the MTPK value must be known before signing the RRset but signing the RRset determines the MTPK. In some embodiments, an arbitrary key tag value is chosen for inclusion as an element of the RRSIG RR when an MTPK is created. An additional fixing value is then appended to or otherwise associated with the MTPK that is computed from the RRset, the key tag and other inputs, such that the subsequent key tag calculation on the combination of the fixing value and the MTPK (or another value derived from both and from which at least the MTPK may be recovered) will result in a match to the chosen key tag.

In some embodiments, multiple compatible public keys may be adjusted with the key tag fixing method to have a common key tag. A verifier may automatically try each of the compatible public keys per DNSSEC verification logic. Designed key tag collisions may facilitate using ladders as public keys rather than individual rungs as public keys. In some embodiments, a common key tag may be assigned to compatible ladders. The verification operation may use a rung within a ladder that is compatible with an authentication path. A ladder public key may have a number of advantages. The system may manage fewer public keys compared with per-rung public keys. Also, memory space for overall public keys may be reduced because the tree identifier and other per-key overhead within each per-rung public key may be deduplicated. According to one or more embodiments described herein, an MTPK may include a single reference value or multiple reference values, sometimes referred to as a "rung" versus a "ladder" with multiple rungs.

In some embodiments, a verifier may specify public keys that the verifier already has in a key record query. A signer may determine whether a signature exists relative to one of the specified public keys. If a signature relative to one of the specified public keys exists, the signer may return the signature relative to the one of the specified public keys rather than a signature relative to a rung in a current ladder.

With MTPKs, signing one data record may potentially affect signatures on many other data records. When data set is updated, a provisioning system may update a Merkle tree based on the updated data set, publish the updated tree root as an MTPK, transmit information sufficient to update the data set to a name server, and transmit information sufficient to provide signatures relative to the updated tree root (and/or to updated rungs). The name server may provide a data record in the updated data set and a signature on the data record relative to the updated tree root (and/or rungs) upon receiving a query from a verifier. According to one or more embodiments described herein, the name server can be applicable to both authoritative and recursive name servers.

When a verifier is not able to verify a response because the Merkle tree ladder information the verifier has does not cover a data record of interest, the verifier gets a new ladder or rung. In the current DNSSEC procedures, a DNSKEY RRset may not be refreshed until the DNSKEY RRset expires. Some embodiments include a method to resolve the issue of refreshing a DNSKEY RRset including MTPKs.

When different public keys are associated with different key tags, and the signature calculation depends on key tag bytes, a single Merkle tree cannot be evolved directly as new data records are added because old node calculations cannot be reused. In some embodiments, multiple Merkle trees leading to different public keys may be generated with different key tags in parallel when new data records are added to the data series.

The systems and methods described herein relate to a general model for a data series authentication scheme (DSAS) and provide a framework for the use of Merkle trees to create public keys. This framework may be applied in multiple applications. For example, the framework may be applied to the Domain Name System Security Extensions (DNSSEC) as, for example, in the context of synthesized hash-based zone signing. Within this disclosure, the term Merkle Tree Public Key (MTPK) is used as an alternative to the term synthesized hash-based zone signing key as it enables the approach to be used for both DNSSEC Key Signing Keys (KSKs) and DNSSEC Zone Signing Keys (ZSKs), as well as signing keys for other systems and applications employing public key cryptography, such as those involving an internet public-key infrastructure, a certification authority (CA), a certificate status responder, a certification authority combined with a delegated certificate status responder, an identity provider, a code signer, and/or a payment authority, etc. Although some embodiments are described with respect to DNSSEC, one of ordinary skill in the art would understand, based on the disclosure herein (and appendices herewith), that the embodiments may be applied more generally and/or to such other systems and applications.

The methods address operational issues that have not been previously addressed. For example, previous DSAS approaches fail to address issues related to maintaining a data series over time to enable creating and evolving authenticators to maximize the life of witnesses and reference values and to minimize witness sizes. Methods are also defined for deterministic creation of a Merkle tree and witness structures. These methods accommodate data series and subseries whose size is not a power of two. Additionally, methods for addressing issues relative to DNSSEC zone signing are expanded on and additional issues defined and addressed by the disclosed systems and methods.

In particular, systems and methods are disclosed throughout this disclosure, within respective sections, that relate to methods and optimizations for creating and updating Merkle tree authenticators, reference values, and witnesses; and methods and optimizations for creating and maintaining data series including RRsets and MTPKs that authenticate the RRsets.

Merkle Trees as DSAS Embodiments

Authentication techniques may be implemented using a tree, such as a Merkle tree. The concept of a data series authenticator and a Merkle tree authenticator as an embodiment of a data series authenticator is that a single reference value can be used for verifying that a data value is a member of a data series. The reference value is an element of a data series authenticator. The authenticator can also be used to create witnesses that can then be used in conjunction with a reference value to verify that a data element is a member of the data series. Verification includes a series of calculations that confirm that the data element and witness are consistent with the reference value. In Merkle tree embodiments, authenticators include nodes derived from the data elements in the data series using a tree structure and reference values are authenticator nodes that are derived based on the values of subordinate nodes in the tree. A single reference value could be the root of the tree that is able to authenticate the data elements in the data series.

Cryptographically secure hash algorithms may be used for calculating values in an authenticator. An authenticator may be built using an algorithm that starts by calculating hashes for each data element in a data series as the first set of nodes in the authenticator, and then continuing by hashing sets of nodes into parent nodes, with this continuing until a final node is calculated covering the nodes that have not previously been used as input in calculating a node. An authenticator formed in such a way that every node is included as an input to a hashing operation at most once may be referred to as a Merkle tree. An authenticator wherein a node may be included as input to a hashing operation more than once in the process of calculating the final node may be referred to as a Merkle directed acyclic graph (DAG), or as simply a Merkle graph. The terms may be used interchangeably for convenience when referring to an authenticator wherein a final node covers other nodes through one or more levels of hashing operations, unless the context specifies a particular data structure of one form or the other.

Witnesses include the hash values of selected nodes from the authenticator for a data series. The nodes in a witness are selected based on being siblings to nodes that are calculated during verification. Verification then includes calculating a hash for a data element, then calculating a parent node using that hash and a sibling hash found in the witness and repeating this process until the nodes in the witness have been used. The final calculated node is compared to the reference value for the authenticator to determine whether the data element is in the data series. (The foregoing assumes that nodes have a single sibling, i.e., "a sibling hash found in the witness." In some embodiments, verification may be adapted such that one or more nodes may have multiple siblings, each sibling found in the witness, wherein each such node is hashed together with its multiple siblings in a defined order; and/or such that one or more nodes may have no siblings, wherein each such node is hashed alone during verification.)

In a simplistic model of a data series authenticator, an authenticator, reference value, and witness for the data elements in a data series may include a hash of a concatenation of the data elements in the data series. This model quickly becomes impractical as verification relies on the verifier have access to the elements in the data series. Additionally, the computational resources would be excessive when applied to a large data series.

Merkle trees serving as authenticators with their root as a reference value provide a data structure for an efficient algorithm for verifying a data element is a member of a data series. In a Merkle tree, leaf nodes may include hashes of individual data elements and each leaf node may be uniquely identified with a leaf-specific identifier, such as an integer in the range of 1 to n where n is the number of elements in the data series. Hashes of concatenations of successive pairs of leaves include the parent nodes for the leaves. Likewise, hashes of successive pairs of the previously calculated parent nodes form the next level of parent nodes. This process continues until a single parent node is calculated for a level of parent nodes containing two nodes. The final calculated parent node, the root of the Merkle tree, is the reference value for the authenticator. Each non-leaf node (internal node) in a Merkle tree may be identified by the range of identifiers that are descendants of the node. For instance, if a node has children that are leaves 1 and 2, then the node may be identified as "1:2".

FIG. 1 provides an example of a Merkle tree 100 that serves as an authenticator for a data series 102 with five elements according to an embodiment. The diagram depicts the node identifiers 103 for the Merkle tree schemes according to the embodiment and the data series element identifiers 101. According to embodiments described herein, the value of each internal node 106 or leaf node 104 is a hash of a concatenation of a tree identifier for the Merkle tree, a node identifier 103, and the node values of the immediate descendants of the node. For internal (i.e., non-leaf) nodes, the descendants are the left and right children of the node. In some embodiments described herein, node identifiers 103 for the internal nodes 106 include a [L:R] (e.g., left: right) value where L and R are different (R>L) and correspond to the lowest numbered and highest numbered data series element identifiers 101 for a range of data series elements that are eventual descendants of the node. For leaf nodes, the data series element with the same identifier as the node is the single descendant of the node. In some embodiments described herein, node identifiers 103 include a [L:R] (e.g., left: right) value where both L and R are the same and correspond to the data series element identifier 101 for a data series element, and where a single identifier [i] where i=L=R may be used in place of the two identifiers in some embodiments. Other node identifiers 103 may be employed in other embodiments.

Witnesses for Merkle trees may be referred to as authentication paths. Witnesses include sibling nodes to be used in calculating Merkle tree nodes during verification of whether a data element is a member of the data series as described above. In an example of a witness for data series element 2 authenticated by the example Merkle tree illustrated in FIG. 1, the witness would include the hash values at the following nodes: leaf node identifier [1], internal node identifier [3:4], and leaf node identifier [5].

Data series elements are verified by performing a series of calculations on the data series element, the values from a witness for the data series element, and intermediate calculated node values. Verification calculation culminates with a calculated verification value for the data series element. Verification is successful if the calculated verification value matches the value of the root node 108 of the Merkle tree that is the reference value for the authenticator. In an example of verification of data element 2 using the example Merkle tree and witness described in this section, the following series of calculations would be performed:

(1) the leaf value for data series element 2 is calculated as the hash of a concatenation of the tree identifier for the Merkle tree, the leaf identifier [2], and the value of data series element 2;

(2) the value for the parent node for the leaf would be calculated as the hash of a concatenation of the tree identifier for the Merkle tree, the parent node identifier [1:2], the value of the first element of the witness (leaf node[1]) and the previously calculated value for the leaf node for data series element 2 (leaf node[2]);

(3) the value for the next ancestor node[1:4] would then be calculated as the hash of a concatenation of the tree identifier for the Merkle tree, the ancestor node identifier [1:4], the value of the previously calculated node [1:2], and the next element of the witness (node[3:4]); and (4) the value of the next ancestor node[1:5] which is the calculated verification value would then be calculated as the hash of a concatenation of the tree identifier for the Merkle tree, the ancestor node identifier [1:5], the value of the previously calculated node[1:4], and the next and final element of the witness (leaf node[5]).

Then, the calculated verification value is compared to the value of the root node of the Merkle tree (node[1:5]). If the values match, then the data series element is verified as being in the data series that is authenticated by the verification value of the Merkle tree that includes the authenticator for the data series. If the values do not match, then it is not verified as being in the data series that is authenticated by the verification value of the Merkle tree that includes the authenticator for the data series.

Characteristics of Merkle Trees that Support Optimizations

There are several characteristics of Merkle trees as authenticators and their roots and other internal nodes as reference values that can be leveraged in optimizing Merkle tree authenticator evolution for an evolving data series. The first is that a Merkle tree is used for generating witnesses for the data series for which its root is a reference value. If a point is reached where no more witnesses are to be generated, the Merkle tree can be discarded. In an embodiment, the reference values and witnesses are preserved as verification uses witnesses and the reference values associated with the witnesses. The collection of reference values and witnesses for the data values in the data series, effectively has the same information as the original tree from which they were obtained.

A second characteristic is that any subtree of a Merkle tree can act as an authenticator for the data series elements that are covered by the leaves of the subtree. This provides options for publishing reference values and witnesses based on the roots of subtrees, i.e., on internal nodes. In some scenarios, this capability could be leveraged to have subtrees, reference values and witnesses defined for verification of unchanged portions of an encompassing and evolving data series, and where the prior authenticator and reference value for the entire data series may no longer be valid. In some cases, witnesses that would be updated due to data series changes could be discarded and witnesses for unchanged data series elements could be created or preserved relative to a reference value for a subtree that authenticates the unchanged data series elements. A witness for a data series element authenticated by a reference value from a subtree may easily be derived by truncating unneeded elements from an existing witness tied to a reference value for a parent or ancestral Merkle tree.

Another capability that Merkle trees provide is that in some scenarios, data series elements can be arranged to group together data elements that are unlikely to change (e.g., a predetermined group of data elements), such that a significant portion of the Merkle tree would not be recalculated when other elements of the data series change. A number of the elements and embodiments described herein take advantage of these characteristics so as to minimize the impact of an evolving data series on a constrained set of reference values to be published for the data series and to maximize the lifespan of those reference values.

Exemplary Elements

The systems and methods described herein are intended to address efficient use and evolution of Merkle tree authenticators and verification values for an evolving data series and also to minimize the security impact of evolving Merkle trees and witnesses. For example, the security of the Merkle tree is improved by using techniques that increase the difficulty of performing second-preimage attacks on the hash values that include nodes in the Merkle tree. The improvements are relative to the security properties of a Merkle tree whose nodes include hashes of child nodes and/or data series elements. In another example, the structure of Merkle trees and witnesses are deterministic based on a node identifier scheme for the Merkle tree.

In another example, the tree creation, witness creation, and verification may be accomplished without explicit input of node identifiers even when node identifiers serve as inputs to the hashing algorithm used to calculate node values. Instead, the deterministic structure of the tree may allow determination of node identifiers during tree creation and modification, witness creation, and verification based solely on knowledge of a root node identifier and identifiers for data series elements. This minimizes the size of representations of Merkle trees and witnesses as node identifiers may or may not be recorded other than the root node identifier and data series element identifiers that determine leaf identifiers. These characteristic addresses scenarios where there are constraints on witness sizes and may also be compatible with hash input constructions that have tighter security bounds (because fewer options are available to a potential adversary).

In another example, appendices to a data series resulting in updates to the Merkle tree authenticator for the data series may be handled by an algorithm that can update the Merkle tree with a modest amount of node calculations, with this being on the order of delta*$\log_2$(N) where N is the number of elements in the data series after a delta of new data elements are appended, which reduces the computing power used for updating the tree for an evolving data series. Moreover, it is desirable in some embodiments that a Merkle tree authenticator for a data series that has had elements removed from the front be derivable from the prior Merkle tree for the data series with an algorithm that performs a modest number of recalculations, with this being on the order of delta*$\log_2$N where N is the number of elements in the data series before delta elements are removed.

Creating and Updating Merkle Tree Authenticators for an Evolving Data Series

Several methods and operations are described for creating and evolving Merkle trees as authenticators for an evolving data series herein. The operations may be used as embodiments of methods for efficient generation and updating of Merkle trees as data series authenticators for an evolving data series. The operations provide efficient Merkle tree generation and efficient updating of a Merkle tree so that it authenticates an updated data series. The operations may be used according to usage constraints to enable efficient split and merge operations.

These operations may use deterministic algorithms to create and update Merkle trees based on a node identifier scheme and split operation that defines a partitioning scheme. Some embodiments of these operations achieve at or near theoretical maximum levels of efficiency (e.g., thus reducing computational power used) as they minimize the number of Merkle tree nodes that are calculated during Merkle tree creation and Merkle tree evolution. These operations determine tree structure based on the node identifier scheme and the starting and ending indexes for the data series elements the Merkle tree will authenticate. This capability eliminates the need to include node identifiers in witnesses, thereby reducing or minimizing witness sizes.

In some embodiments, the operations for creating and updating a Merkle tree support garbage collection of Merkle tree nodes that are no longer used because they are not an element of an updated Merkle tree authenticator. In these embodiments, Merkle tree nodes are marked during tree creation and updating. The mark may indicate that a tree node is valid or that a tree node is invalid or no longer valid. In some embodiments, the mark may be a tree version number that is associated with the node. Methods for garbage collection may then assess marks associated with nodes to determine whether a node is currently in use. In some embodiments, Merkle tree nodes are not marked during tree creation and updating, but are rather marked for garbage collection by a function that traverses currently valid nodes in a Merkle tree to mark them as current and then removes the nodes that were not marked as current. In other embodiments, garbage collection may be accomplished by, for example, but not limited to, removing nodes when they are identified rather than marking them and then removing the nodes that are descendants of them. Those with skill in the art will be able to discern other methods for garbage collection based on known practices.

In some embodiments, when the source data for a data series element is updated, it may be desirable to create a new data series element to reflect the updated source data and either insert this into the data series or append it to the data series. In these embodiments, the prior data element may remain in the data series. These embodiments may be applicable for scenarios where copies of both the new data series element and the prior data series element can be considered valid at some moment in time. In an example of this scenario, an entity may have received and cached (e.g., stored) a prior data series element and use cache management policies that consider a cached data series element to be valid until a time-to-live (TTL) value for it to expire. In these embodiments, it may be desirable for witnesses that verify the prior data series elements remain valid during the time period when the prior data series element is cached. In an alternative embodiment, witnesses may be cached until a TTL value expires, in which case a prior version of a data series element may be provided to the caching entity and validated using the cached witness prior to TTL expiration.

In some embodiments, the operations rely on data series elements being identified as a consecutive set of positive integers. Other embodiments may rely on alternative identifier schemes. In some embodiments, the node identifier scheme includes Merkle tree node identifiers that include [L:R] pairs, where L is the integer identifier for the lowest numbered leaf that is a descendent of the node and R is the integer identifier of the highest numbered leaf that is a descendent of the node. In some embodiments, [L:R] identifiers may be used to calculate an index that serves as a unique node identifier. In some embodiments, a unique index for a node may be used to calculate an [L:R] value for a node within a Merkle tree. In some embodiments, the indexes form an ordered series of integers. In some embodiments, indexes may be used locate a node within memory or a storage medium. According to one or more embodiments described herein, node identifiers from any scheme (e.g., the schemes described herein) may be used. For example, schemes that deterministically determine unique node identifiers may be used. Such schemes may provide desired security properties.

In some embodiments, security objectives may desire node identifiers to be an input to hashes that include nodes in the Merkle tree. The deterministic nature of the Merkle tree structure in certain embodiments may enable determination of these identifiers during Merkle tree construction and updating, witness creation and data element verification. During Merkle tree construction and update, top-down construction methods determine node identifiers based on a series of calculations that take the root node, i.e., reference value identifier as an initial input. Bottom-up construction methods may also be defined that create Merkle trees compatible with those produced by top-down construction methods. (Top-down refers to the generation of node identifiers for a child of the root node first, followed by successive descendants and eventually a data element's, i.e., leaf element's, parent node. Bottom-up refers to the reverse: generation of node identifiers for the parent of the leaf element, followed by successive ancestors and eventually a child of the root node.) During witness generation and verification processing, an efficient top-down method determines node identifiers based on a series of calculations that take as input the reference value identifier and the identifier for the leaf corresponding to the data series element a witness is applicable to.

In some embodiments of Merkle tree authenticators, it may be desirable to have identifiers explicitly associated with Merkle tree nodes and nodes within witnesses. These embodiments support operations, such as using data series element values in determining the structure of the Merkle tree. In these embodiments, node identifiers to associate with a node may be determined during Merkle tree generation. In some embodiments, node identifiers are stored in association with Merkle tree nodes. In some of these embodiments, paths through the Merkle tree are determined by explicit links between parent nodes and their child nodes. Witnesses' creation in these embodiments may include associating node identifiers with nodes included in the witness and nodes to be calculated during verification of a data series element using the witness.

Additional operations that leverage the Merkle tree structures created by the core functions provide efficient mechanisms for the following capabilities: (1) splitting a Merkle tree into multiple Merkle trees each of which authenticates a subseries of a data series authenticated by the Merkle tree that was split; (2) merging Merkle trees to create a Merkle tree that authenticates a union of the data series elements authenticated by the joined Merkle trees; (3) updating a Merkle tree to reflect changes in data series elements; (4) updating a Merkle tree to reflect additions to a data series; and/or (5) updating a Merkle tree to reflect deletion of data series elements.

In sum, the operations address evolution of a Merkle tree authenticator for an evolving data series. Data series evolution may also be enhanced by optimization algorithms that identify subseries to be authenticated by long-lived reference values from subtrees of a Merkle tree authenticator. The identification of subseries and reference values for them may include a trade-off analysis relative to: the number of elements authenticated by a reference value; the frequency of changes to the data series or to subseries that may be authenticated by reference values; the expected life of a reference value; the number of reference values to authenticate the entire data series; and/or the frequency with which a reference value may be used for verification. Other factors may be used in the trade-off analysis. A key factor in assessing data series changes is determination of the number of Merkle tree nodes that are to be calculated due to changing values in the data series or changing identifiers for data series elements.

The methods implemented by the disclosed operations may be used to manipulate or update Merkle trees to address changes to an evolving data series. These changes can be thought of as set operations on the data series. These operations may be performed to maximize the life of reference values and witnesses applicable to them. This is enabled when the functions that include the operations are used to create authenticators for sets of data series elements that optimize the number of consecutive data series elements in the sets that are projected not to change and to preserve the identifiers used for those elements. The methods enable Merkle trees authenticating these data series elements to include larger subtrees that are unchanged due to data series updates. In support of manipulating a data series for these purposes, the operations may be used to address cases where: data elements are deleted from the data series and marked as deleted; data series are split due to gaps formed by deletions; data series are compacted to eliminate gaps formed by deletions; minimizing the size of Merkle trees created as authenticators for an evolving data series; efficient creation/updating of Merkle tree authenticators when data series elements are updated with a new value; efficient creation/update of Merkle tree authenticators when data series elements are deleted; and/or data series reordering so that long lived reference values may be created based on Merkle tree authenticators for subseries of a data series.

Throughout this document, the following syntax is used in code examples:

== is the equality operator

!= is the inequality operator

>, >=, <, <= are used to represent greater than, greater than or equal, less than and less than or equal ^ is used as the exponentiation operator

|| is used as the concatenation operator

% is used as the modulo operator

"and" is used as the Boolean and operator

"or" is used as the Boolean or operator log 2(N) is a function that computes the log base 2 of N.

int (V) is an algorithm that returns the largest integer<=V

Variables are declared implicitly on first use

Variables are typed based on usage

A[ ] declares an array variable A

A[I] is an array element identified by identifier I

A[L:R] is an element of a collection A[ ] identified by a composition of the values of L and R A.F indicates F is an element of a structure A top(A[ ]) is a function that returns the first element of array A[ ]

pop (A[ ]) is a function that returns the first element of array A[ ] and removes it from A[ ]

append(D, A[ ]) appends data element D to array A[ ]

append (D[ ], A[ ]) appends data elements in array D[ ] to array A[ ]

join (collectionA[ ], collectionB [ ]) joins data collections A and B "in-place", returning collectionA as the product of the joining hash (D) creates a hash of D Operations for Creating and Updating Merkle Trees The following describes core operations of an embodiment for creating and updating Merkle trees whose structure is deterministic based on the identifiers for data series elements authenticated by a Merkle tree node and describes an embodiment of a function that determines the identifiers for data series elements that are authenticated by a node's children.

In an embodiment, A=genAuth( )—returns a Merkle tree authenticator A which has no nodes, but which can be used as input for constructing a Merkle tree. A may have the following structure:

A.D[ ]—The data series that is authenticated by A. A.D[ ] is an array of data elements where each successive data element A.D[I] is identified by I as the data element identifier and with I being the next value in a sequence of consecutive positive integers;

A.node[ ]—A collection of nodes that include the Merkle tree authenticator where each node is associated with a [L:R] identifier pair and where L and R are respectively the lowest and highest data element identifiers for data elements that are used in calculating descendent leaf nodes of the node;

A.L is the identifier for the lowest numbered element in A.D[ ] authenticable by A;

A.R is the identifier for the highest numbered element in A.D[ ] authenticable by A.

In some embodiments, A.treeID is the tree identifier for the authenticator. In some embodiments, A.treeID is set to the value of a treeID argument passed to genAuth as in A=genAuth(treeID).

In some embodiments, the operation setData Values(A, I, D[ ]) sets data values in A.D[ ] starting at identifier I to the values in D[ ].

In some embodiments, V=getReference Value (A, L, R) returns a reference value structure V from a Merkle tree authenticator A that can be used to verify data elements in data series A.D[ ]. L and R are integers which must conform to the following constraint: L>=lowest identifier for data elements in A.D[ ], L<=R, R<=highest identifier for data elements in A.D[ ]. This function will create or update the Merkle tree nodes in A.node[ ] so that it authenticates data series elements in A.D[ ] in the range of [L:R]. In some embodiments, reference value structure V may be defined as:

V.hash is the value of A.node[L:R] which includes the reference value;

V.L may be set to L; and

V.R may be set to R.

In some embodiments, V.treeID may be included and is the tree identifier for the Merkle tree authenticator from which V was derived.

Top-Down Algorithms for Merkle Tree Authenticator Creation and Update

In some embodiments, operation getReference Value (A, L, R) may be implemented with the following embodiment including a top-down recursive algorithm. This version of the algorithm creates the nodes in the Merkle tree authenticator and is therefore not as efficient as an optimized embodiment as illustrated below. Note that error checking is not performed by the algorithm. The algorithm represented in code structure is as follows:

```
function getReference Value(A, L, R) {
if (L==R) {
A.node[L:R]=hash (A.D[L]) //In some embodiments
    leaves may be identified by the integer L
    }
else {
M=chooseM (L, R)
A.node[L:R]=hash (getReference Value (A, L, M)||getRe-
    ference Value (A, M+1, R))
}
    V.hash=A.node[L:R]
    V.L=L
    V.R=R
```

```
    return V
}
```

In some embodiments, for example, that increase the difficulty of performing a second pre-image attack on hashes created by the operation getReference Value, A.treeID and the L and R values associated with a node are included as inputs to the hash function. Furthermore, if a tree identifier is used, then the element V.treeID may be set to A.treeID. In some embodiments, for example where some elements of A.D[ ] in the range of L to R are not defined, a "null" value for undefined elements may be used in calculating leaf nodes. In some embodiments, the "null" value may include the data element identifier.

In some embodiments, the operation M=chooseM(L, R) may be implemented in a variety of ways, at least one of which returns a value for M that is within the range of [L:R] inclusive. The value returned by chooseM may deterministically create the structure of the Merkle tree. Different algorithms for chooseM may return different values for M given the same L, R inputs. The differing values of M may result in the Merkle tree having different characteristics relative to tree structure and the number of nodes that must be calculated when the Merkle tree is updated to reflect changes in an evolving data series. Three examples of chooseM are provided below as embodiments that provide novel Merkle tree characteristics.

Figure 2:
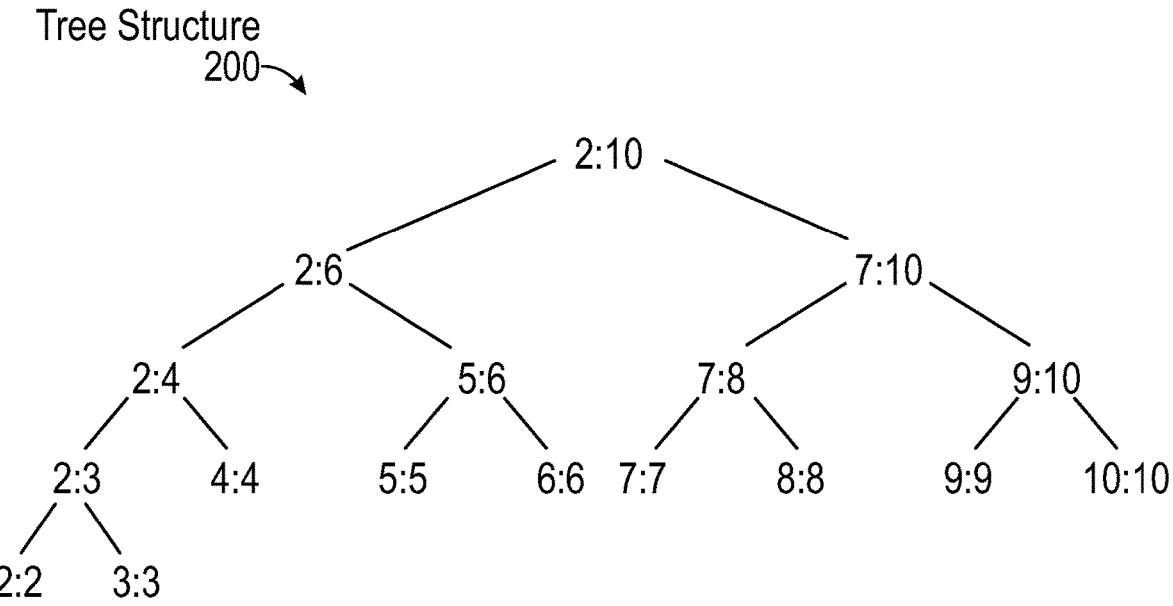
FIG. 2 illustrates an example tree structure created utilizing a Minimal Height implementation, according to an embodiment.

The following Minimal Height (i.e., first) embodiment of chooseM will result in a Merkle tree that will have the least possible number of levels. (Other embodiments may also achieve the same number of levels as the Minimal Height embodiment in some circumstances.) In particular, the Minimal Height embodiment has the characteristics that updates of the Merkle tree so that it authenticates an updated data series may use on the order of N nodes to be calculated where N is the number of elements in the data series. FIG. 2 depicts a tree structure variant based on the Minimal Height embodiment of chooseM. In particular, FIG. 2 depicts a tree structure 200 using the Minimal Height embodiment where the L,R values for the initial call to getReference Value are L=2 and R=10. The Minimal Height example may be represented in code form (and other functionally equivalent code forms) as follows:

```
function chooseM (L, R) {
    return int (L+(R−L)/2)
}.
```

Figure 3:
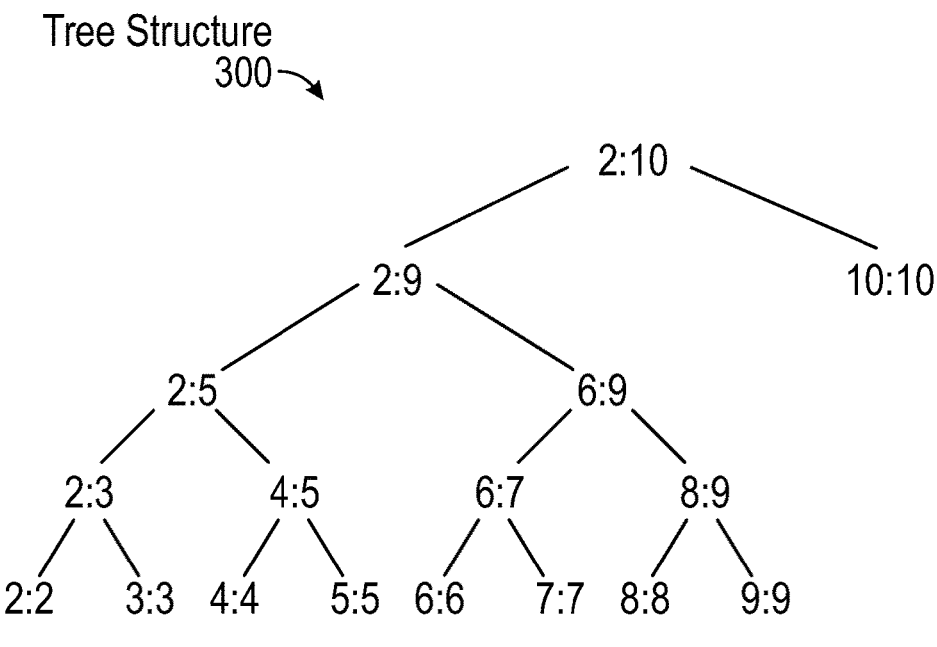
FIG. 3 illustrates an example tree structure created utilizing a Consistent Structure implementation, according to an embodiment.

The following Consistent Structure (i.e., second) embodiment of chooseM will result in Merkle trees that will produce trees with the same height as the Minimal Height embodiment of chooseM, and will produce identical Merkle tree structures (i.e., identical tree shapes) for any L, R inputs where L>=1 and R>L that have the same number of leaves, i.e., R−L+1, and which will use on the order of delta*log 2(N) node calculations when the Merkle tree is updated to authenticate a data series which has had a sequence of length delta data elements appended to it. FIG. 3 depicts a tree structure variant based on the Consistent Structure embodiment of chooseM. In particular, FIG. 3 depicts a tree structure 300 using the Consistent Structure embodiment where the L,R values for the initial call to getReference Value are L=2 and M=10. The Consistent Structure example may be represented in code form (and other functionally equivalent code forms) as follows:

```
function chooseM(L, R) {
    return L+2^(int(log 2(R−L)))−1
}
```

Figure 4:
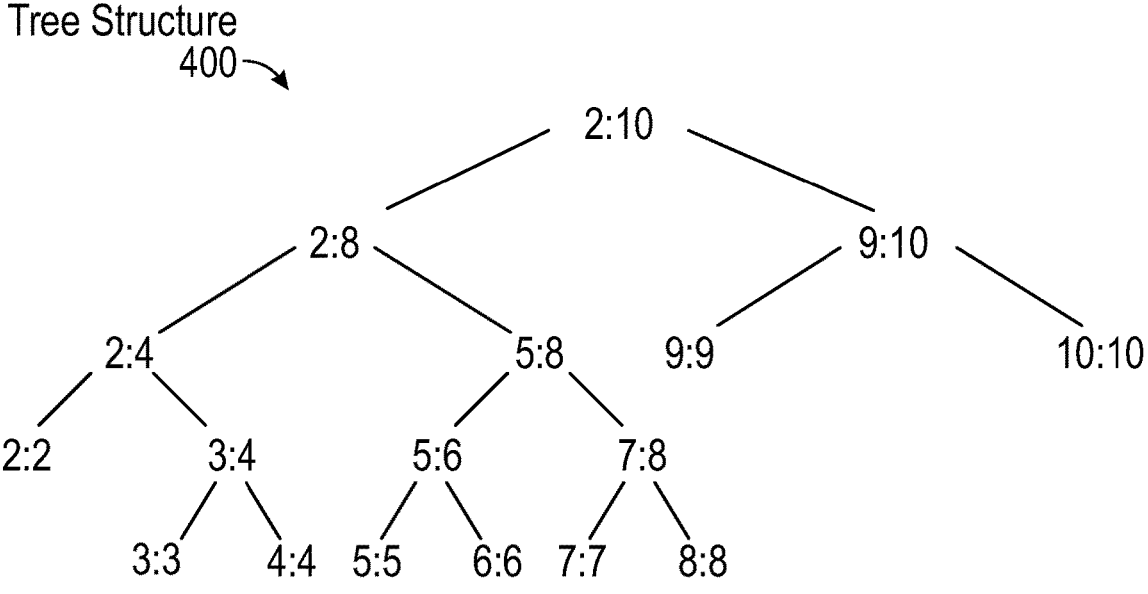
FIG. 4 illustrates an example tree structure created utilizing an Optimized Sliding Tree implementation, according to an embodiment.

The following Optimized Sliding Tree (i.e., third) embodiment of chooseM may result in Merkle trees that have up to one more level than the Minimal Height embodiment of chooseM. The Optimized Sliding Tree embodiment may produce differing Merkle tree structures based on L, R inputs where L>=1 and R>=L. The value of M calculated here is the unique value between L and R−1 that is divisible by the largest power of 2. A Merkle tree whose structure is based on this embodiment uses on the order of delta*$\log_2$(N) node calculations when the Merkle tree is updated to authenticate a data series which has had a sequence of length delta data elements appended to it. The Optimized Sliding Tree embodiment also has on the order of delta*$\log_2$(N) node calculations when the Merkle tree is updated to authenticate a data series which has had a sequence of length delta data elements removed from the beginning of the data series. FIG. 4 depicts a tree structure variant based on the Optimized Sliding Tree embodiment of chooseM. In particular, FIG. 4 depicts a tree structure 400 using the Optimized Sliding Tree embodiment where the L,R values for the initial call to getReference Value are L=2 and M=10. The Optimized Sliding Tree example may be represented in code form as follows:

```
function chooseM (L, R) {
    if ((R−1−((R−1) % 2^int(log 2(R−L)+1))))>=L) {
        return R−1−((R−1) % 2^int (log 2(R−L)+1))
    }
    else {
        return R−1−((R−1) % 2^int(log 2(R−L))
    }
}
```

A functionally equivalent and more readable version of this example may be represented in code form as follows:

```
function chooseM(L, R) {
    spanLog=log 2(R−L)
    firstBound=(R−1) % 2^int(spanLog+1)
    if ((R−1−firstBound)>=L) {
        rightOffset=((R−1) % 2^int (spanLog+1))
    }
    else {
        rightOffset ((R−1) % 2^int (spanLog))
    }
    return R−1−rightOffset
}
```

Tree Update Optimizations

As described above, various embodiments of the chooseM function will result in Merkle trees that will use differing numbers of nodes to be calculated when the Merkle tree is updated to authenticate a data series due to certain types of changes in the data series. The embodiments that seek to minimize the number of calculated nodes rely on the Merkle tree generation algorithm to record the values of each node's left and right child nodes in association with the node. According to one or more embodiments described herein, a mapping algorithm between left and right values and a sequential series of positive integers may be applied such that the left and right values are not recorded but rather are determined based on the offset of a node within a sequence of nodes indexed by a series of consecutive integers. During updates to Merkle tree, returned left and right child node values from a recursive call to getReference Value are compared to the prior values of the left and right child node values. If the values have not changed, the value of the node may or may not be recalculated. The following example of the optimized top-down getReference Value operation in code form provides this optimization:

```
function getReference Value (A, L, R) {
    if (L==R) {
        if (A.prevD[L] exists and A.prevD[L]==A.D[L]) {
```

```
            return A.node[L:R]
        }
        else {
            A.prevD[L]=A.D[L]
            A.node[L:R]=hash (A.D[L])
            return A.node[L:R]}
        }
    }
    else {
        M=chooseM (L, R)
        Lchild=getReference Value (A, L, M)
        Rchild=getReference Value (A, M+1, R)
        if (Lchild==A.Lchild [L:R] and Rchild==A.Rchild
            [L:R]) {
            return A.node[L:R]
        }
        else {
            A.Lchild [L:R]=Lchild
            A.Rchild [L:R]=Rchild
            A.node[L:R]=hash (Lchild||Rchild)
            return A.node[L:R]
        }
    }
}
```

The following examples illustrate how the number of nodes to be calculated varies for the different chooseM algorithms when the optimized getReference Value algorithm is used. The examples show boxes on the non-leaf nodes that are to be calculated when a single data element is appended to a data series with 8 elements with a starting data element identifier of 1 and an ending data element identifier of 8.

Figures 5, 6:
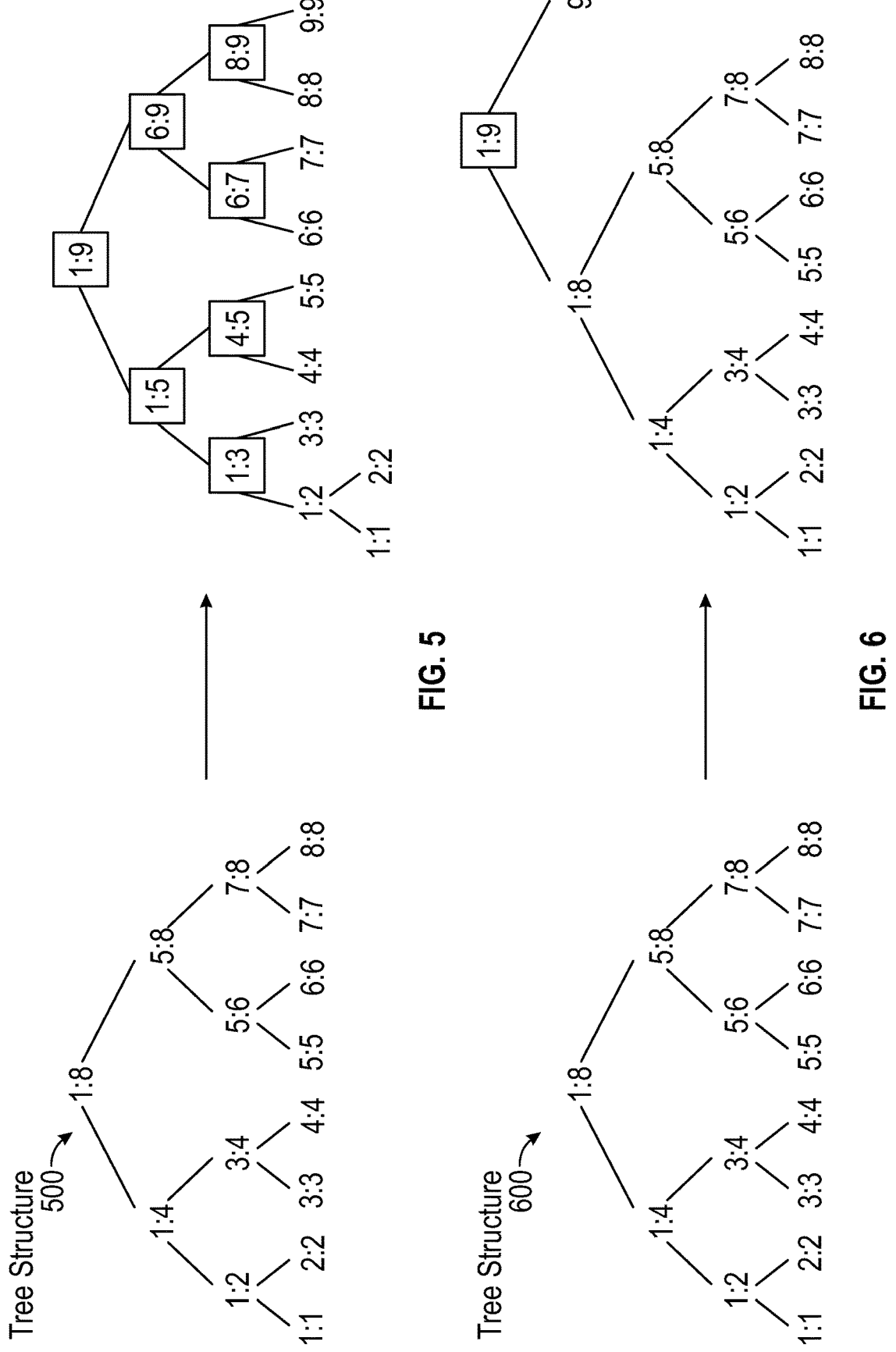
FIG. 5 illustrates an example tree structure before and after updating the tree by appending data to an underlying data series utilizing a Minimal Height implementation, according to an embodiment.
FIG. 6 illustrates an example tree structure before and after updating the tree by appending data to an underlying data series utilizing an Consistent Structure or Optimized Sliding Tree implementation, according to an embodiment.

It is to be appreciated that FIGS. 5-15 depict tree structures (or "trees") before (left) and after (right) respective operations or evolutions, the boxed node identifiers indicate the nodes on the after trees that are to be recalculated as a result of the operation or evolution. FIG. 5 depicts a tree structure 500 with the number of nodes for calculation in the Minimal Height embodiment. FIG. 6 depicts a tree structure 600 with the number of nodes for calculation in the Consistent Structure Algorithm and Optimized Sliding Tree Algorithm.

Figures 7, 8:
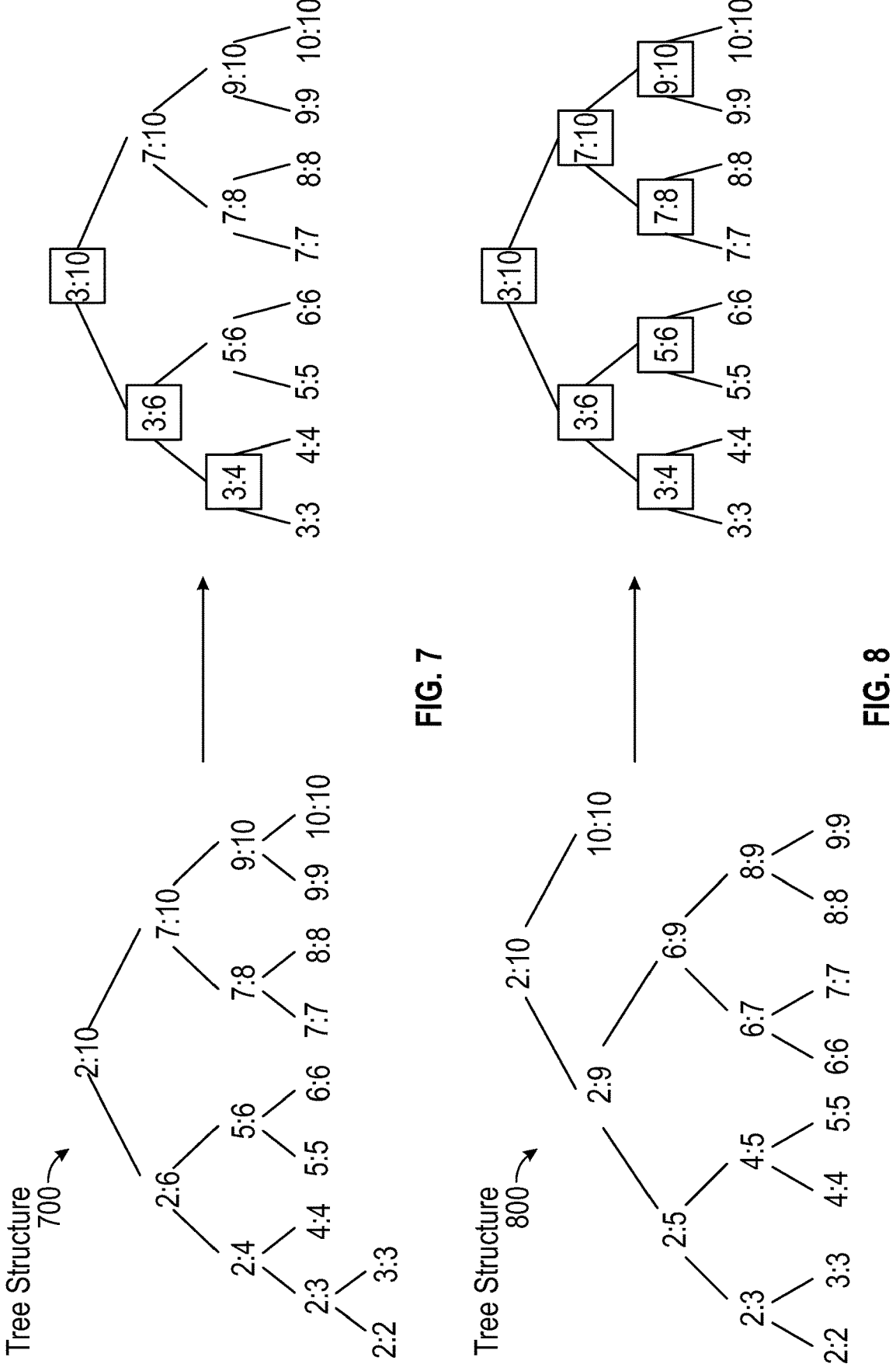
FIG. 7 illustrates an example tree structure before and after updating the tree by deleting a front data element from an underlying data series utilizing a Minimal Height implementation, according to an embodiment.
FIG. 8 illustrates an example tree structure before and after updating the tree by deleting a front data element from an underlying data series utilizing a Consistent Structure implementation, according to an embodiment.
Figures 9, 10:
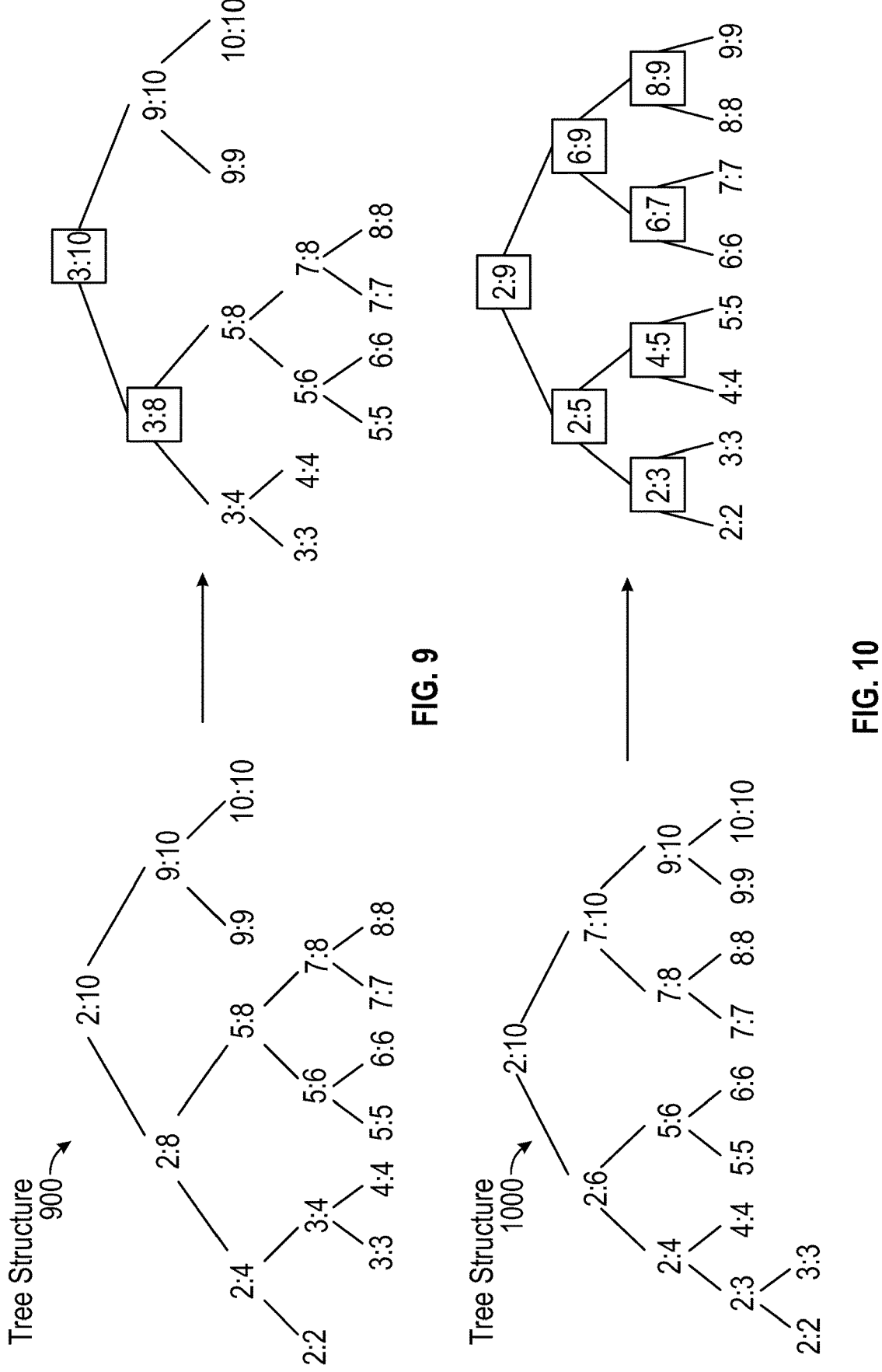
FIG. 9 illustrates an example tree structure before and after updating the tree by deleting a front data element from an underlying data series utilizing an Optimized Sliding Tree implementation, according to an embodiment.
FIG. 10 illustrates an example tree structure before and after updating the tree by deleting a last data element from an underlying data series utilizing an Minimal Height implementation, according to an embodiment.

The following examples illustrate how the number of nodes for calculation varies for the different chooseM algorithms when the optimized getReference Value algorithm is used and elements are deleted from the front of the data series. The examples show boxes on the nodes that to be calculated when a single data element is removed from a data series with 9 elements and with a starting data element identifier of 2 and an ending data element identifier of 10. FIG. 7 depicts a tree structure 700 with the number of nodes for calculation in the Minimal Height embodiment. FIG. 8 depicts a tree structure 800 with the number of nodes for calculation in the Consistent Structure embodiment. FIG. 9 depicts a tree structure 900 with the number of nodes for calculation in the Optimized Sliding Tree embodiment.

Figures 11, 12:
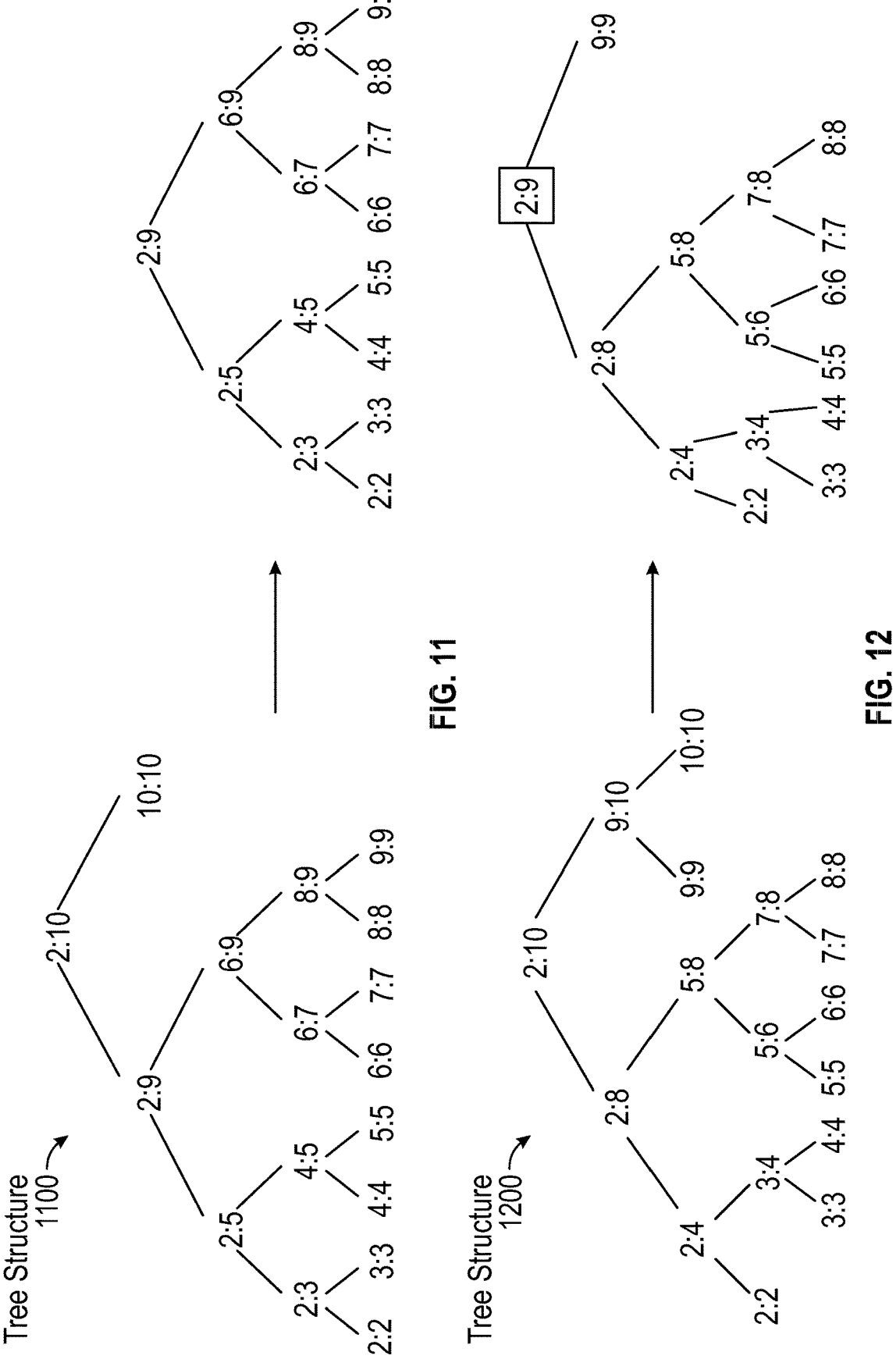
FIG. 11 illustrates an example tree structure before and after updating the tree by deleting a last data element from an underlying data series utilizing an Consistent Structure implementation, according to an embodiment.
FIG. 12 illustrates an example tree structure before and after updating the tree by deleting a last data element from an underlying data series utilizing an Optimized Sliding Tree implementation, according to an embodiment.

The following examples illustrate how the number of nodes for calculation varies for the different chooseM algorithms when the optimized getReference Value algorithm is used and elements are deleted from the end of the data series. The examples show boxes on the nodes that are to be calculated when a single data element is removed from a data series with 9 elements and with a starting data element identifier of 2 and an ending data element identifier of 10. FIG. 10 depicts a tree structure 1000 with the number of nodes for calculation in the Minimal Height embodiment. FIG. 11 depicts a tree structure 1100 with the number of nodes for calculation in the Consistent Structure embodiment. FIG. 12 depicts a tree structure 1200 with the number of nodes for calculation in the Optimized Sliding Tree embodiment.

Figure 13:
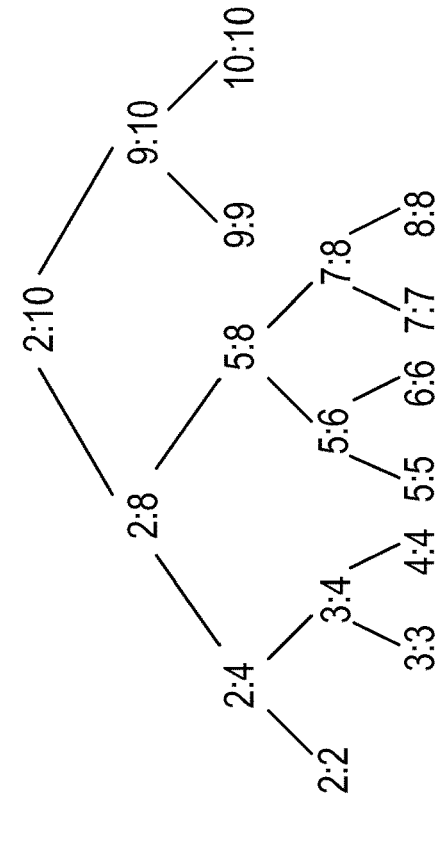
FIG. 13 illustrates example tree structures depicting how structure varies based on data element identifiers for Optimized Sliding Tree implementation, according to an embodiment.

FIG. 13 illustrates a tree structure 1300 showing how the Merkle tree structure can vary for a Merkle tree authenticator created with the Optimized Sliding Tree embodiment depending on the data series first and last element identifiers. In this example, two Merkle tree authenticators for a data series with nine data elements are shown with the difference in the structures due to the range of identifiers for the first data series being 1:9 and the range of identifiers for the second data series being 2:10.

Witness Creation and Verification Algorithms

The methods and operations described herein identify nodes to use as witness elements using a derivative of a top-down algorithm used for Merkle tree authenticator construction and updating. The derivative algorithm determines the set of sibling nodes for verification of a data series element and inserts into the witness siblings to nodes that will be calculated during verification. A witness creation method may be defined as follows: W=getWitness (A, L, R, I) creates a witness for data element A.D[I]. The witness is derived from a Merkle tree authenticator with nodes A.node[ ] that authenticates data series A.D[ ]. L and R are integers conforming to the following constraint: L>=1 and L<=R. In addition, the identifier I must be between L and R inclusive. A witness may include hash values from nodes in A.node[ ] identified for inclusion by the getWitness method. It is assumed that the relevant values of A.node[ ] have already been computed by one of the algorithms above. The operation getWitness may be implemented with the following embodiment of a top-down recursive algorithm. The compatibility with a top-down algorithm for creating Merkle tree authenticators is based on using the same chooseM algorithm used in getReference Value. Note that error checking is not performed by the algorithm. The witness creation method may be represented in code form as follows:

```
sub getWitness (A, L, R, I) {
    if (L==R) {
        W=[ ]
        return W
    }
    else {
        M=chooseM (L, R)
        if (I<=M) {
            return append (A.node[M+1: R], getWitness (A,
                L, M, I))
        }
        else {
            return append (A.node[L: M], getWitness (A,
                M+1, R, I))
        }
    }
}
```

Verification Methods Using References and Witnesses Created Using Any of the Top-Down Algorithms Embodiments of the methods for verifying data series elements use a derivative of a top-down algorithm used for Merkle tree authenticator construction as found in getReference Value. The chooseM function from getReference Value is used so that the verification algorithm may correctly determine node identifiers during verification processing. The derivative method determines the identifiers for witness nodes and nodes that are calculated as part of verification. An embodiment of a verification method may be defined as follows: status=verify (V, I, D, W) verifies that data value D is the data series element identified by I where the data series element is verifiable with reference value V using witness W. The verification method may be implemented with the following exemplary top-down recursive algorithm. Note that error checking is not performed by the algorithm. The verification method may be defined as follows in code form (and other functionally equivalent code forms):

define V as a structure where:
V.hash is a reference value including a node hash value from a Merkle tree authenticator
V.L is the identifier for the leftmost data series element verifiable with V.hash
V.R is the identifier for the rightmost data series element verifiable with V.hash
define I as an identifier for a data element within the data series elements verifiable with reference value V.hash
define D as the data element being verified as to whether it is the data series element with identifier I
define W as a witness produced by a getWitness function which uses the same chooseM function as used in getReference Value

```
function verify (V, I, D, W) {
    return (verifyNodeCalculate (V, I, D, W)==V.hash)
}
function verifyNodeCalculate (V, I, D, W) {
    if (V.L==V.R) {
        H=hash (D)
    }
    else {
        M=chooseM (V.L, V.R);
        V1=V
        if (I<=M) {
            V1.R=M
            H=hash (verifyNodeCalculate (V1, I, D, W)||top
                (W))
        }
        else {
            V1.L=M+1
            H=hash (top (W)||verifyNodeCalculate (V1, I, D,
                W))
        }
        pop (W)
    }
    return H
}
```

Batch Merkle Tree Authenticator Creation and Update

Figure 14:
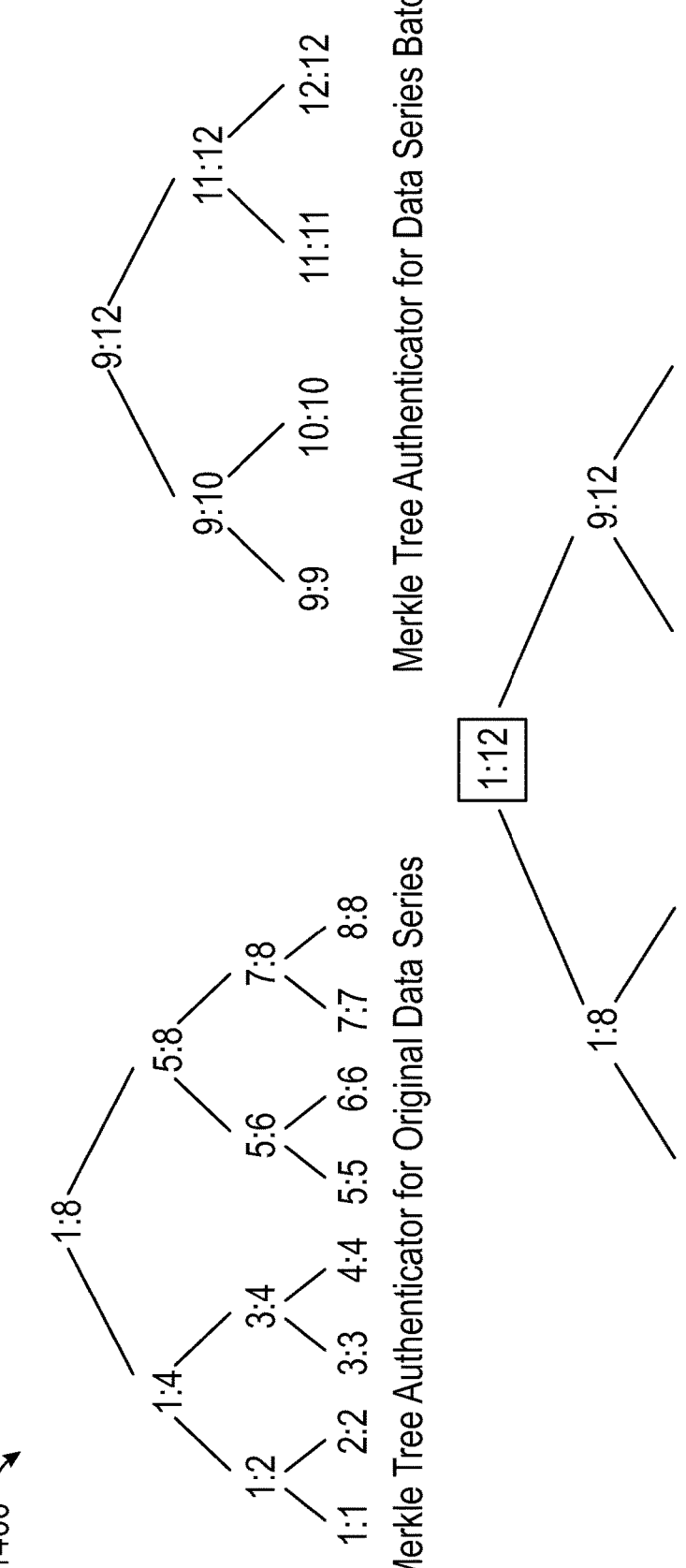
FIG. 14 illustrates example tree structures depicting a method for batch updating a Merkle tree authenticator, according to an embodiment.

Merkle tree authenticators may be more efficiently updated to authenticate an evolving data series using a batch update method, as shown in FIG. 14. An embodiment of such a batch update mechanism is described as follows. The batch update method relies on algorithms that produce the same Merkle tree structure for a set of data series elements defined by a [L:R] identifier regardless of whether the Merkle tree is an authenticator for an entire data series or is a subtree of a larger Merkle tree authenticator. The getReference Value algorithms defined herein are embodiments of such algorithms. Other algorithms may also be applicable. The batch update method embodiment assumes the use of either the Consistent Structure embodiment or the Optimized Sliding Tree embodiment. According to an embodiment, if the batch update builds balanced binary trees, then the minimal height embodiment could be used and would minimize node calculations. The batch update embodiment also uses grouping elements that are to be added to a data series into data series batches that have identifiers that start at one greater than the highest element identifier in the current data series authenticated by the Merkle tree authenticator. This allows a data series batch to be appended to the original data series with the identifiers for the combined data series being a consecutive series of integers. The method also desires that data series batches are sized such that a Merkle tree authenticating a data series batch would be a subtree of an updated Merkle tree authenticating the updated data series including a combination of the original data series and the data series batch. The method also desires that the Merkle tree structure for the updated Merkle tree be identical to the structure that would be generated by the algorithm used for creating and updating the Merkle tree authenticating the original data series. With these conditions adhered to, node calculations are minimized in updating the original Merkle tree authenticator to authenticate the updated data series. This minimization of nodes to be calculated is in comparison to update mechanisms, such as adding data elements one at a time which may result in more overall node calculations due to nodes for binding leaf nodes to the evolving Merkle tree being calculated and those nodes later being discarded due to subsequent merges.

In some embodiments, the method is further optimized if data series batches including the batch that creates the first iteration of a Merkle tree authenticator are defined such that the Merkle tree authenticator for an original data series is a subtree of the updated Merkle tree authenticator. In some embodiments, this optimization minimizes the number of node calculations used to incorporate the Merkle tree accumulator for the batch update into the updated Merkle tree authenticator. In some embodiments, this optimization results in newly calculated nodes including the set of nodes that are ancestors of the root nodes of the Merkle trees for the original Merkle tree authenticator and the Merkle tree authenticating the data series batch. FIG. 14 depicts an example of a method 1400 for batch updating a Merkle tree authenticator.

Figure 15:
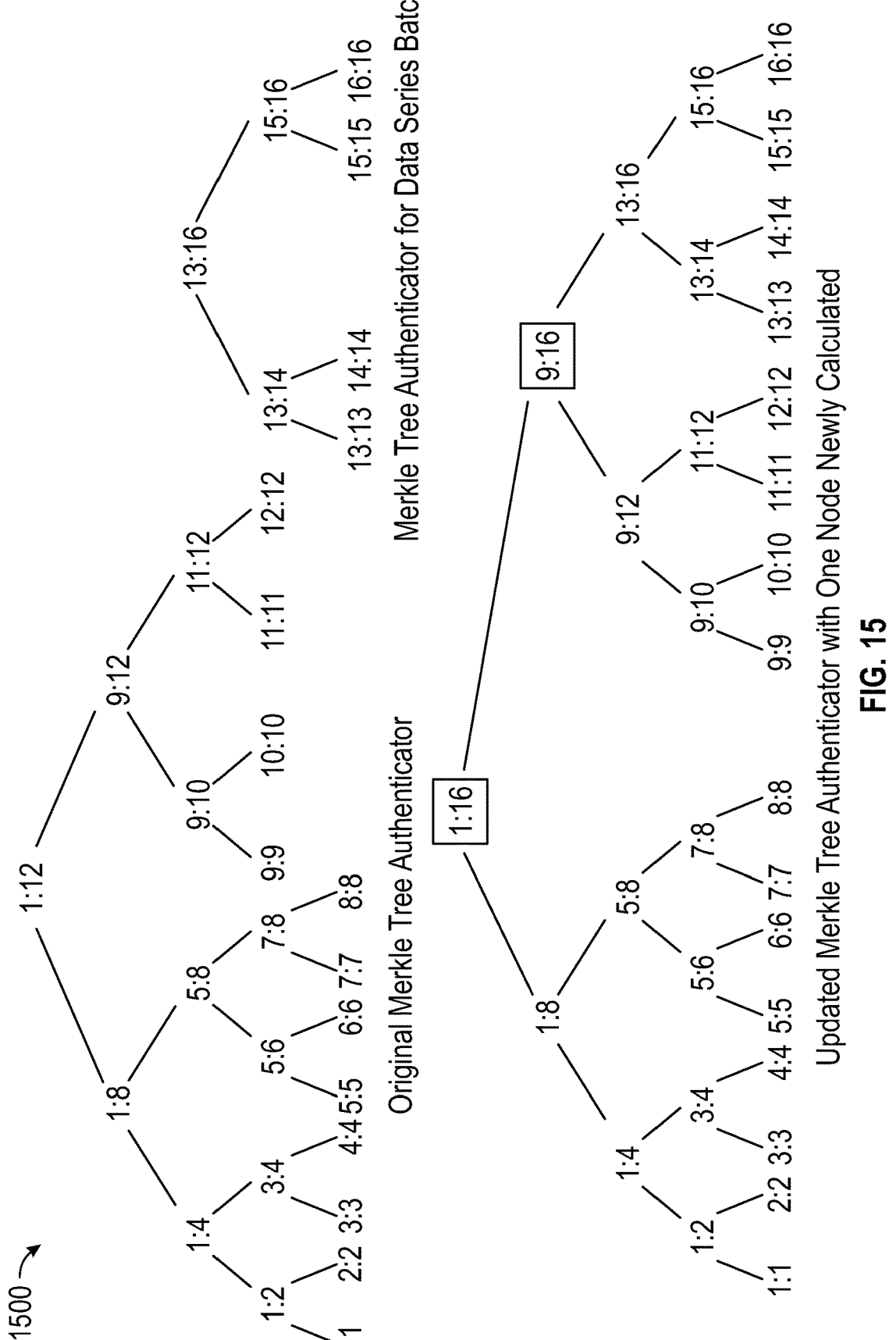
FIG. 15 illustrates example tree structures depicting method for batch updating by joining trees, according to an embodiment.

In some embodiments, another optimization of the method is to identify a subtree of the original Merkle tree authenticator that can be joined to a Merkle tree authenticator for a batch update such that a single node can be a parent of both Merkle trees. The original Merkle tree is then updated to incorporate the joined trees. A method 1500 showing this optimization is illustrated in FIG. 15 where the subtree joined to the original Merkle tree has a root node with a 13:16 identifier. FIG. 14 and FIG. 15 depict method 1400 and 1500, respectively, for batch updating by joining subtrees, according to embodiments.

In some embodiments of batch updating methods, the left and rightmost identifiers for the union of the original data series and a data series batch are used in determining if a Merkle tree authenticator for the data series batch would be a subtree of an updated Merkle tree authenticating the updated Merkle tree. In these embodiments, the root [L:R] identifiers for the subtree for the data series batch is evaluated relative to the overall [L:R] root identifier to see if the subtree is valid. For some Merkle tree construction and update algorithms, this evaluation can be performed with a single expression. For instance, for Merkle trees constructed with the Consistent Structure embodiment, the following operation depicted in code form can be used to determine if an [L:R] value for a subtree would be subtree of the Merkle tree:

```
function checkSubtree (treeL, treeR, subtreeL, subtreeR)
{
    span=subtreeR-subtreeL+1
    p=log 2(span)
    offset=treeL-1
    if (isInteger (p)) {
```

```
        return isInteger ((R-offset)/span)
    }
    elsif (subtreeR==treeR) {
        bR=2^(int(log 2(treeR-treeL+1))+1)
        bL=L-offset-1
        bSpan=bR-bL
        return isInteger (log 2(bSpan))
    }
    return false
}
```

A more generalized unoptimized version of checkSubTree uses an algorithm that works as follows. First, the leftmost and rightmost identifiers for the updated data series are determined. The tree traversal algorithm from getReference Value is then performed starting with those identifiers until either a match is found for the L and R values of the subtree, or the recursive traversal completes.

Methods for Splitting, Merging, and Extracting Subtrees for Merkle Tree Authenticators Methods and operations described herein address efficient splitting, extracting subtrees from Merkle tree authenticators, and merging of Merkle tree authenticators. The motivation for using these functions include: (1) creating long-lived reference values for subseries of a data series that are anticipated not to change during some period of time; (2) providing shorter witnesses for data elements that are verified by a reference value of a subtree; (3) providing means for merging long-lived Merkle tree authenticators to create a long-lived Merkle tree authenticator for a larger portion of a data series; and (4) providing for efficient updating of a Merkle tree authenticator so that it authenticates data series batches that already have a Merkle tree authenticator. Additional motivations for using the functions may be discerned.

The methods for determining data series elements to authenticate with Merkle tree authenticators created by splitting, extracting, and merging Merkle trees may take into account one or more of the following factors: (1) age of a reference value; (2) the number of desired reference values; (3) reference value publishing schemes that seek to ensure that an optimal set of reference values are published to cover an evolving data series taking into account witness validity periods, use of witnesses and reference values, and the amount of change in a data series over time; (4) the likelihood that a reference value is no longer valid due to changes in a data series; (5) the age of data elements; (6) the relationships between data elements, or any combinations thereof. Other factors may be taken into account.

The methods and operations are provided by a combination of previously defined methods and methods that implement the splitting, extraction and merging methods. The following operation definitions may be employed in some embodiments of these methods: L=getL (A): returns the identifier for the leftmost leaf of the Merkle tree authenticator A; R=getR (A): returns the identifier for the rightmost leaf of the Merkle tree authenticator A.

In some embodiments, subA=getAuth (A, L, R): returns a Merkle tree authenticator includes a subtree of A if it exists and where the subtree has a root node with identifier [L:R]. The function checkSubtree may be used to see if the subtree exists. Note a subtree can include A in its entirety. If the subtree has a valid R, L identifier for a root node but it has not yet been created, then it is created. A Merkle tree authenticator including a valid subtree and the data series elements it authenticates is then returned. In some embodiments, the elements of subA.node[ ] may include elements residing in A.node[ ]. In some embodiments, the elements of subA.node[ ] may include elements copied from A.node[ ].

In some embodiments, the data series including subA.D[ ] may be a subseries of A.D[ ] and include elements residing in A.D[ ]. Is some embodiments, subA.D[ ] may include copies of elements from A.D[ ]. Note that arbitrary trees that are not subtrees of A may be generated as-needed using the getReference Value function for a desired [L:R] range and then the generated subtree returned by calling getAuth with the desired [L:R] values.

In some embodiments, D[ ]=getData (A, L, R) returns a data series including elements from A.D[ ] with identifiers in the range of L to R. In some embodiments, Amerged=merge (A[ ]) returns a Merkle tree authenticator including a merger of a set of Merkle tree authenticators that include the array A[ ]. The Merkle tree authenticators being merged in such embodiments must authenticate data series that do not have duplicate identifiers and for whom the union of their data series identifiers forms a consecutively ordered series (e.g., no gaps in the series), for instance a consecutive series of integers. Embodiments of merge may treat the first authenticator in A as the original Merkle tree authenticator and then iterate across the remaining elements in A[ ] to evolve the original Merkle tree authenticator into a Merkle tree authenticator that authenticates the concatenation of the data series for the Merkle tree authenticators in A[ ]. Each iteration within Merge may use methods for Batch Merkle Tree Authenticator Creation and Update to efficiently evolve to the final Merkle tree authenticator. This is achieved if the data series for the Merkle tree authenticators in A conform to constraints for the methods. Otherwise, a more generalized method could be used. The generalized method may start with a call to genAuth to initialize the Merkle tree authenticator to be returned. The method may then iterate through A[ ] using getData to get the A.D[ ] values and setData to add the data values to the data series for the new Merkle tree authenticator. After this is complete, a call could be made to getReference Value for the new Authenticator so as to create the A.node[ ] structure that includes the Merkle tree for the new authenticator. According to an embodiment, plurality of data series may be combined into a single data series and then added to the tree authenticator. Additional methods for sequencing the data series elements for the authenticators in A[ ] may be apparent to those with some skill in the art.

In some embodiments of using merge as a means for doing batch updating of a Merkle tree authenticator, any of the previously defined tree construction algorithms may be used for Merkle tree construction subject to the restriction that constructed and updated trees have a number of leaves that is a power of 2. Merkle tree authenticators that conform to this constraint are referred to herein as Optimal Merkle Tree Authenticators (OMTA).

Some embodiments may include a first generation OMTA that is created such that it authenticates the largest subseries of a data series where the subseries has a number of elements in the subseries that is a power of 2. The elements of the data series that are not part of the subseries are then constituted as a separate transactional data series. Additional data elements may be appended to the transactional data series until it contains a subseries with a desired number of elements that is a power of 2 and where an OMTA can be created for the subseries such that the OMTA may be efficiently merged with the original OMTA to create a second generation OMTA and a new transactional data series formed from data elements not authenticated by the next generation OMTA. This process is then repeated to created additional generations of OMTAs. This process is most efficient if OMTAs to be merged authenticate data series of equal size as a merge according to optimizations defined below will use a new root node to be calculated and preserve the Merkle trees of the OMTAs that are merged as subtrees of the Merkle tree for the next generation OMTA.

For some embodiments, such as the embodiment described above, the merge function is optimized as follows. First, the data series elements that include the transactional data series subseries are identified and constituted as a data series batch. Next, a batch OMTA is created to authenticate the data series batch. The setData function is used to insert the data series batch into the batch OMTA, with the starting identifier for the batch OMTA.D[ ] set to one greater than the highest data element identifier for the OMTA being updated (incorporating OMTA) by the merge. Next, the Merkle tree is created for the batch OMTA (OMTA.node[ ]) using the getReference Value function. Next, the merge function is invoked to merge the batch OMTA into the incorporating OMTA. The merge function performs the following steps to enact the merge. The data series A.D[ ] for each of the two OMTAs are combined by appending the A.D[ ] elements from the batch OMTA to the data series A.D[ ] of the incorporating OMTA. Given the described constraints on OMTA data series, the combined data series will have a number of elements equal to the sum of elements in the constituent data series and the identifiers for the combined data series will be a consecutive sequence of positive integers. The merge function then combines the A.node[ ] collections for the two OMTAs to create a combined A.node[ ] collection in the incorporating OMTA. Given the constraints of the embodiment, the Merkle trees for the two OMTAs will be subtrees of a Merkle tree that authenticates the combined data series A.D[ ] for the incorporating OMTA. Next, a variation of the checkSubtree algorithm may be used to determine ancestor nodes for the two subtrees to be created so that the Merkle tree for the updated incorporation OMTA includes the two subtrees and the structure of the merged Merkle tree is consistent with a tree structure that would be created by getReference Value. This embodiment is consistent with the optimized batch updating method previously described and expands on it by describing a method for minimizing node calculations when a data series batch is incorporated into a Merkle tree authenticator. The following example embodiment of the Merge operation in code form uses the optimized Consistent Structure algorithm to perform an optimized merge and has the following preconditions:

Argument A[ ] must be ordered such that for any authenticator i except the initial authenticator, the A[i].L==A[i−1].R+1.

The Merkle tree for each authenticator must have been created with the optimized version of the getReference Value function with L and R parameters set to the identifiers for the leftmost and rightmost elements in the data series authenticated by authenticator.

```
function join (collection1[ ], collection2[ ]) {
    performs an in-place join of two collections, returning
        an in-place joined collection
}
function append (D[ ], A[ ]) {
    appends data elements in array D[ ] to array A[ ]
}
function merge (A[ ]) {
    mergedA=pop(A)
    while (A has elements) {
        nextA=pop(A)
        mergedA.node=join (mergedA.node, nextA.node)
```

```
    mergedA.Lchild=join (mergedA.Lchild, nextA.L-
        child)
    mergedA.Rchild=join   (mergedA.Rchild,   nex-
        tA.Rchild)
    append (nextA.D, mergedA.D)
    append (nextA.prevD, mergedA.prevD)
    mergedA.R=nextA.R
    }
    glue (mergedA, mergedA.L, mergedA.R)
}
function glue (A, L, R) {
    if (exists (A.node[L:R]) {
        return A.node[L:R]
    }
    else {
        if (L==R) {
            A.prevD[L]=A.D[L]
            A.node[L:R]=hash (A.D[L])
            return A.node[L:R]
        }
        else {
            M=chooseM (L, R)
            A.Lchild [L: M]=glue (A, L, M)
            A.Rchild [M+1: R]=glue (A, M+1, R)
            A.node[L:R]=hash (A.Lchild [L: M] | A.Rchild
            [L: M])
            return A.node[L:R]
        }
    }
}
```

The merge embodiments described above may not address scenarios where not yet authenticated data elements are to be authenticatable by a Merkle tree authenticator and there are not enough data elements to support efficient updating of the OMTA. In some embodiments, a separate Transactional Optimal Merkle Tree Authenticator (TOMTA) can be created and evolved for data elements not yet authenticated by the OMTA using the methods for described above for evolving the OMTA with the merge function. When the TOMTA is of sufficient size to make for efficient merging with the main OMTA, it is merged and the process repeats with a new TOMTA. This approach can be extended such that TOMTAs are constructed from other TOMTAs to as many levels as necessary to provide an ability for recently added data elements to be verifiable by a witness and verifier from a TOMTA.

The drawbacks of the OMTA and TOMTA approaches are as follows. First, at any moment in time, there may be data series elements that are not yet part of a data series that is authenticable using an OMTA to TOMTA. Second, the approach uses multiple reference values from the current OMTAs and TOMTAs to authenticate the data elements that are able to be authenticated. This may result in a larger than desirable set of reference values. Third, when TOMTAs are merged into OMTAs or merged into other TOMTAs, their reference values are retained until such time that witnesses derived from them are either no longer valid or no longer in use.

The first drawback may be addressed with a trade-off between what is an acceptable period for allowing unauthenticatable data elements to remain in an unauthenticatable state, and the impacts of more frequent creation of TOMTAs to meet an acceptable period. These impacts include an increased number of reference values and increased processing due to more TOMTAs and merging operations involving TOMTAs. A further complication is that some embodiments desire the size of a data series batch to be a power of 2, with efficiency increased as data series batch sizes are increased. In cases where data elements to add to a batch accumulate too slowly, this complication may be addressed by appending "null" data element values to a data series batch so that its size is a desired power of 2. This complication may also be addressed by appending copies of existing data series elements to a data series batch so that its size is a desired power of 2. According to one or more embodiments described herein, in a binary build mode as described herein, null and/or existing data series elements are not appended; rather, increasingly smaller TOMTAs can be created until the desired elements are covered. Also, according to an embodiment, the binary build mode provides for the number of nodes to be calculated not exceeding $2*N-1$ where N is the number of data series elements, which causes the binary build mode to be efficient.

The second drawback may be addressed with a trade-off between the following factors: determination of the maximum allowable number of reference values that are currently valid; the efficiency of creating and updating OMTAs, TOMTAs and witnesses derived from them; how quickly the overall data series is growing; and the maximum allowable time for a new data element to be authenticable by an OMTA or TOMTA. These factors may vary significantly for different applications of Merkle tree authenticators.

The third drawback may be addressed by setting validity periods on witnesses derived from TOMTAs such that they will expire at or shortly after the time a TOMTA is merged with an OMTA or another TOMTA, and then generating new witnesses from the updated OMTA or updated TOMTA. The timing of witness generation is a tradeoff between the likelihood that a witness will be used for verification, the processing for creating a witness, and the allowable latency for providing a witness to a verifier. Based on these tradeoffs, witnesses may be generated as part of a merge operation or generated incrementally in batches based on likelihood of witnesses in a batch being used for verification, or may be generated dynamically on an as-needed basis, or based on a combination of these approaches. Other factors may determine additional methods for when witnesses are created.

Given that addressing each drawback may involve a tradeoff assessment, a model may be formed to assess the factors involved in a tradeoff assessment. A model may treat some factors as being fixed values, such as the maximum time before a new data series element can be authenticated by an OMTA or TOMTA, or the maximum allowable number of current reference values. The model may allow other factors to be varied and then outputs of the model generated. A model may calculate the impact of the varying factors on other varying factors and also on other output factors, such as processing resources and operational costs.

Those with skill in the art will be able to discern additional methods for how to use the functions described here and previously to perform Merkle tree merging, splitting, and extraction to meet a variety of conditions related to generating a set of Merkle tree authenticators, reference values, and witnesses to address a variety of usage scenarios as described throughout the disclosure.

Data Series Ordering and Subseries Extraction to Support Long-Lived Merkle tree Authenticators, Reference Values and Witnesses In some embodiments, data series may be ordered to facilitate creation of long-lived Merkle tree authenticators, reference values and witnesses using previously defined methods. In general, data series ordering for this purpose will seek to group together data series elements as subseries that are unlikely to change. If this can be done well, then Merkle tree authenticators, reference values and witnesses for the subseries may be longer lived than Merkle tree authenticators, reference values and witnesses for the original data series of which the subseries was a part. The following list includes some techniques that support creation of subseries for this purpose:

Machine learning or statistical analysis to identify elements likely to change and elements unlikely to change based on attributes of data elements Natural re-ordering based on placing new/updated elements in groupings within an encompassing data series Reordering based on removing modified or deleted elements from a data series Using indirection to re-order data elements so that physical ordering is distinct from logical ordering Minimization of the number of elements moved during re-ordering Maximizing the number of consecutive elements that are re-ordered as a group Extraction of a subseries of data elements so that it can be merged with other data series or a Merkle tree authenticator for the subseries may be merged with other Merkle tree authenticators.

An extracted subseries may have element identifiers reset to support merge and batch update functions.

Null data elements or already existing data elements of a data series may be inserted into a subseries or appended to data series to address issues not related to batch updating, such as creating subseries of a desired size and that is more likely to have a long-lived reference values for a Merkle tree authenticator that authenticates the subseries.

Methods to Support "Garbage Collection" for Merkle Tree Accumulators

The methods for evolving a Merkle tree authenticator may result in the entries in the A.node[ ] collection containing nodes that are no longer valid or desired. Nodes that are no longer valid may result when getReference Value is called with L and R inputs that vary over time to address deletions and additions to the authenticated data series. In some case, a decision may be made to generate reference values for subtrees of a Merkle tree authenticator and then discard no longer desired nodes of the overall Merkle tree authenticator. The follow operations provide ways to remove these no longer desired or no longer valid Merkle tree authenticator nodes.

In some embodiments, operation remove (A, L, R)—Removes elements from A.D[ ] with identifiers in the range of L . . . R. In some embodiments, elements that are removed may be replaced by null values as described previously. In some embodiments, data elements in A.D[ ] may be re-ordered so that no-null values are found in A.D[ ] and these elements are identified by a series of consecutive positive integers. In some embodiments, L and R values associated with the Merkle tree authenticators are set to match updated L and R values for the leftmost and rightmost elements of an updated data series.

In some embodiments, operation trim (A) may remove nodes from A.node[ ] that are no longer part of the Merkle tree used to authenticate A.D[ ]. An embodiment of this operation may work as follows. First, the nodes in A.node[ ] are marked as candidates for deletion. Next, a recursive traversal of A removes the candidate for deletion mark for each node that is traversed. The function completes by removing the entries from A.node[ ] that are still candidates for deletion. Other embodiments for trimming unused nodes from Merkle trees may operate differently. For example, getReference Value as described previously may be modified to incrementally remove no longer valid Merkle tree nodes. In other embodiments, when data elements are removed from a data series using the remove ( ) function, ancestor nodes to the removed data series elements or to data series elements that have received new identifiers may be removed from A.node[ ].

In some embodiments, operation break (A, S [ ]) removes the nodes from A.node[ ] which do not have nodes found in the set of Merkle tree Authenticators found in S [ ]. This function may be performed by first marking the nodes in A.node[ ] as candidates for deletion, and then doing recursive traversals of each Merkle tree authenticator in S [ ]. Each node in A.node[ ] that has the same identifier and value as a traversed node has its candidate for deletion mark removed. The function completes by removing the entries in A.node[ ] that are still candidates for deletion. In some embodiments, Merkle trees for each Merkle tree authenticator S [I] in S [ ] may be constructed using getReference Value for S [I].L and S [I].R. In some embodiments, A.D[ ] serves as a data series from which subseries defined by S [I].L and S [I]. R pairs are used as the S [I].D[ ] data series for each Merkle tree authenticator in S [ ]. In some embodiments, A.D[ ] data elements that are not part of any S.D[ ] data series are removed from A.D[ ]. Those with ordinary skill in the art may define additional embodiments that use the methods and functions defined herein for additional embodiments of the break function.

Merkle Tree Ladder

Figure 16:
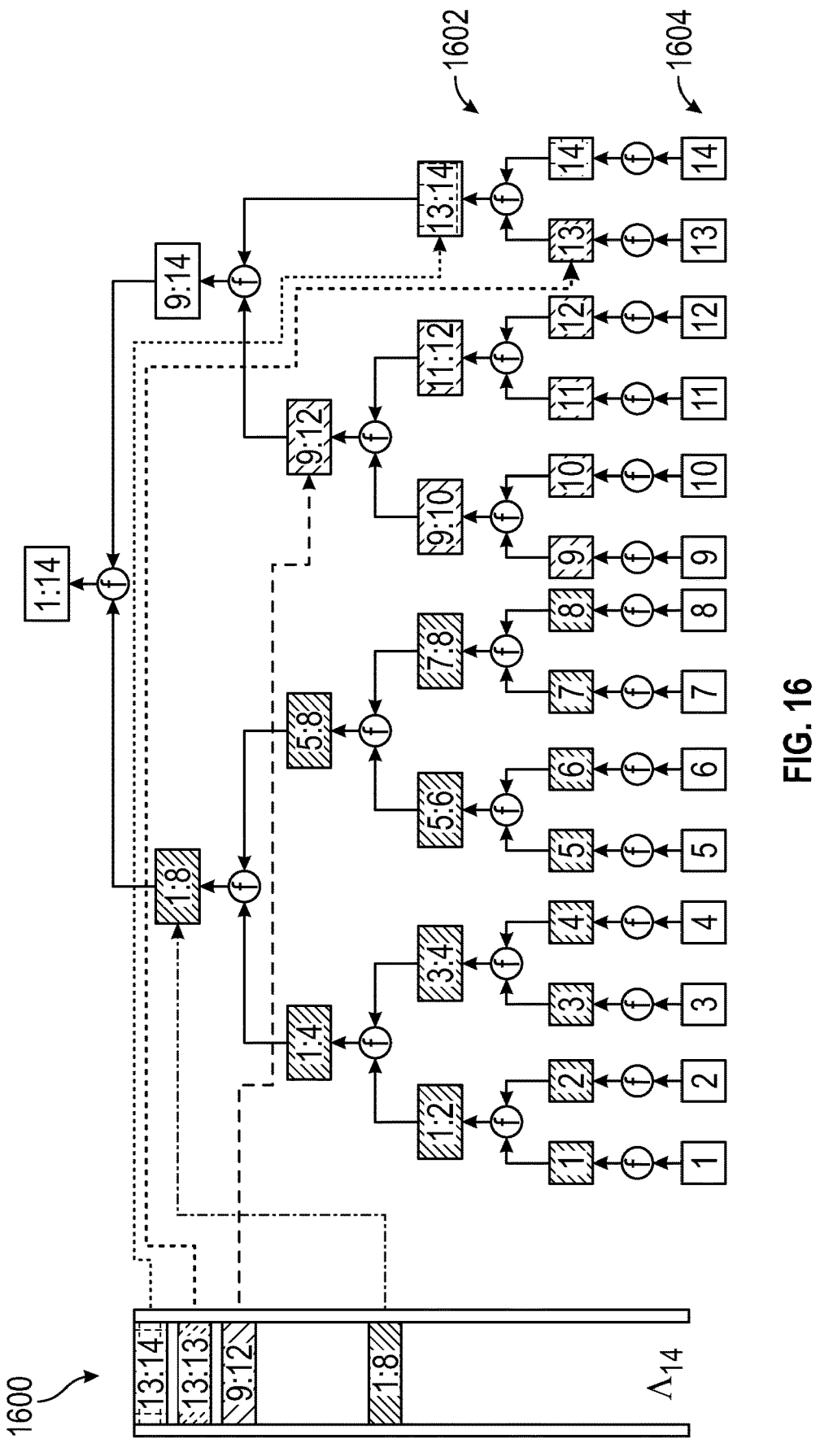
FIG. 16 illustrates an example Merkle tree ladder corresponding to a Merkle tree, according to an embodiment.

In some embodiments, Merkle tree ladders may be used to model and optimize key management for MTPKs. A rung in a Merkle tree ladder corresponding to a Merkle tree may correspond to a node in the Merkle tree. Any node in the Merkle tree can be a rung on the corresponding Merkle tree ladder. FIG. 16 illustrates an example Merkle tree ladder 1600 corresponding to a Merkle tree 1602, which includes 14 leaf nodes 1604. In the example depicted in FIG. 16, the Merkle tree ladder 1600 has 4 rungs. Rungs of a Merkle tree ladder may collectively authenticate the data values in the data series associated with a Merkle tree. To verify a data record, the Merkle tree ladder may be used to derive a public key while authentication path of the data record to the derived public key may be used as a signature for verification. In some embodiments, rungs in a Merkle tree ladder may include nodes from multiple Merkle trees, such as nodes from Merkle trees created by batch processing.

In some embodiments, a Merkle tree ladder corresponding to a Merkle tree may be provided to, or otherwise available for, a verifier. The verifier may be able to use the Merkle tree ladder to derive public keys for verifying more than one data record in the data series associated with a Merkle tree.

Figure 17:
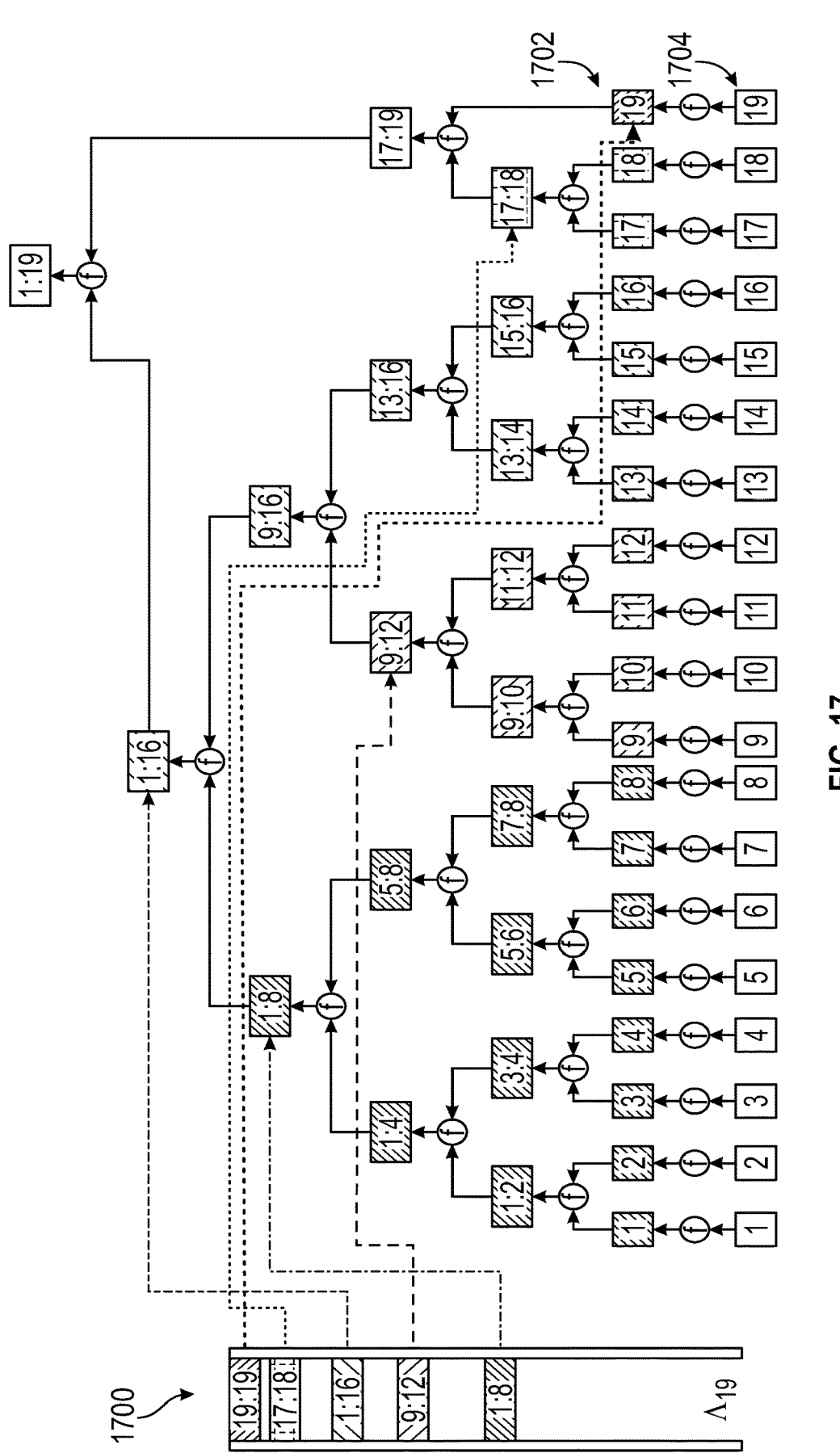
FIG. 17 illustrates an example evolved Merkle tree ladder due to data records being added to a corresponding Merkle tree, according to an embodiment.

In some embodiments, when one or more data records in the data series associated with a Merkle tree change, nodes in the Merkle tree may be added or updated. When nodes in the Merkle tree are added or updated, the Merkle tree ladder may also be evolved. FIG. 17 illustrates an example Merkle tree ladder 1700 evolution due to added data records to a corresponding Merkle tree 1702. The Merkle tree ladder 1700 has evolved to authenticate the new leaf nodes 1704. The 1:8 and 9:12 rungs from the ladder 1600 in FIG. 16 have remained, thus 12 of original 14 data records (and 12 of the 19 overall data records) can still be directly authenticated by a verifier who acquired the previous ladder. For example, the 14 data records can be authenticated via the backwards compatibility property. The 12 leaf nodes can be directly authenticated to the same rung in the previous ladder as the one with which the 12 leaf nodes are associated in the current ladder. The other two (e.g., 13 and 14) can be authenticated relative to a different rung in the previous ladder, for example. The Merkle tree ladder 1700 depicted in FIG. 17 has 5 rungs after being evolved. The verifier may use a new Merkle tree ladder when the verifier is not able to authenticate a data record using the existing Merkle tree ladder. In a first perspective, a Merkle tree ladder having a smaller number of rungs may be preferred as this Merkle tree ladder may save memory and network bandwidth. In a second perspective, a Merkle tree ladder that can be used for authenticating a greater number of data records without being replaced may be preferred. A number of strategies for constructing a Merkle tree ladder may exist as explained in the following sections.

Figure 18:
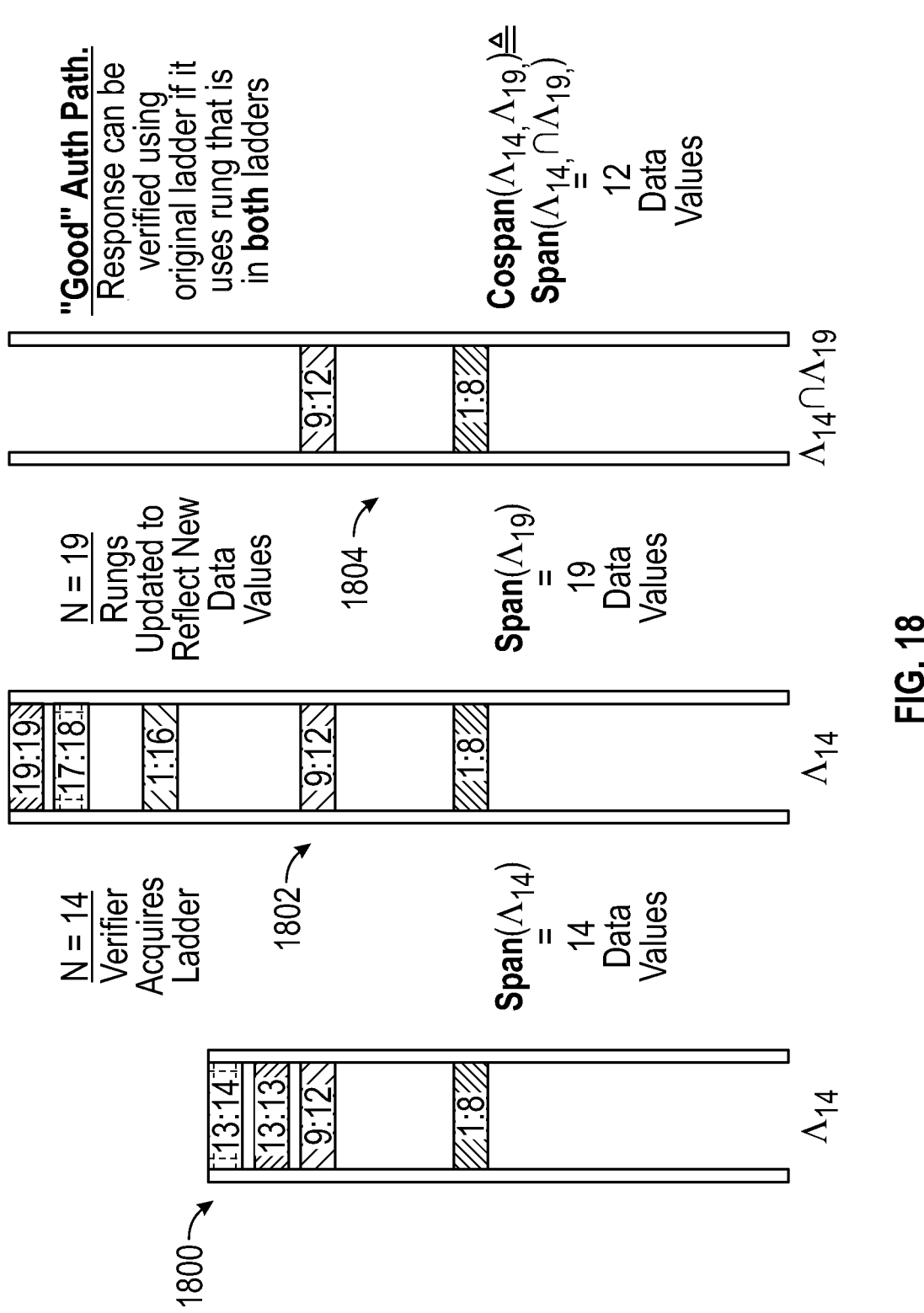
FIG. 18 illustrates example spans and a cospan for two Merkle tree ladders, according to an embodiment.

In some embodiments, an evaluation metric for evaluating a Merkle tree ladder may be 'span' indicating a number of data records that can be verified with the Merkle tree ladder. Another evaluation metric 'cospan' for a first Merkle tree ladder and a second Merkle tree ladder may indicate a number of data records that can be verified with each of the first Merkle tree ladder and the second Merkle tree ladder. FIG. 18 illustrates example spans 1800, 1802 and a cospan 1804 for two Merkle tree ladders $\Lambda_{14}$ and $\Lambda_{19}$. In some embodiments, the second Merkle tree ladder may be evolved from the first Merkle tree ladder. An evaluation metric called 'endurance' may be used for evaluating how long a Merkle tree ladder is useful. Endurance of a Merkle tree ladder may be defined as a maximum number of successive responses that can be verified with at least a 50% overall probability of success. Endurance of a Merkle tree ladder may depend on a number of factors including ladder construction strategy, a number of data items in the Merkle tree, Merkle tree update pattern, verifier query pattern, and response indexes.

A first Merkle tree ladder $\Lambda_N$ may be constructed at time N, and a second Merkle tree ladder $\Lambda_{N+\Delta}$ may be a Merkle tree ladder evolved at time N+$\Delta$ from the first Merkle tree ladder. A probability that a response at time N+$\Delta$ can be verified using the first Merkle tree ladder $\Lambda_N$ may be $$\frac{cospan(\Lambda_N, \Lambda_{N+\Delta})}{span(\Lambda_{N+\Delta})}$$

A probability that E consecutive responses can be verified using the first merkle tree ladder $\Lambda_N$ may be $$\prod_{\Delta=1}^{E} \frac{cospan(\Lambda_N, \Lambda_{N+\Delta})}{span(\Lambda_{N+\Delta})}.$$

As endurance may be defined as a maximum number of successive responses that can be verified with at least a 50% overall probability of success, endurance is the maximum E such that $$\prod_{\Delta=1}^{E} \frac{cospan(\Lambda_N, \Lambda_{N+\Delta})}{span(\Lambda_{N+\Delta})} \geq \frac{1}{2}.$$

A number of Merkle tree ladder construction strategies may exist. In each of the strategies, one or more new top rungs may be added to the Merkle tree ladder when a new data record indexed N is added to the corresponding Merkle tree, and zero or more other rungs may be removed from the Merkle tree ladder. The new rung may be incremental (e.g., N:N), intermediate (e.g., L:N where L is between 2 and N−1), and/or cumulative (e.g., 1:N). The rung span may generally be expanded from incremental to intermediate and to cumulative. While expanding the span may increase the endurance of the Merkle tree ladder, expanding the span may also increase the size of authentication paths, or in embodiments, of, signatures. In some scenarios, more than one rung may be identified to span a given data record. In such a scenario, an oldest rung among the identified rungs may be used in some construction strategies, and the newest rung among the identified rungs in others, or a specific rung depending on the strategy and the leaf node of the data record. The associated rung may be selected to optimize endurance, possibly taking into account backward compatibility and other considerations.

Strategies for Constructing Merkle Tree Ladder

Full-Rung Strategy

Figure 19:
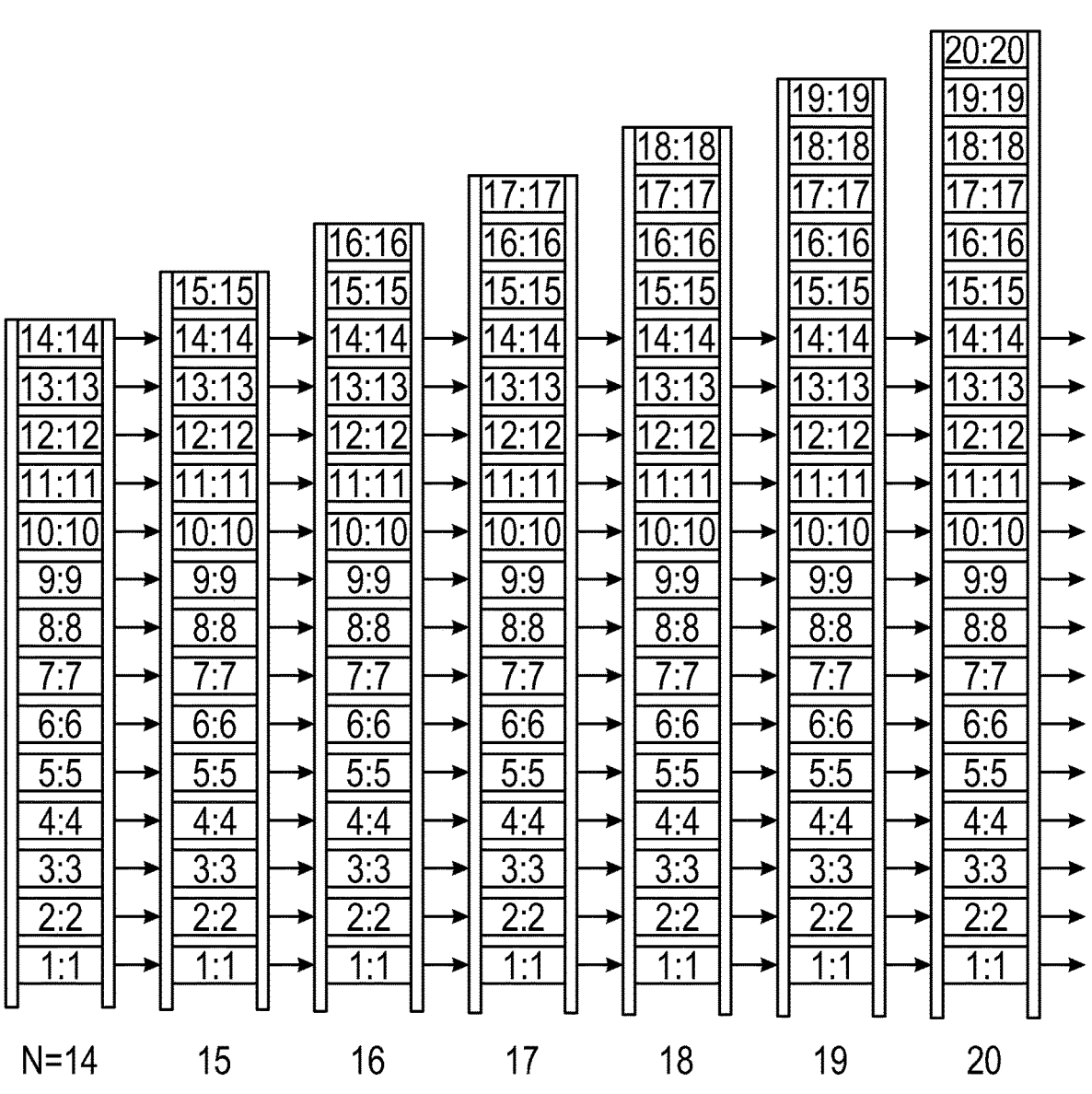
FIG. 19 illustrates example Merkle tree ladders constructed with a Full-Rung strategy, according to an embodiment.

With a Full-Rung Strategy (also referred to as a "full strategy"), a rung [N:N] may be added when a data record indexed N is added to the corresponding Merkle tree, and no rung may be removed from the Merkle tree ladder. In principle, a Full-Rung Strategy may be similar to having N separate trees. A ladder constructed by the Full-Rung Strategy may be a baseline because the constructed ladder may achieve the highest endurance possible. Any previously existing rung may still be used in future Merkle tree ladder. FIG. 19 illustrates example Merkle tree ladders 1900 constructed with a Full-Rung Strategy.

Single-Rung Strategy

Figure 20:
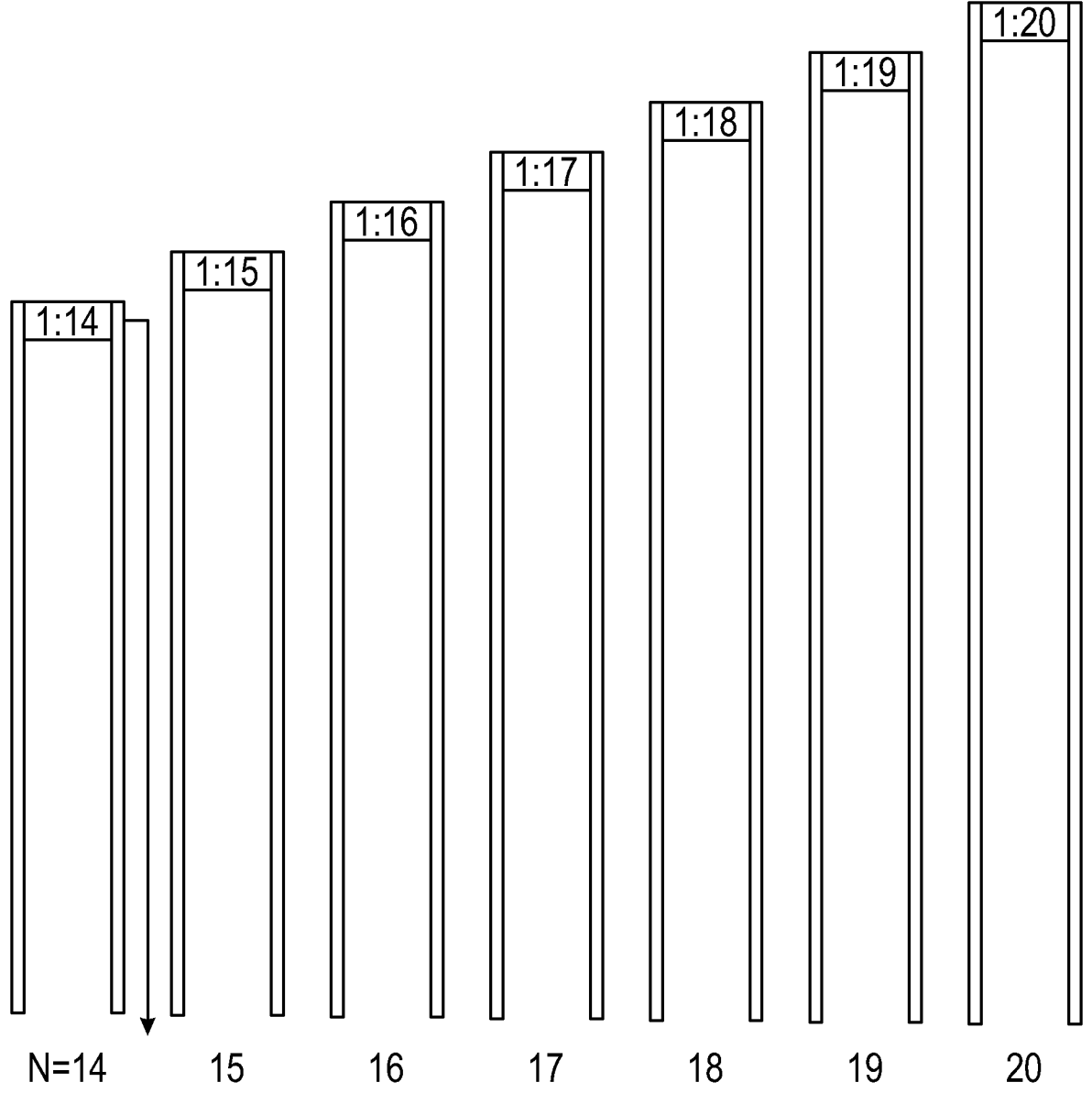
FIG. 20 illustrates example Merkle tree ladders constructed with a Single-Rung strategy, according to an embodiment.

With a Single-Rung Strategy (also referred to as a "single strategy"), a rung [1:N] may be added to the Merkle tree ladder when a data record indexed N is added to the corresponding Merkle tree, and a rung [1:N−1] may be removed from the Merkle tree ladder. FIG. 20 illustrates example Merkle tree ladders 2000 constructed with a Single-Rung Strategy.

Basic Binary-Rung Strategy

Figure 21:
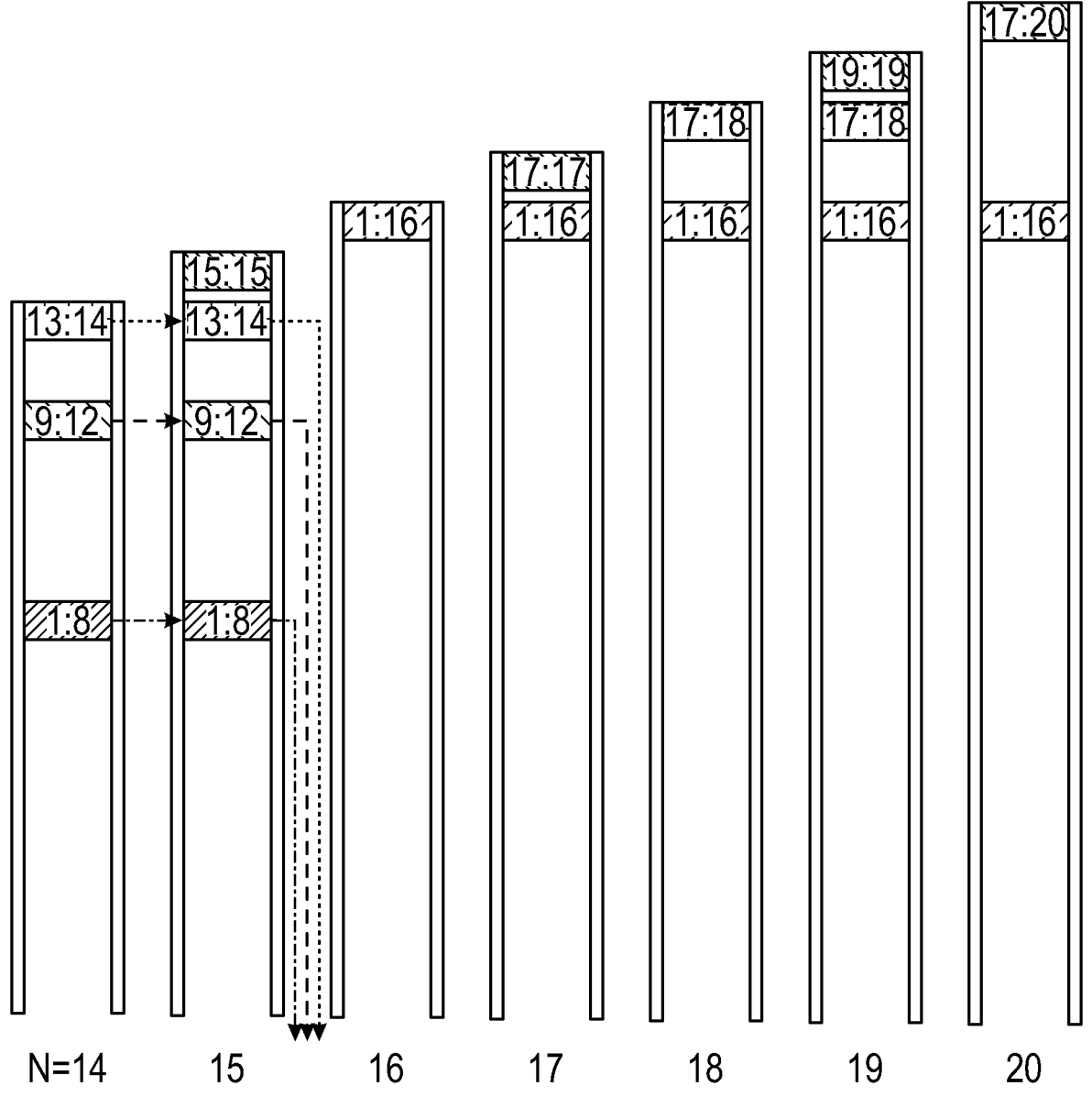
FIG. 21 illustrates example Merkle tree ladders constructed with a Basic Binary-Rung strategy, according to an embodiment.

With a Basic Binary-Rung Strategy (also referred to as a "basic binary strategy"), a rung $[N-2^j+1:N]$ may be added to the Merkle tree ladder when a data record indexed N is added to the corresponding Merkle tree, where $2^j$ is the largest power of 2 dividing N, and rungs $[N-2*2^{j'}+1:N-2^{j'}]$ for j' between 0 and j−1 may be removed. Therefore, a rung added at N is removed at $N+2^j$. FIG. 21 illustrates example Merkle tree ladders 2100 constructed with a Basic Binary-Rung Strategy.

Extended Binary-Rung Strategy

Figure 22:
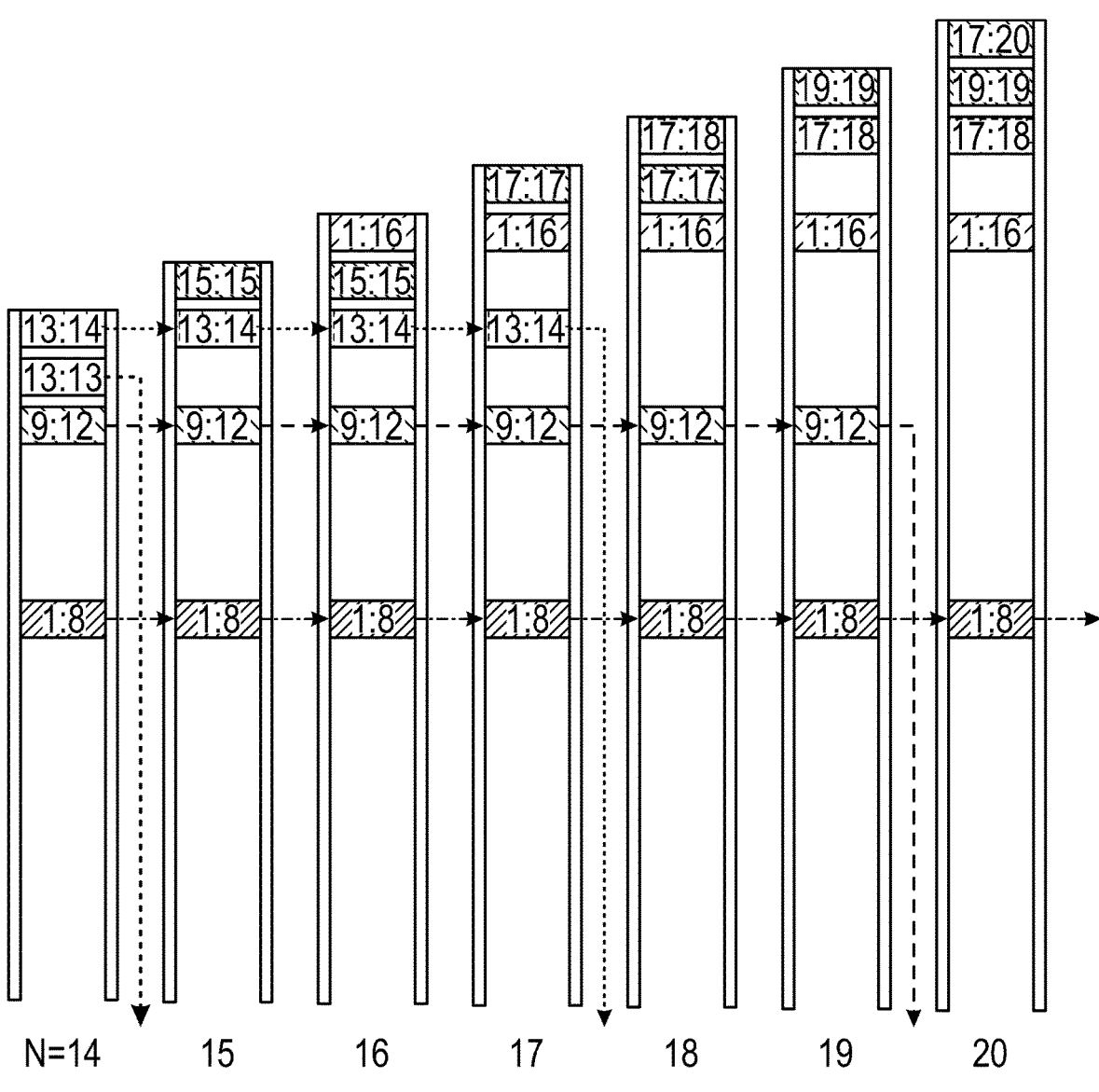
FIG. 22 illustrates example Merkle tree ladders constructed with an Extended Binary-Rung strategy, according to an embodiment.

With an Extended Binary-Rung Strategy (also referred to as an "extended binary strategy"), a rung $[N-2^j+1:N]$ may be added to the Merkle tree ladder when a data record indexed N is added to the corresponding Merkle tree, where $2^j$ is the largest power of 2 dividing N, and a rung $[N-3*2^j+1:N-2*2]$ may be removed if $N>2*2^j$. Therefore, a rung added at N is removed at $N+2*2^j$. Compared with the Basic Binary-Rung Strategy, a rung is extended an extra $2^j$ additions until the arrival of next rung associated with $2^j$. The removal of rungs may decrease the number of data records that can be authenticated using the initial Merkle tree ladder at a rate that is no more than 2 data records per new data record addition on average. FIG. 22 illustrates example Merkle tree ladders 2200 constructed with an Extended Binary-Rung Strategy.

Spaced-Rung Strategy

With a Spaced-Rung Strategy (also referred to as a "spaced strategy"), a rung $[(t-1)\sigma+1:N]$ may be added to the Merkle tree ladder when a data record indexed N is added to the Merkle tree ladder when a data record indexed N is added to the corresponding Merkle tree and when $(t-1)\sigma<N<=t\sigma$, where $\sigma$ is a spacing parameter, which is a positive integer, which may be pre-determined. With a Spaced-Rung Strategy, a rung $[(t-1)\sigma+1:N]$ may be removed when the data record indexed N is added to the corresponding Merkle tree and when N is not equal to $(t-1)\sigma+1$. When $N=(t-1)\sigma+1$, no rung may be removed from the Merkle tree ladder. With a Spaced-Rung Strategy, a rung added at N is not removed if $N=t\sigma$, while removed at N+1 otherwise. A Merkle tree ladder constructed with a Spaced-Rung Strategy may have fewer overall rungs, but endurance of the Merkle tree ladder may still be high if a ratio between a number of queries and a number of new data records added to the corresponding Merkle tree during a given period of time is not too high. Constructing a Merkle tree ladder with a Spaced-Rung Strategy, like a Full-Rung Strategy, may be similar to having multiple trees. A Spaced-Rung Strategy may be used in combination with other strategies. A Merkle tree ladder constructed with a Spaced-Rung Strategy may be used to keep authentication paths short, while a Merkle tree ladder constructed with other strategies may be used to keep the number of rungs small.

Variable-Spaced-Rung Strategy

With a Variable-Spaced-Rung Strategy (also referred to as a "variable spaced strategy"), a rung $[V_{t-1}+1:N]$ may be added to the Merkle tree ladder when a data record indexed N is added to the corresponding Merkle tree and when $v_{t-1}<N<=v_t$, where $v_0$ may be defined as 0 and $v_t$ may be defined as $v_{t-1}+\sigma_t$ for $t>=1$, and $\{\sigma_1, \sigma_2, \ldots, \sigma_T\}$ are a spacing parameter sequence of positive integers, which may be pre-determined. With aa Variable-Spaced-Rung strategy, a rung $[v_{t-1}+1:N-1]$ may be removed if N is not equal to $v_{t-1}+1$. When N is equal to $v_{t-1}+1$, no rung may be removed. With a Variable-Spaced-Rung Strategy, a rung added at N is not removed if $N=v_t$. Otherwise, the rung may be removed at N+1. A Variable-Spaced-Rung Strategy may be similar to a Spaced-Rung Strategy, but the strategy is adapted to variable spacing.

Bounded-Rung Strategy

With a Bounded-Rung Strategy (also referred to as a "bounded strategy"), a rung [1:N] may be added to the Merkle tree ladder when a data record indexed N is added to the corresponding Merkle tree and a rung [1:N-k] may be removed from the Merkle tree ladder if N>k, where k is a positive integer, which may be pre-determined. With a Bounded-Rung Strategy, a rung added at N may be removed at N+k. Thus, the Merkle tree ladder may include the last k rungs. A Merkle tree ladder may have fewer rungs while endurance of the Merkle tree ladder may still be high if a ratio between a number of queries and a number of new data records added to the corresponding Merkle tree during a given period of time is not too low. With a Bounded-Rung Strategy, spans of the rungs are cumulative to maximize coverage. An alternative strategy may be possible that has the k-th rung have a cumulative span while the other rungs have incremental spans.

Spaced-And-Bounded-Rung Strategy

With a Spaced-and-Bounded-Rung Strategy (also referred to as a "spaced-and-bounded strategy"), a rung [1:N] may be added to the Merkle tree ladder when a data record indexed N is added to the corresponding Merkle tree and when $N=t\sigma$, where $\sigma$ is a spacing parameter, which may be pre-determined. If N is not equal to $t\sigma$, a rung $[(t-1)\sigma+1:N]$ may be added to the Merkle tree ladder. If $N=(t-1)\sigma+1$ and $N<=k\sigma$, where k is bound parameter, which is a positive integer, which may be pre-determined, no rung may be removed. Else if $N=(t-1)\sigma+1$ and $N>k\sigma$, then a rung $[1:N-(k-1)\sigma-1]$ may be removed from the Merkle tree ladder. Otherwise, a rung $[(t-1)\sigma+1:N-1]$ may be removed from the Merkle tree ladder. With a Spaced-and-Bounded-Rung Strategy, a rung added at N may be removed at $N+(k-1)\sigma+1$ if $N=t\sigma$ (i.e., the rung is a spaced rung). Otherwise, the rung added at N may be removed at N+1. A Merkle tree ladder constructed with a Spaced-and-Bounded-Rung Strategy may balance between high and low ratio for a number of queries and a number of new data records added to the corresponding Merkle tree during a given period of time.

Spaced Extended Binary-Rung Strategy

With a Spaced Extended Binary-Rung (also referred to as a "spaced extended binary strategy"), a rung $[N-2^j\sigma+1:N]$ may be added to the Merkle tree ladder when a data record indexed N is added to the corresponding Merkle tree and when $(t-1)\sigma<N<=t\sigma$, where $2^j$ is the largest power of 2 dividing t. Otherwise a rung $[(t-1)\sigma+1:N]$ may be added to the Merkle tree ladder. No rung may be removed if $N=(t-1)\sigma+1$ and $N<=(2*2^j)\sigma$. Else if $N=(t-1)\sigma+1$ and $N>(2*2^j)\sigma$, then a rung $[N=(3*2^j)\sigma+1:N-(2*2^j)\sigma]$ may be removed from the Merkle tree ladder. Otherwise, a rung $[(t-1)\sigma+1: N-1]$ may be removed from the Merkle tree ladder. With a Spaced Extended Binary-Rung Strategy, a rung added at N may be removed at $N+(2*2^j-1)\sigma+1$ if the rung is a binary rung (e.g., $N=t\sigma$). Otherwise, the rung added at N may be removed at N+1. The Merkle tree ladder constructed with a Spaced Extended Binary-Rung Strategy may have fewer rungs while experiencing endurance tradeoffs for various ratios between a number of queries and a number of new data records added to the corresponding Merkle tree during a given period of time.

Bounded Extended Binary-Rung Strategy

With a Bounded Extended Binary-RungStrategy (also referred to as a "bounded extended binary strategy"), a rung $[N-2^j+1:N]$ may be added to the Merkle tree ladder when a data record indexed N is added to the corresponding Merkle tree and when $j<k-2$ where k is a bound parameter, a positive integer, and where $2^j$ is the largest power of 2 dividing N. Otherwise, a rung [1:N] may be added to the Merkle tree ladder. If $N<=2*21$, no rung may be removed from the Merkle tree ladder. Else if $j<k-2$, a rung $[N-3*2^j+1:N-2*2^j]$ may be removed from the Merkle tree ladder. Otherwise, a rung $[1:N-2*2^{k-2}]$ may be removed from the Merkle tree ladder. With a Bounded Extended Binary-Rung Strategy, a rung added at N may be removed at $N+2*2^{min(j,k-2)}$. In the Merkle tree ladder, at most two rungs are active for $j>=k-2$. The Merkle tree ladder constructed with a Bounded Extended Binary-Rung Strategy may have fewer rungs while experiencing endurance tradeoffs for various ratios between a number of queries and a number of new data records added to the corresponding Merkle tree during a given period of time. A Spaced Extended Binary-Rung Strategy may be combined with a Bounded Extended Binary-Rung Strategy.

Backward Compatibility

In some embodiments, a signature including an authentication path for a data record to a new rung may be verified with any old rungs along the authentication path. As an example and not by way of limitation, a Merkle tree ladder corresponding to a Merkle tree may include a rung [1:8]. As data records are added to the Merkle tree, a new root node [1:14] may be added to the Merkle tree. An authentication path for the data record indexed 7 to the new root [1:14] may traverse and therefore be verifiable relative to [7:8], [5:8], and [1:8]. As the data record indexed 7 can be verified with the rung [1:8] and the rung [1:8] was available on the previous Merkle tree ladder before being evolved, the data record indexed 7 may be verified with the previous Merkle tree ladder. A corresponding to a new Merkle tree with root note [1:14] (or more generally to a Merkle tree with rung [1:8]) may be backward compatible with any old Merkle tree with rung [1:8], [5:8], and/or [7:8]. Backward compatibility may effectively make endurance of a Binary-Rung Strategy comparable to that of a Full-Rung Strategy.

Batch Mode

A set of data records may be added to the Merkle tree together as a batch operation. The batch mode may be implemented in a number of various approaches. In a first approach, data records may be added to the Merkle tree as if they were added one by one. The Merkle tree may go through as many updates as a number of data records in the set. More rungs in the Merkle tree ladder may be used for backward compatibility. In a second approach, the data records may be padded to a multiple of a power of 2. Then the padded data records may be added to the Merkle tree. While backward compatibility may use fewer rungs due to power of 2 multiples, the padding uses up nodes. In a third approach, a new second-level Merkle tree may be constructed with the set of data records. The root of the constructed second-level Merkle tree may be treated as a new data record in a first-level Merkle tree. With this approach, the first-level Merkle tree may experience one update for adding a set of data records. However, authentication paths may have two levels. Thus, a maximum path size may depend on a total number of data records and/or on a maximum batch size. In some embodiments, nodes from separate Merkle trees created by batch update processes may be used as rungs in a Merkle tree ladder. In some embodiments, rungs from Merkle trees created by batch update processes may be used as rungs in a Merkle tree ladder subsequent to the Merkle trees being merged into a larger Merkle tree. In some embodiments where Merkle trees created by batch update processes have yet to be merged and where the data records form a consecutive series, the various described rung strategies may be applied as though the yet-to-be merged Merkle trees had been merged subject to a limitation that nodes that would be created by merging would not be available to the rung strategy.

Methods and Optimizations for Creating and Maintaining Data Series Including RRsets and MTPKs that Authenticate the RRsets In some embodiments, the concepts of Merkle tree authenticators, reference values, witnesses, and verification are applicable to DNSSEC as a type of public key cryptography referred to herein as Merkle Tree Public Keys (MTPKs). MTPK as described herein is therefore an embodiment of Merkle tree authenticators. The methods previously described for Merkle tree authenticators, reference values, witnesses and verification are therefore applicable to MTPKs as an embodiment of those methods. This section provides additional specification of MTPKs to illustrate in more detail how they apply to DNSSEC. This section also addresses other innovations for MTPKs to function within the DNSSEC model for embodiments of zone signing keys (ZSKs) and key signing keys (KSKs).

MTPKs as an Embodiment of Merkle Tree Authenticators

In some embodiments, MTPK tree construction algorithms and node identifier schemes for DNSSEC are embodiments of the Merkle tree authenticator construction and node identifier schemes. The methods for deterministic creation of authentication paths in MTPK signatures are embodiments of the witness construction algorithms for Merkle tree authenticators. Verification methods using an MTPK signature and MTPK public key are embodiments of verification algorithms for Merkle tree authenticators.

For DNSSEC, the resource record sets (RRsets) that are signed per the DNSSEC protocol include a data series that may be authenticated by one or more MTPKs. Each RRset in this data series becomes an input to the hash function that determines leaf nodes of MTPK Merkle tree authenticators (authenticator).

In some embodiments, zone signing to produce an MTPK includes the following steps. The RRsets to be signed may be formed into a data series by sequentially ordering the RRsets using identifiers for each RRset such that each identifier is a unique positive integer and the set of identifiers is a consecutive sequence of integers. Assigning a separate identifier to each data value, i.e., RRset, can help improve overall security. Ensuring that the assigned identifiers are consecutive can also help with security as well as efficiency, because the consecutive ordering may make it easier to determine the identifiers of sibling nodes during signature verification.

In some embodiments, an authenticator is generated with an embodiment of the genAuth function and the authenticator is populated with the data series using an embodiment of the setData( ) function. Once the authenticator is populated with one or more data values from the data series, reference values may be generated using embodiments of the getReference Value function. As used herein, the reference value corresponds to a single node of a Merkle tree that may be used to authenticate leaf nodes in the subtree subordinate to the node. Reference values may then be used as public keys in DNSKEY resource records (RRs) or in other alternate locations suitable for distributing reference values for use during DNSSEC signature verification, e.g., in locations pointed to by DNSKEY resource records and/or by RRSIG records, either explicitly or implicitly. Such locations may either be inside or outside the global DNS, and the reference values may be represented as DNSKEY resource records and/or other resource record types. The term "DNSKEY resource record" may be understood as encompassing reference values made available for use during signature verification by such other means. After reference values have been created, DNSSEC signatures may be determined and provided on an as-needed or scheduled basis. Signatures may be formed by first generating a witness that includes the authentication path for a signature using an embodiment of the getWitness function. After a witness is generated, it may be used as element of an RRSIG RR for the RR that is authenticated by the RRSIG RR and the MTPK applicable to the RRSIG RR. RRSIG RRs also use elements that indicate the [L:R] values associated with the MTPK DNSKEY RR that is used along with the RRSIG RRs during verification. In some embodiments, the [L:R] values for the MTPK may be indirectly defined in an RRSIG RR based on a reference element that identifies an DNSKEY MTPK that contains elements that specify the [L:R] values for the MTPK. In some embodiments, the [L:R] values may be found as an element or elements of RRSIG RRs. The RRSIG RRs may also use an element that indicates the data series identifier for the RR the RRSIG is applicable to. This identifier is used to support the deterministic node identification algorithm of the verify function.

In a some DNSSEC embodiments, a tree identifier including a 16-octet random value is created for use with a new authenticator that is created when the data series is to be signed anew. Signing anew may be periodically performed per DNSSEC policies that use a periodic complete zone signing with a new public key associated with the signed zone. For most non-MTPK signing algorithms, a public key will not change until the next time the zone are signed anew as incrementally signing updates to a zone does not change the public key. For MTPKs, the public key will change each time incremental signing occurs. For MTPKs, the tree identifier then serves as an identifier for a series of MTPKs produced through incremental signing to indicate they are based on the evolution of a zone for the period up to the point when the zone is signed anew. Furthermore, to bind the authenticators to the tree identifier, the tree identifier is included as an input to the hash function that calculates each node in the Merkle tree authenticators for the MTPKs. Also, in a preferred embodiment, node identifiers are included as an input to the hash function that calculates each node in Merkle tree authenticators. The inclusion of the tree identifier and node identifiers as hash inputs tightly binds nodes to the Merkle tree authenticator and to specific nodes in the Merkle tree authenticator. This binding increases the difficulty of second pre-image attacks on the nodes, with this providing an improvement in the security of the Merkle tree authenticator.

In some embodiments, MTPK signature verification uses an embodiment of the verify function. In an example of signature verification, the following steps are performed. First, a verifier receives a DNSSEC signed response that includes an RRset and an RRSIG RR applicable to the RRset. The verifier then calls an embodiment of the verify function with the following argument: (V as the reference value, I as the RRset identifier from the signature, D as the RRset, and W as the authentication path from the witness). In some embodiments, V will contain values for I and W and a verify function may then just take V and D arguments. After being called, the verify function will traverse the witness and calculate node values as an embodiment of the verify function algorithm previously documented, with this culminating in the return of a calculated public key value. The calculated public key value is then compared to public key field of the DNSKEY RR that has the public key applicable to the signature. If the comparison results in a match, the RRset is verified. Otherwise the RRset is not verified.

RRset Ordering within a Data Series

For some DNSSEC embodiments, a zone's RRsets must be ordered as at least one data series authenticated by at least one MTPK. While the canonical ordering used for computing a ZONEMD record or a NSEC or NSEC3 record may be used in some embodiments, other ordering methods may be used to maximize the lifespan of MTPKs. The various methods for data series ordering for Merkle tree authenticators may be applied to ordering RRsets as a data series authenticated by one or more MTPKs. These methods seek to optimize the life of MTPKs, optimize the number of MTPKs in the DNSKEY RRset, determine how often MTPKs should be generated, and to determine how a data series including RRsets may be partitioned to support multiple MTPKs over time. In some embodiments, data elements are grouped according to their likelihood to be changed. Ordering may take into account: RRset age, registrant, registrar, domain activity, domain prioritization based on a ranking function, name server, most recently updated, least recently updated and predictive based on machine learning. Other inputs and methods are possible.

An optimal RRset ordering may be difficult to define given the variety of factors that could determine an optimized ordering including a combination of the factors. In some embodiments, inputs to an ordering algorithm and significance of those inputs may change as part of determining an optimized ordering. In some embodiments, alternate algorithms or approaches may be adopted over time to produce a more optimized ordering. In some implementations, analysis of how effective RRset ordering has been in optimizing MTPK public key and signature lifespans may be performed. In some embodiments, the analysis of ordering effectiveness may be used as part of identifying and assessing changes to the methods for RRset ordering.

MTPK Delete, Update and Append Operations

In some embodiments, the methods for handling delete, update, and append operations for a data series including RRsets authenticated by a MTPK are embodiments of the methods for delete, update and append operations for Merkle tree authenticators. For example, in an embodiment that uses the Optimized Sliding Tree embodiment, new and changed RRsets are added to the end (right side) of the RRset data series and no longer valid RRsets are deleted from the front (left side) of the data series, and the Merkle tree authenticator is then updated to reflect the modified data series. The Optimized Sliding Tree embodiment minimizes the number of Merkle tree nodes to be calculated when such updates are made. In other embodiments, for example where deletions from the data series are not supported and new or changed RRsets are appended to the data series other algorithms may be used, such as the consistent structure algorithm, as both the Optimized Sliding Tree embodiment and the Consistent Structure embodiment minimize the number of nodes to be calculated when a Merkle tree is updated to authenticate a data series that has had elements appended to it. In some embodiments, in addition to new and modified RRsets being appended to a data series, unmodified RRsets may be appended to the end of the data series to allow a subtree of the Merkle tree authenticator for the overall data series to be used to authenticate RRsets that are currently valid. In such embodiments, the roots of such subtrees may be published in DNSKEY RRs as public keys to authenticate currently valid RRsets. In some embodiments, for example where it is not anticipated that the data series will change during the lifespan of a MTPK or the number of data elements appended is set to minimize change in a Merkle tree authenticator, other algorithms, such as the balanced tree algorithm, may be efficient at minimizing the number of nodes that are calculated when the Merkle tree is updated to authenticate an updated data series.

The methods for updating Merkle tree authenticators due to data series element value changes, element deletions, and element additions may be used for evolving MTPK Merkle trees as RRsets are changed, deleted, or added to a zone. The methods may also be applied to support purposes including: maximizing the life span of MTPKs; optimizing the number of MTPKs in the DNSKEY RRset; minimizing signature sizes taking into account Merkle tree size and subtree sizes; selecting data series elements for subtrees based on expected frequency of responses containing signatures derived from the subtrees.

In some embodiments, for example where RRsets are modified, it may be desirable to preserve the data series identifiers for the modified RRsets and have the Merkle tree authenticator for MTPKs recalculated. An embodiment of a method for this has the following steps. An embodiment of the setData Values function is used to update the desired RRset data series element within the authenticator. An embodiment of the getReference Value function may then called to update the Merkle tree authenticator and reference value for it. The reference value may then be published as the public key element of a DNSKEY RR.

Dynamic Creation of MTPK DNSKEY RRs RRSIG RRs

In some DNSSEC embodiments of MTPK creation, MTPKs may be created dynamically. This method is most effective when used to create a MTPK for newly added or changed RRsets in the RRset data series. Dynamic MTPKs are most efficiently created when the number of nodes to be calculated for the Merkle tree for the authenticator are minimized. In some embodiments, new and changed RRs are grouped together as a subseries of the RRset data series and a MTPK authenticator and public key dynamically generated to authenticate just the RRsets in the subseries. In some embodiments, the new and changed RRsets may be used to form a new data series, and then an MTPK authenticator and public key generated for the new data series. For example, this may represent a rung strategy where some rungs authenticate long-lived or persistent data elements and other rungs authenticate changing data elements. In some embodiments where a new data series is formed, an embodiment of the getData function may be used in forming the new data series.

Is some DNSSEC embodiments, MTPK RRSIG RRs may be created dynamically. These embodiments may be used as a means for minimizing the amount of processing devoted to signature creation when it is anticipated that a fraction of the RRSIG RRs applicable to the RRset data series will be returned in DNS responses during the lifespan of a MTPK. In some scenarios where MTPK RRSIGs can be generated rapidly on demand, these embodiments will provide the benefit of spreading over time the computer processing used for signature generation.

In some embodiments, the methods for dynamic MTPK creation and MTPK signature creation are embodiments of the methods applicable to Merkle tree authenticators, reference values and witnesses. In addition to the motivating factors for dynamic MTPK creation described above, the motivation for dynamic creation could be based on the following factors: frequency of changes to RRsets in a zone; frequency of publishing MTPKs; the size and composition of a zone; computational capabilities; operational complexity; and/or other factors.

In some embodiments, RRSIG RRs may be dynamically created in batches rather than individually. In addition to the previously noted factors for dynamic creation of MTPK RRSIGs, dynamic batch creation may be desirable due to factors, such as: impact on DNS query response time; percentage of signed RRsets expected to be returned during the lifespan of a MTPK; likelihood that the signed RRset will be included in a DNSSEC response during the lifespan of a MTPK; signature validity periods of RRSIGs; and/or TTLs for cached RRSIGs. Other factors may be assessed in determining the utility and timing of dynamic RRSIG creation and dynamic RRSIG batch creation.

MTPKs for Subtrees

In some embodiments, subseries of RRsets within a data series may be selected as the source data series for an MTPK authenticating just the selected subseries. The methods for selection use the techniques described above for RRset ordering to identify applicable subseries. In some cases, a MTPK Merkle tree for a subseries may be a subtree of a MTPK Merkle tree that authenticates an encompassing data series. In this case, the subtree does may or may not be generated independently of the overall MTPK Merkle tree. Also in this case, the root of the subtree may be used as the public key in the MTPK DNSKEY RR that authenticates the subseries. In some embodiments, an embodiment of the getAuth function may be used to create an MTPK authenticator from a subtree of a containing MTPK authenticator.

In some embodiments, a subseries' starting and ending identifiers are such that a MTPK Merkle tree authenticating the subseries would not be a subtree of MTPK Merkle tree authenticator for an encompassing data series. In this case, an embodiment of the getReference Value function may be used to generate a new MTPK Merkle tree for the subseries. In some embodiments, an embodiment of the checkSub function may be used to determine whether or not the starting and ending identifiers for a subseries indicate that a Merkle tree authenticating the subseries is a subtree of the MTPK Merkle tree authenticator for an encompassing data series.

In some embodiments, it may be desirable to create a separate data series to be authenticated by a new MTPK rather than having a MTPK authenticator created for a subseries. In this scenario, an embodiment of the getData function may be used to create the separate data series by extracting date series elements from the original data series. In some embodiments, an embodiment of the getAuth function may be used to create a separate data series and MTPK authenticator for the separate data series. Once the new data series is created, MTPK authenticators, public keys, and signatures may be created using the methods described herein.

Batch Updates and Merging MTPK Authenticators

In some embodiments, MTPK authenticators may be updated over time by creating batches of RRsets that are appended to a data series for the MTPK authenticator and then having the MTPK authenticator updated using an embodiment of the getReferencevalue function. In some embodiments, the methods defined for batch updating of Merkle tree authenticators are applied in the embodiments.

In some embodiments, MTPK authenticators may be created and later merged. The steps used in creating an individual MTPK authenticators may be a batch operation. The steps used in merging Merkle tree authenticators may also be a batch operation. Methods for performing merging of MTPK authenticators may be provided by embodiments of the methods described for merging Merkle tree authenticators.

In an embodiment of batch updating using merge methods, an embodiment of the method for the optimized merge function for Merkle tree authenticators may be used. In this embodiment, an initial MTPK authenticator may be created with a number of leaves that is the largest power of two that is less than or equal to the number of RRsets in a data series including RRsets to be signed. Furthermore, additional MTPK authenticators are created where each additional MTPK authenticator authenticates a number of leaves that is the largest power of two that is less than or equal to the number of remaining RRsets. This process is repeated to create MTPK authenticators until either the RRsets are authenticated by an MTPK, or some minimum "batch" size is reached. Also in this method, MTPKs are merged when two MTPKs with an equal number of leaves and which cover a consecutive series of RRset identifiers are formed. This merger of equal size trees where both trees have a number of leaves that is a power of two guarantees that MTPKs formed by merging will have a number of leaves that is a power of two.

In another embodiment of batch updating, new or changed RRsets are appended to the data series for an existing MTPK authenticator then the getReference Value or getAuth function is used to create a MTPK authenticating the new or changed RRsets and a new MTPK for the entire updated data series. In such embodiments, the method may be more efficient at creating a new MTPK for the entire data series when the number of new or changed data series elements being appended is a power of two and number of data series elements that are leaves for the MTPK authenticator before appending is a power of two. This method is efficient when the number of new or changed data series elements being appended is a power of two and this number is equal to the number of leaves for the MTPK authenticator before the update.

Minimizing MTPK Signature Sizes

In some embodiments, it is desirable to have methods that minimize the size of authentication paths in MTPK RRSIG RRs. In general, these methods use a partial authentication path in the RRSIG and rely on a resolver to access the remaining portion of the authentication path from some other source. In some embodiments, a resolver may cache authentication path elements that correspond to nodes in top levels of the MTPK Merkle tree authenticator and an RRSIG will contain authentication path elements for nodes below those top levels. In these embodiments, the full authentication path may be constructed by concatenating the authentication path from the RRSIG with cached authentication path elements. In some embodiments, a resolver may cache an MTPK Merkle tree authenticator and construct an authentication path based on a leaf identifier contained in a signature and the [L:R] values associated with the MTPK public key associated with the signature.

In some embodiments, a nameserver, such as a DNS nameserver, may be able to provide both partial and/or complete authentication paths in RRSIGs. In these embodiments, a resolver, such as a DNS resolver, may indicate it has cached a partial authentication path applicable to the desired signature, this resulting in a truncated authentication path being returned in the RRSIG element of a response. The indication may be provided as an element of a DNS query or may be provided by an out-of-band mechanism. When a resolver has not indicated it has cached a partial authentication path, a nameserver returns a complete authentication path in the RRSIG element of a response. In some embodiments where a nameserver returns a partial authentication path or is relying on the resolver to construct an authentication path, the response element for the RRSIG may include references to authentication path elements that are expected to have been cached by the resolver with an expectation that the resolver will be able to construct an authentication path based on the references.

Null MTPK Merkle Tree Leaves

In some embodiments, it may be desirable to have Merkle tree leaves that represent non-existent or null RRsets. This could occur due to several circumstances. When an RRset is deleted, it may be desirable to retain a current Merkle tree size and structure, so a null leaf derived from a null data series value to replace a leaf that corresponds to the deleted RRset. In some scenarios where a timing constraint uses a MTPK authenticator be generated for newly added or updated RRsets appended to a data series or batch, but not enough have been appended to reach a desired power of 2 for the number of elements in the data series or batch (or a multiple of a desired power of 2), null RRset values may be appended to the data series so that the desired power of 2 (or multiple) is reached. For example, for a data series has 16 elements, it may be desirable to pad the data series to reach 24 elements (e.g., a multiple of $2^3$) rather than to pad to reach 32 elements ($2^5$).

A null Merkle tree leaf may be generated by having a null value placed in the data series element that has an identifier corresponding to the leaf identifier. In this case, a value that represents null is used for the data series element and this value is then used as an input in calculating the hash that includes the leaf. This approach works well when the elements in a data series are defined within the data series for the MTPK authenticator. In other embodiments, an MTPK authenticator may authenticate a data series that has gaps in the data series being authenticated. In these scenarios, a null value may be defined for use in calculating leaf nodes for data series elements that are not defined due to gaps.

In some embodiments, a Merkle tree leaf may be marked as "invalid" based on an update to a data series record or deletion of a data series record. In these embodiments, the Merkle tree may remain unchanged if the invalid mark is external to the Merkle tree with this eliminating the need to recalculate the Merkle tree that use of null leaves to replace data series records entails. The invalid mark is then considered during witness creation as an indicator that a witness should not be created based on the invalid tree leaf. In this case, a witness creation algorithm may return an indicator that the data series record is no longer valid. In some embodiments where a data series record is appended to a data series as a replacement for the no longer valid data series record, a reference to the replacement data series record may be returned. In some embodiments, a witness may be returned for the replacement data series record and an indicator returned indicating the witness applies to the replacement data series record.

In some embodiments of batch updating using merge methods, an initial MTPK may be created that has a number of leaves that is equal to a power of two that is greater than the number of RRsets. The leaves for this MTPK authenticator that have identifiers greater than the number of RRsets may be set to a "null" value or may be created as a hash with inputs that do not include an RRset. Batch updating may then include using the batch update process and merge functions to create authenticators for new or changed RRsets. These authenticators may then then be inserted into the MTPK authenticator as an overwrite of subtrees that have null leaves. Once the authenticators are inserted, ancestor nodes for the inserted authenticators within the merged authenticator may be updated using the getReference Value function.

In some embodiments, RRsets that are already in the RRset data series may be duplicated as new data series elements that are inserted into the data series or appended to it. This may be done for a number of reasons. The original RRset data series element may be in a portion of the data series that is targeted for future deletion. The duplicate RRset data element may be authenticated by a subtree of the MTPK Merkle tree authenticator that will be used as part of an MTPK authenticator for just the data series elements authenticated by the subtree where the subtree derived MTPK authenticator is desirable due to some expected attribute of the authenticator, such as it being long-lived. Duplicated RRset data elements may also be appended to a data series to pad it to a desired length as part of batch creation of Merkle tree authenticators.

Trimming Merkle Trees and Garbage Collection of Unused Merkle Tree Nodes

In some embodiments, garbage collection of unneeded nodes may be performed. For example, unneeded nodes may be trimmed or removed from the collection of nodes for MTPK Merkle tree authenticator. These embodiments use the methods for garbage collection that were described for Merkle tree authenticators. Garbage collection may be generally applicable to Merkle trees that have had their structure changed as they have evolved. This could be due to elements being deleted or a change in structure due to Merkle tree construction and update algorithm being used.

Addressing Key Tags in MTPK RRSIGs

Some embodiments include a method to deal with a DNSSEC-specific issue that comes into play due to the way DNSSEC specifies the use of key tags. Key tags are embedded in RRSIG RRs and are part of the input to the signature calculation performed using a DNSKEY private key, along with the RRset being signed. Key tag values are calculated from the corresponding DNSKEY public key using elements of the DNSKEY RR as input, including the public key from the DNSKEY RR. When the RRset and elements of the RRSIG RR are then digitally signed by a MTPK in the synthesized zone-signing approach, it results in a new MTPK value which can validate the RRSIG. The key tag that results from the new MTPK value must match the key tag that was included in the elements of the RRSIG RR that were input to the signature operation, which results in a recursive loop problem (as described herein) where the MTPK value must be known before signing the RRset but signing the RRset determines the MTPK. In some embodiments, the following method may be incorporated to avoid the recursive loop. When a MTPK is created, an arbitrary key tag value is chosen for inclusion as an element of the RRSIG RR. An additional fixing value is then appended to or otherwise combined with the MTPK that is computed from the RRset, the key tag and other inputs, such that the subsequent key tag calculation on the combination of the fixing value and the MTPK will result in a match to the chosen key tag. The public key included in the DNSKEY record would then include both the fixing value and the MTPK. In an embodiment, the fixing value can be determined by successively trying values in the range of 0 to 65535 until the calculated key tag matches the desired key tag. Alternatively, the fixing value could be mathematically determined according to an inverse of the key tag calculation algorithm.

Minimizing the DNSKEY RRset Size with MTPKs

MTPKs may also be used to minimize the size of the DNSKEY RRset. This approach addresses the issue of DNSKEY RRset sizes causing DNS responses to exceed UDP MTUs. The approach uses a DNSKEY RRset including two RRs, one for the KSK and one for the ZSK. The public key fields of these RRs are MTPK public keys that authenticate public keys that correspond to the private keys that do the actual signing of RRsets. In an embodiment similar to the flattened signature approach described in U.S. Provisional Patent Application No. 63/239,130 ("Methods and Systems for Flattened Electronic Signatures") filed on Aug. 31, 2021, which is incorporated herein by reference, the actual public keys could be embedded in or referenced by RRSIGs. The RRSIGs would also contain a MTPK authentication path verifiable by the applicable MTPK KSK or ZSK. In some embodiments, the public keys corresponding to the actual signing private keys could reside in a new RR type that is signed by a MTPK KSK or ZSK. In these embodiments, a hash or other identifier of the signing key could be included in an RRSIG record as a signature element and used as an identifier for selecting the RR for the public key corresponding to the signing private key.

Trust Chain Flattening

In some embodiments, signatures on DNS resource records that are intended to be verified with MTPKs may be formed differently than in an ordinary signature scheme. Instead of generating a public key/private key pair and then signing resource records using the private key to obtain their signatures, as contemplated by the ordinary signature scheme, the public key is obtained by forming a Merkle tree from the resource records (and other signature fields, such as a validity period), and the signatures are obtained from the authentication paths through the Merkle tree, as contemplated by the synthesized ZSK approach. In either case, a verifier may validate the signature on a resource record using the public key. The difference is that, for the ordinary signature scheme, the public key may be generated before it is known which records will be signed, and in the synthesized ZSK approach, the public key is obtained after the records to be signed are available.

The delay in the synthesized ZSK becoming known introduces potential complications in the process for generating a signature on the synthesized public key using a key at the next level of the DNSSEC key hierarchy. In a conventional scenario where the public key is non-synthesized, the next-level signature may be generated on a periodic basis, for instance in predetermined intervals, such as once a quarter (i.e., once every 3 months) in a key signing ceremony, and the next-level signature may be applied to one or more public keys to be used for a period of time until the next key signing ceremony. This scenario is not applicable to synthesized public keys generated between ceremonies, so a different key-signing approach may be used.

A possible approach may be to diverge from the conventional use of a two-level key hierarchy and introduce mid-level keys, e.g., pre-signed ZSKs, for signing the synthesized ZSKs. However, in a DNS use case, this has the drawback of requiring changes to the DNSSEC architecture, which is currently limited to a predetermined number of levels of keys (e.g., two levels of keys) per zone.

Some embodiments may avoid the drawback by taking the approach of introducing a non-synthesized ZSK as a mid-level key and "flattening" a KSK signature on the non-synthesized ZSK and a non-synthesized ZSK signature on the synthesized ZSKs into a single level. The details of trust chain flattening are described in U.S. Provisional Patent Application No. 63/239,130 ("Methods and Systems for Flattened Electronic Signatures") filed on Aug. 31, 2021, which is incorporated herein by reference.

Key Tag Fixing

Figure 23:
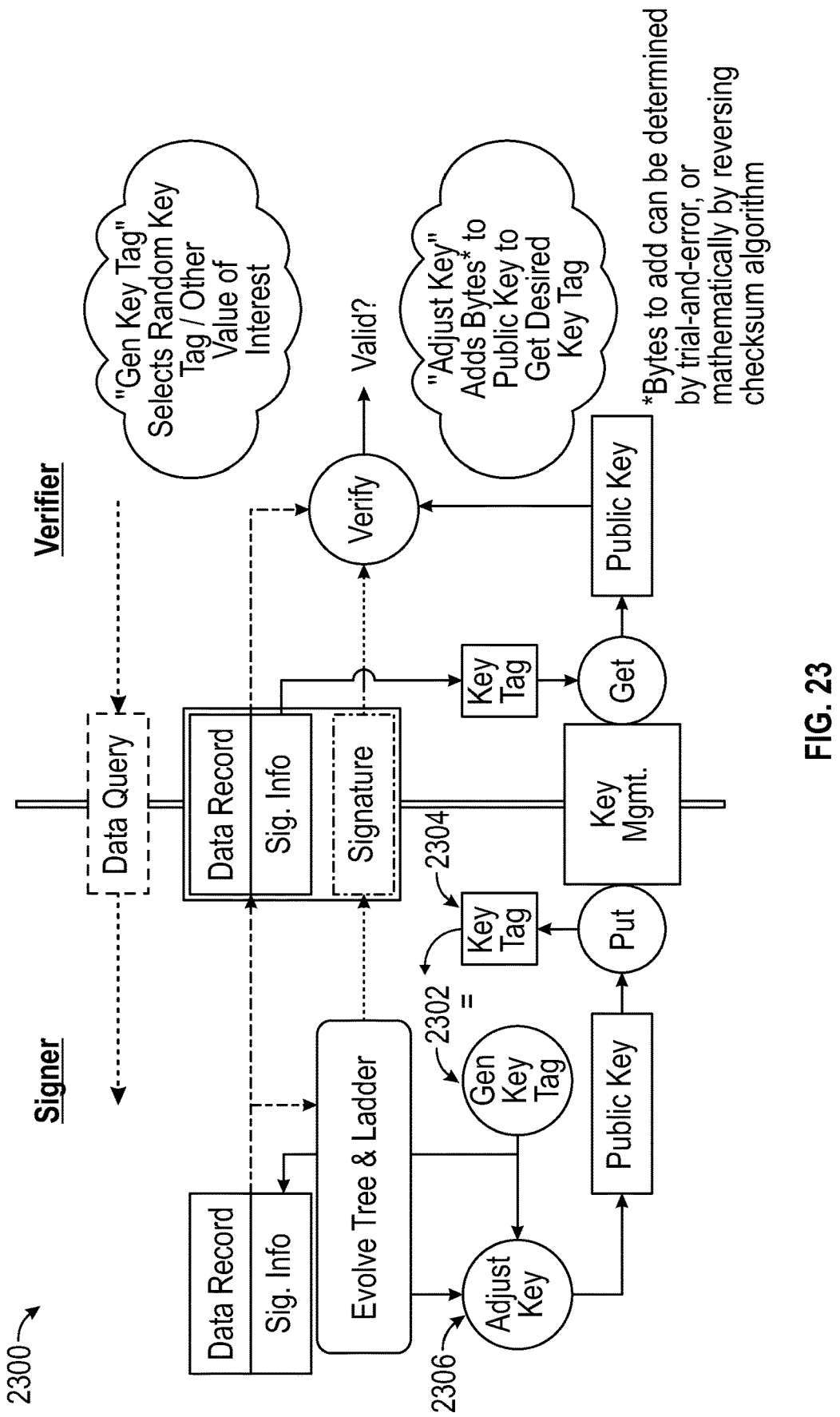
FIG. 23 illustrates an example method for key tag fixing, according to an embodiment.

In DNSSEC, a key tag is 16-bit checksum of public key bytes. Key tags are embedded in RRSIG RRs and are part of the input to the signature calculation performed using a DNSKEY private key, along with the RRset being signed. Key tag values are calculated from the corresponding DNS-KEY public key using elements of the DNSKEY RR as input, including the public key from the DNSKEY RR. When the RRset and elements of the RRSIG RR are then digitally signed by an MTPK in the synthesized zone-signing approach, it results in a new MTPK value which can validate the RRSIG. The key tag that results from the new MTPK value must match the key tag that was included in the elements of the RRSIG RR that were input to the signature operation, which results in a recursive loop problem where the MTPK value must be known before signing the RRset but signing the RRset determines the MTPK. In some embodiments, the following method may be incorporated to avoid the recursive loop. When an MTPK is created, an arbitrary key tag value is chosen for inclusion as an element of the RRSIG RR. An additional fixing value is then appended to the MTPK that is computed from the RRset, the key tag and other inputs, such that the subsequent key tag calculation on the combination of the fixing value and the MTPK will result in a match to the chosen key tag. The public key included in the DNSKEY record would then include both the fixing value and the MTPK. In an embodiment, the fixing value can be determined by successively trying values in the range of 0 to 65535 until the calculated key tag matches the desired key tag. Alternatively, the fixing value could be mathematically determined according to an inverse of the key tag calculation algorithm. FIG. 23 illustrates an example system 2300 for performing key tag fixing. Gen Key Tag module 2302 selects an arbitrary key tag value 2304. Adjust Key module 2306 may add bytes to the MTPK, the public key 2308, such that the subsequent key tag calculation on the combination of the fixing value and the MTPK will result in a match to the selected arbitrary key tag 2304.

In ordinary DNSSEC, different public keys may occasionally have the same key tag, but this key tag collision is by accident, not by design. When a collision occurs, a verifier may try each of the public keys corresponding to the colliding key tag to verify a signature.

In some embodiments, multiple compatible public keys may be adjusted with the key tag fixing method to have a common key tag. A verifier may automatically try each of the compatible public keys per DNSSEC verification logic. Designed key tag collisions may facilitate using ladders as public keys rather than individual rungs. In some embodiments, a common key may be assigned to compatible ladders. The verification operation may use a rung within a ladder that is compatible with authentication path. A ladder public key may have a number of advantages. The system may manage fewer number of public keys compared with a per-rung public key. Also, memory space for overall public keys may be reduced because the tree identifier and other per-key overhead within each per-rung public key may be deduplicated.

Public Key Filtering

Figure 24:
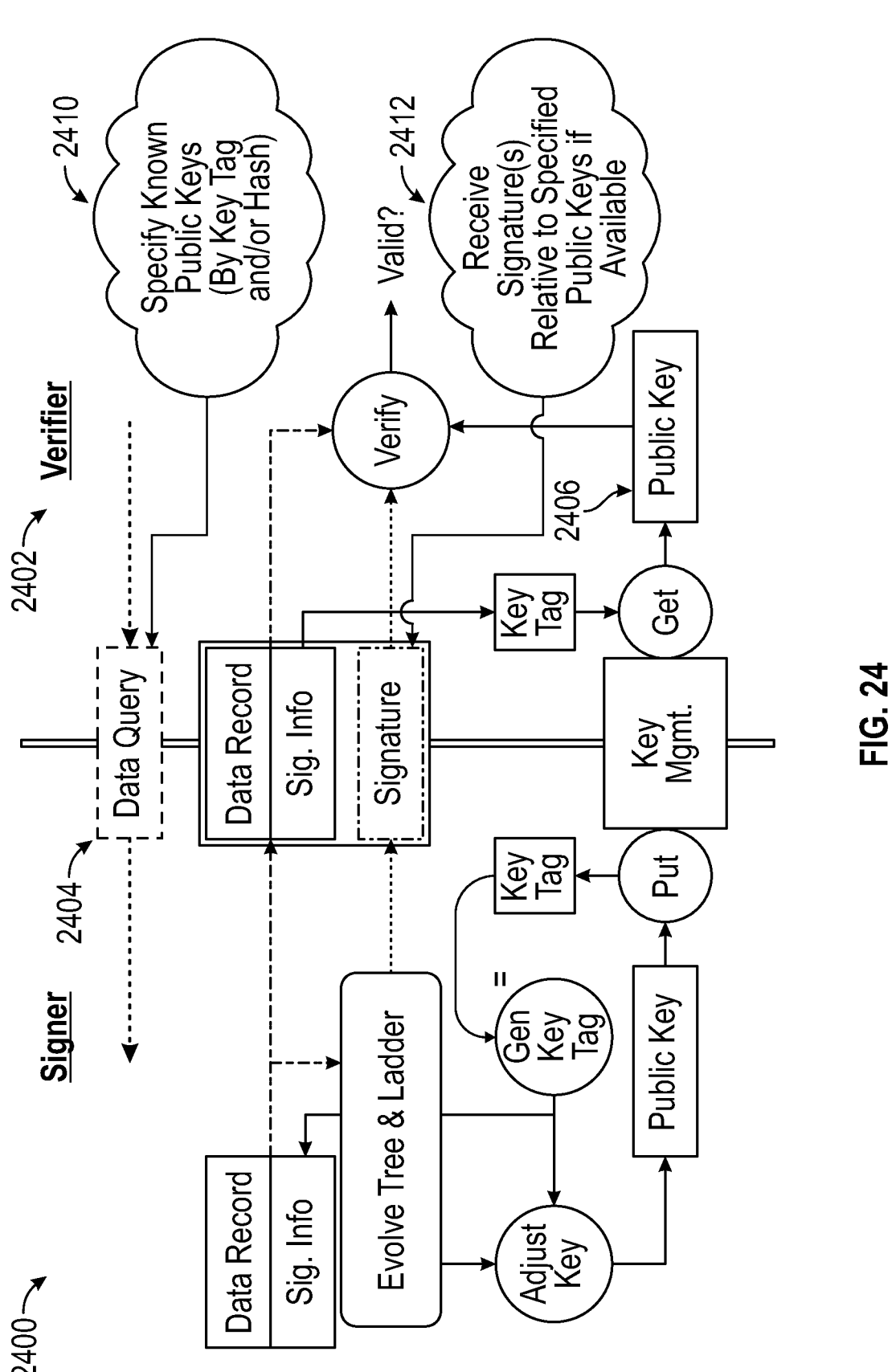
FIG. 24 illustrates an example scenario for public key filtering, according to an embodiment.

In some embodiments, a verifier may specify public keys that the verifier already has in a key record query. In some embodiments, the verifier may specify the public keys by key tag and/or hash. A signer may determine whether a signature relative to one of the specified public keys. If a signature relative to one of the specified public keys exists, the signer may return the signature relative to the one of the specified public keys rather than a signature relative to a rung in a current ladder. With this approach, endurance of the ladder may be improved. Also, the length of the responses may be shortened. FIG. 24 illustrates an example system 2400 for performing the public key filtering. In the scenario illustrated in FIG. 24, the verifier 2402 may specify (operation 2410) the public keys the verifier 2402 is interested when making a key record query 2404 to get an adapted response (operation 2412) that includes at least these public keys 2406. This approach may allow to effectively achieve the benefits of the full-rung strategy even if the actual rung strategy publishes a portion of the rungs.

Efficient Signature Provisioning

With MTPKs, signing one data record may potentially affect signatures on many other data records. When data set is updated, a provisioning system may update Merkle tree based on the updated data set, publish the updated tree root as an MTPK, transmit information sufficient to update the data set to a name server, and transmit information sufficient to provide signatures relative to the updated tree root. The name server may provide a data record in the updated data set and a signature on the data record relative to the updated tree root upon receiving a query from a verifier. According to one or more embodiments described herein, a provisioning system may provide leaf nodes corresponding to leaves for data elements that have an index greater than the highest index the verifier has previously seen. The verifier can then construct the Merkle trees used for producing authentication paths for any MTPKs up to new maximum index value. In one embodiment with a maximal approach, the provisioning system may transmit new and updated signatures as information sufficient to provide signature relative to the updated tree root. As described herein, no longer valid data series elements and/or leaves can be marked, but the no longer valid data series elements and/or leaves can be left in the Merkle tree to avoid rebuilding the Merkle tree. With this approach the name server may or may not perform a hash tree computation. The maximal approach can readily be implemented with "ordinary" incremental zone transfers: The provisioning system transmits the full updated signature (i.e., RRSIG) records to the name server. In another embodiment with a minimal approach, the provisioning system may transmit leaf node identifiers for the updated data records. The name server may construct an updated Merkle tree and obtain signatures by copying tree nodes when signatures are to be used. The minimal approach can also readily be implemented: The provisioning system transmits partial updated signature records including leaf node identifiers. Records can be considered a special signature type that the name server then converts to a full signature record. In yet another embodiment with a medium approach, the provisioning system may transmit leaf node identifiers for updated data records and updated Merkle tree nodes. The name server may obtain signatures by copying Merkle tree nodes when signatures are to be used. The name server does not need to construct a Merkle tree itself. The medium approach may implement a way to encode tree nodes as DNS records in order to use ordinary incremental zone transfers: Example: <L>.<R>.<S>._mtpk.example.com <record type><node value>, where "_mtpk" label indicates that the records are nodes in a Merkle Tree. <L>.<R> is the node identifier (spanning leaf nodes from L to R). <S> is the tree identifier. Name is hierarchical, so trees can be delegated to different name servers. Other naming schemes may also be used, e.g., adding another label for tree type, hash function parameters; combining <L> and <R> into one label. New record type could be used, or TXT or other existing type.

Refreshing DNSKEY RRset

When a verifier is not able to verify a response because the Merkle tree ladder information the verifier has does not cover data record of interest, the verifier gets a new ladder or rung. In the current DNSSEC procedures, a DNSKEY RRset may not be refreshed until the DNSKEY RRset expires. Some embodiments include a method to resolve the issue of refreshing DNSKEY RRset including synthesized public keys. When MTPKs are recorded in the DNSKEY RRset as public keys, one of the followings may be recorded: (1) ladder public keys with colliding key tags (2) rung public keys with colliding key tags, and (3) rung public keys with non-colliding key tags. When a ladder is used as a public key as in (1), multiple rungs may be checked within the public key and one public key may be updated when data records are updated. The modes with colliding key tags as in (1) and (2) may automatically support backward compatibility. With the colliding key tags, a verifier may check more than one public key for verifying a data record with a signature.

Refreshing when TTL Expires

In some embodiments, a verifier may request new DNSKEY RRset when the TTL associated with the DNSKEY RRset expires. When a data record is not verifiable with the current DNSKEY RRset, a signer may return a non-MTPK signature until the DNSKEY RRset is refreshed. The signer may be able to adjust TTL and/or DNSKEY publication interval so that non-MTPK signatures include a low fraction of total responses returned. While refreshing DNSKEY RRset upon an expiration of the TTL is a "standard" or common practice protocol, a verifier may operate differently for certain signature algorithms. In some embodiments, the verifier may specify which public keys the verifier has in a query. The verifier may specify the public keys using key tags and/or hash values. The signer may return a MTPK signature relative to one of the specified public keys if possible. This approach may be applicable to (1) ladder public keys with colliding key tags (2) rung public keys with colliding key tags, and (3) rung public keys with non-colliding key tags.

Refreshing when Signature is Invalid

In some embodiments, a verifier may request a new DNSKEY RRset when a signature verification fails. In a current DNSSEC system, a signature verification failure may mean that the data record or the signature is invalid rather than public key. Thus, this approach may require considerable modifications to the verification logic. This approach may be applicable to (1) ladder public keys with colliding key tags (2) rung public keys with colliding key tags, and (3) rung public keys with non-colliding key tags.

Refreshing when No Matching Key Exists

In some embodiments, a verifier may request a new DNSKEY RRset when a current DNSKEY RRset does not have a public key that matches any of the signatures returned by a signer as a part of a general DNSSEC validation logic, not within a verification operation. In a current DNSSEC system, no matching public key in the DNSKEY RRset may mean that the signature is invalid. Thus, this approach may require considerable modifications to the DNSSEC validation logic. This approach may mainly be applicable to (3) rung public keys with non-colliding key tags, although this approach may be applicable to a variant of (2) rung public keys with colliding key tags.

In some embodiments, a signer may specify public keys that are currently being used in a response. The signer may specify the public keys with hash values because the key tag identification is already in the response. A verifier may refresh a DNSKEY RRset if the verifier does not have one or more of the specified public keys. In some embodiments, the verifier may include a request for the specified list of public keys. In response to the request, the signer may specify the public keys that are currently being used. This variant may be applicable to (1) ladder public keys with colliding key tags (2) rung public keys with colliding key tags, and (3) rung public keys with non-colliding key tags.

Refreshing within Verification Operation

In some embodiments, a verifier may request a new DNSKEY RRset when a condition is met during the verification operation. The condition may include that index of the data record of interest is outside a span of the currently available keys, or that index of the data record of interest is within a span of the currently available keys, but no available public key matches the signature provided in the response. This approach may use modifications of the verification operation. This approach may be applicable to (1) ladder public keys with colliding key tags (2) rung public keys with colliding key tags, and (3) rung public keys with non-colliding key tags.

In some embodiments, MTPKs may be published at a location other than a main DNSKEY RRset. A signer may publish a MTPK location prefix (e.g., DNS name/type or URI) as a public key in the main DNSKEY RRset. A verifier may look up MTPKs as needed during verification operations. The verifier may determine an actual location based on fields of the signature value, e.g., tree identifier, node identifier, and ladder name. In some embodiments, signatures may have a semi-indirect format including (a) direct information, such as authentication path, and (b) a pointer to an alternative location. According to one or more embodiments described herein, the semi-indirect format can be made generic, supporting other algorithms, such as a condensed signature with a handle. The pointer may be based in part on a prefix published in a DNSKEY RRset. The verifier may verify a signature in two steps. In the first step, the verifier may verify indirect information (e.g., ladder or rung). In some embodiments, the verifier may check a cache for the ladder or the rung. If cache misses the ladder or the rung, the verifier may look up the ladder or the rung and verify the indirect information. In case the indirect information is associated with a ladder, the verifier may be able to determine which rung is to be used based on signature fields. The verifier may first check a cache for the rung. If the cache misses, the verifier may look up the ladder and access the rung from the ladder. In some embodiments, the verifier may check the cache for other backward compatible rungs along the authentication path. In the second step, the verifier may the verify direct information (e.g., an authentication path) using the indirect information. The verifier may also be able to optimize the verification procedure based on knowledge of how the alternative location is managed based on fields, such as tree identifier, node identifier, etc. Alternatively, or in addition, the signer may authenticate MTPKs via a non-MTPK ZSK in a main DNSKEY RRset. For example, the non-MTPK ZSK may be a public key for a NIST PQC underlying signature algorithm. The location management of the MTPK may be separated from main DNSKEY RRset. Updating MTPKs may not refresh the DNSKEY RRset.

Non-Colliding Key Tag Considerations

When different public keys are associated with different key tags and signature calculation depends on key tag bytes, a single Merkle tree cannot be evolved directly as new data records are added because old node calculations cannot be reused. In some embodiments, the key tag bytes may be skipped during actual signature calculation. While this approach may enable the old node calculations to be reused, the approach may break an abstraction layer and potentially may impact a security proof. In other embodiments, more than one Merkle tree leading to different public keys may be generated with different key tags in parallel when new data records are added to the data series. As an example and not by way of limitation, trees leading to public keys [1:1], [1:2], [3:3], [1:4], [5:5], [5:6], [7:7], [1:8] may be generated, where each public key may be associated with its own key tag if a Binary Rung Strategy is used. In some embodiments, calculating the [L:R] public key may be calculated starting at iteration $L+2^j-1$, where $2^j$ is the largest power of 2 dividing R. In other words, $L=R-2^j+1$ in a binary strategy. With this approach, Merkle trees with a given L may be added gradually as N increases.

Caching at Resolver

Figure 26:
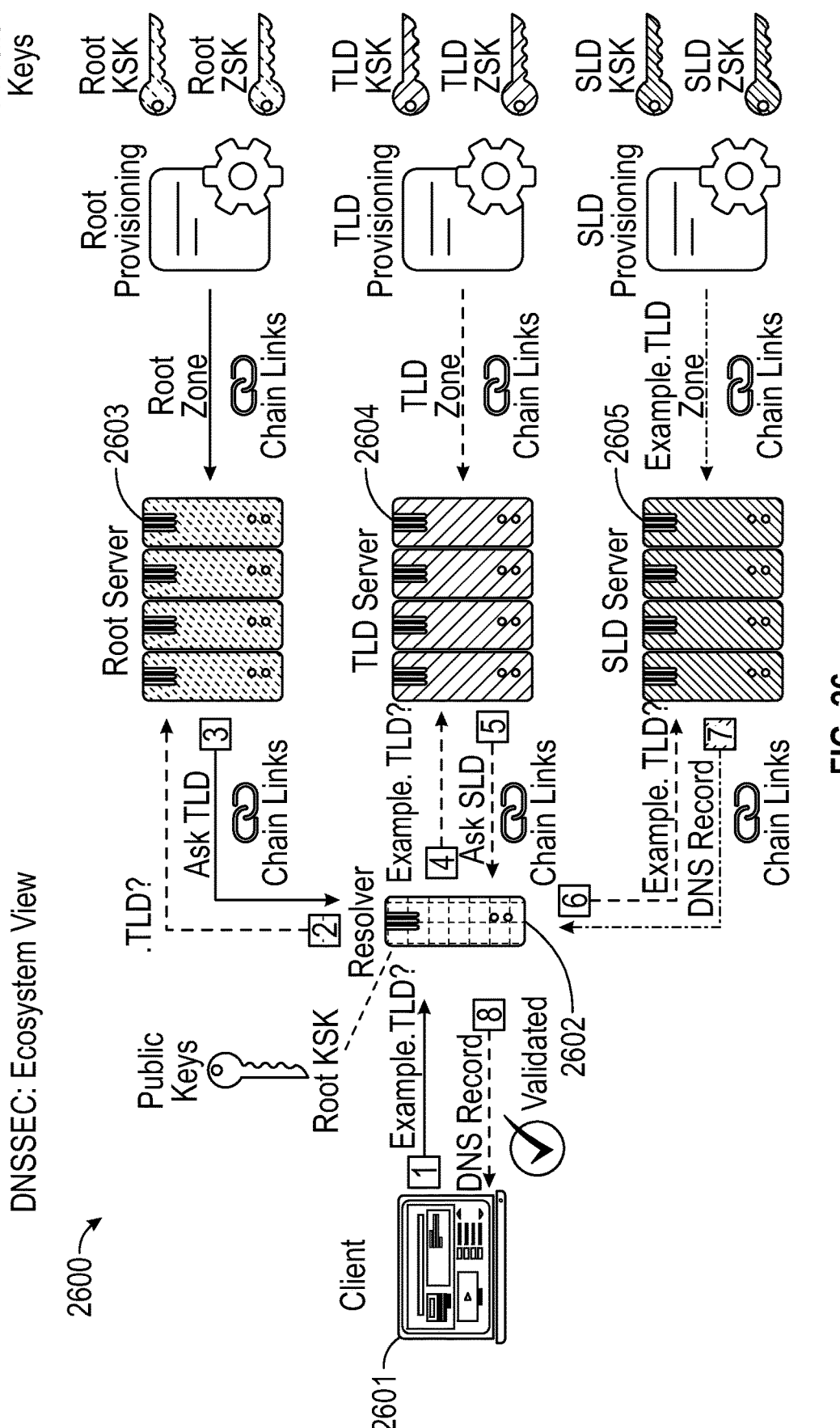
FIG. 26 depicts an example of a Domain Name Service (DNS) system that facilitates secure validation and/or retrieval of resource records, according to an embodiment.

As depicted in FIG. 26, an exemplary DNS ecosystem may include a client device, a resolver, and a number of hierarchical name servers. As a data series is updated, signatures on data records may be updated as well so that the signatures include an authentication path compatible with current ladder. A name server can help a resolver keep its signatures up to date by returning signatures relative to the current ladder. The resolver can request the current ladder (or rung) if the resolver does not already have it. In some embodiments, the resolver may be able to verify a signature using previously obtained rungs, including via backward compatibility even if the resolver does not have a current ladder. Conventional caching at the resolver may not be as helpful to the client because a cached signature may be relative to an old ladder/rung that the client does not have. The client can request the older ladder (or rung) in such a scenario. However, this may not be desirable as this could increase the frequency of the client's ladder (or rung) queries, and number of old ladders (or rungs) the client has to manage. A number of alternative approaches may be available for the resolver to mitigate the client signature synchronization issue. The resolver may not cache signatures at all. However, this may result in significantly more queries to name servers and increasing the response time as a result. In some embodiments, the resolver may refresh one or more of its signatures when the name server publishes a new ladder and a cached signature is incompatible with the new ladder. This could result in a rush of queries to the name server if many signatures become incompatible at once. In some embodiments, the resolver may purge a signature from its cache when the signature becomes incompatible with the ladder, but the resolver may wait until the resolver receives a query for the signature from a client to refresh the signature. With this approach, queries to name server would be spread out based on client request patterns. In other embodiments, a resolver could update the signature on a data record locally based on knowledge of other data records' authentication paths and their associated MTPKs. In yet another embodiment, a resolver may build and maintain a local copy of the Merkle tree, based on results of its queries to the name servers or based on an out-of-band method by which the resolver has received information sufficient to construct signatures, then derive signatures and MTPKs from the locally maintained Merkle tree. In some embodiments, a resolver may implement a local name server instance to benefit from provisioning optimizations.

Certain embodiments may combine one or more portions of the methods and systems related to Merkle trees (such as any of the methods and/or systems discussed with respect to FIGS. 1-19) with one or more of a portion of the methods and systems described therein. In some embodiments, the methods described with relation to the creation, updating, and optimizing of Merkle trees may be implemented in various authentication applications known in the art. For example, as described above, at least a portion of the methods relating to Merkle trees may be implemented in Domain Name Server (DNS) applications, such as DNSSEC.

Example Method

FIG. 25 depicts an example flow diagram 2500 of a computer implemented method, according to an exemplary embodiment. For example, flow diagram 2500 depicts a method of electronically signing an evolving plurality of internet data records, the method includes generating, using at least one electronic processor, a first plurality of leaf nodes from the evolving plurality of internet data records, constructing, using the at least one electronic processor, a first recursive hash tree from the first plurality of leaf nodes 1, the first recursive hash tree including a first plurality of nodes, the first plurality of nodes including the first plurality of leaf nodes and a first root node, wherein a first subset of nodes of the first plurality of nodes each include a leaf node and a second subset of nodes of the first plurality of nodes each include a hash of data including one or more child nodes, deriving, using the at least one electronic processor, first information sufficient to validate the first root node based on the first root node or a hash of the first root node, publishing, as a first synthesized public key, the first information sufficient to validate the first root node, transmitting, through the internet, first information sufficient to maintain an evolving state, wherein the evolving state is sufficient to provide, through the internet, and as a first signature on a first at least one internet data record of the evolving plurality of internet data records, first validation data from the first recursive hash tree, wherein the first at least one internet data record of the evolving plurality of internet data records is validatable using at least the first validation data and the first synthesized public key by reconstructing a portion of the first recursive hash tree up to and including the first root node using the first validation data to obtain a first accumulated hash value and determining that the first signature on the first at least one internet data record of the first plurality of internet data records is valid by confirming that the first accumulated hash value is consistent with the first synthesized public key; updating, using the at least one electronic processor, the evolving plurality of internet data records, updating, using at least one electronic processor, a second plurality of leaf nodes from the updated evolving plurality of internet data records, updating, using the at least one electronic processor, a second recursive hash tree from the second set of leaf nodes, the second recursive hash tree including a second plurality of nodes, the second plurality of nodes including the second plurality of leaf nodes and a second root node, wherein a first subset of nodes of the second plurality of nodes each include a leaf node and a fourth subset of nodes of the second plurality of nodes each include a hash of data including one or more child nodes, deriving, using the at least one electronic processor, second information sufficient to validate the second root node based on the second root node or a hash of the second root node, publishing, as a second synthesized public key, the second information sufficient to validate the second root node, and transmitting, through the internet, second information sufficient to update the evolving state, wherein the updated evolving state is sufficient to provide, through the internet, and as a second signature on a second at least one internet data record of the evolving set of internet data records, second validation data from the second recursive hash tree, wherein the second at least one internet data record of the updated evolving set of internet data records is validatable using at least the second validation data and the second synthesized public key by updating a portion of the second recursive hash tree up to and including the second root node using the second validation data to obtain a second accumulated hash value and determining that the second signature on the second at least one internet data record of the second plurality of internet data records is valid by confirming that the second accumulated hash value is consistent with the second synthesized public key.

It is to be appreciated that this method is exemplary and in alternative or additional embodiments, steps and/or operations may be added, omitted, or otherwise modified based on the particular application.

Example System

FIG. 26 depicts an example of a Domain Name System Security Extensions (DNSSEC) system 2600 that facilitates secure validation and/or retrieval of resource records, according to an exemplary embodiment. For example, the DNS system 2600 depicts an ecosystem including a client device 2601, a resolver 2602, a root server 2603, a top level domain (TLD) server 2604, a second level domain (SLD) server 2605, and communication channels therebetween.

Figure 27:
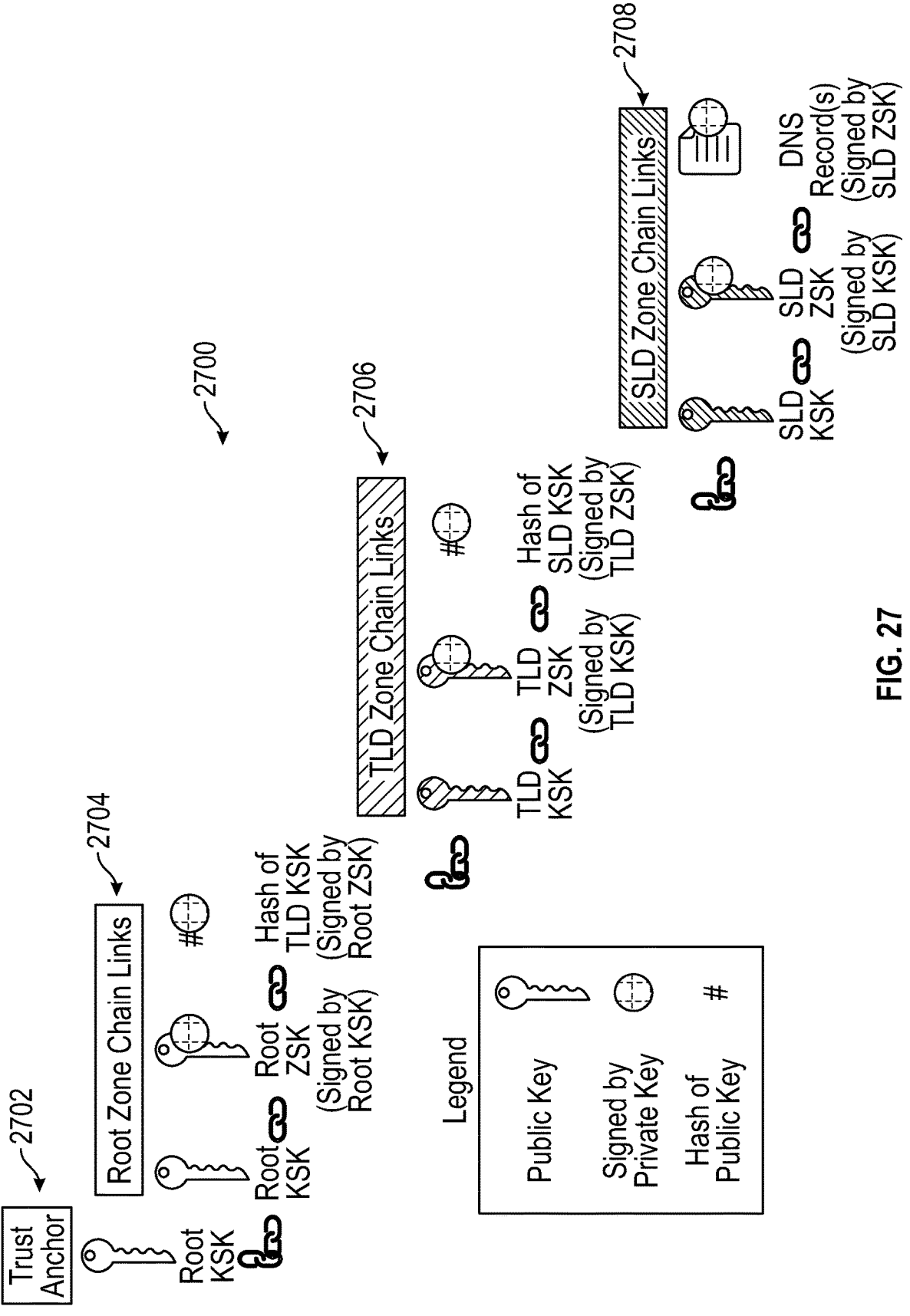
FIG. 27 depicts an example of a DNSSEC chain, according to an embodiment.

FIG. 27 depicts an example of a DNSSEC chain 2700, accordingly to an embodiment. In some embodiments, each level of the DNS hierarchy will now have public keys. In this simplified view, there are two keys per level-a Key Signing Key (KSK) and a Zone Signing Key (ZSK). Note that the private keys are shown in association with the provisioning system. This is a typical implementation approach, where the "back-end" processing has access to the keys but the "front-end" name servers do not, for security reasons. But there are also cases where the front end has access to private keys, typically the SLD ZSK, shown here.

Second, in some embodiments, the zone files that are published at the name servers will include digital signatures, generated with the corresponding private keys. Crypto-graphic modules may be employed to perform signature operations in certain embodiments. Or, if the front end has the private key, the digital signature can be generated there. Moreover, in some embodiments, the responses returned by the name servers to the resolver will include the appropriate digital signatures.

Note that even referrals may include digital signatures—not on the referral itself, but rather a "chain link" to authenticate the public key to be used at the next level. The resolver checks the digital signatures it receives, and if they are valid, returns the "Digital Signature Validated" indicator to the client that requests it.

In some embodiments, the trust chain of the DNSSEC ecosystem may work as described herein. For example, the public root KSK may be the trust anchor 2702. The public root KSK may be widely distributed in resolvers so that they can independently authenticate digital signatures on records in the root zone, and thus authenticate everything else in the chain.

A root zone's chain links 2704 may include three parts. The public root KSK is published as a DNS record. The public root KSK must match the trust anchor 2702. The public root ZSK is also published as a DNS record. It is signed by the private root KSK. Finally, the hash of the public TLD KSK is published as a DNS record. The hash of the public TLD KSK is signed by the private root ZSK. In an embodiment, the root zone file has two levels of public keys. The reason for having two levels is that one level can be changed locally, without the other level being changed. The same pattern may be followed at the other levels. DNSSEC may also be practiced with one level of keys in a zone file.

A TLD zone's chain links 2706 again may include three parts. The public TLD KSK is published as a DNS record. Its hash must match the hash published in the root zone. The public TLD ZSK is also published as a DNS record. The public TLD ZSK may be signed by the private TLD KSK. Finally, the hash of the public SLD KSK is published as a DNS record. The hash of the public SLD KSK may be signed by the private TLD ZSK.

A SLD zone's chain links 2708 may also include three parts. The public SLD KSK is published as a DNS record. Its hash, as expected, must match the hash published in the TLD zone. The public SLD ZSK is published as a DNS record. The public SLD ZSK may be signed by the private SLD KSK. Finally, a DNS Record Set (one or more DNS records of the same type, associated with a given name, i.e., an RRset) may be signed by the private SLD ZSK.

A resolver (or other entity) can verify the signature on a DNS Record Set given the chain of public keys leading up to the trust anchor 2702. The public SLD ZSK is also published as a DNS record, as part of the zone file at the SLD level. This record is signed by the private SLD KSK. The public SLD KSK is also published as a DNS record in the zone file. Note that this is a simplified view, and there are other details in practice. For instance, in some embodiments, the various public KSKs are also signed by their own private KSK, but are omitted these signatures for brevity.

Publishing a hash of a child zone's KSK in the parent zone saves space compared to publishing the entire public key there. This record is signed by the parent zone's ZSK, thus linking parent to child. The chain can be applied to additional records at the lowest level or at any level.

It is appreciated that FIGS. 26 and 27 describe various features of the DNS ecosystem and that the various methods described herein may be implemented within the validation and security structures described with reference to FIGS. 26 and 27.

Example System for Batch Signing Using a Fixed Merkle Tree

Figure 28:
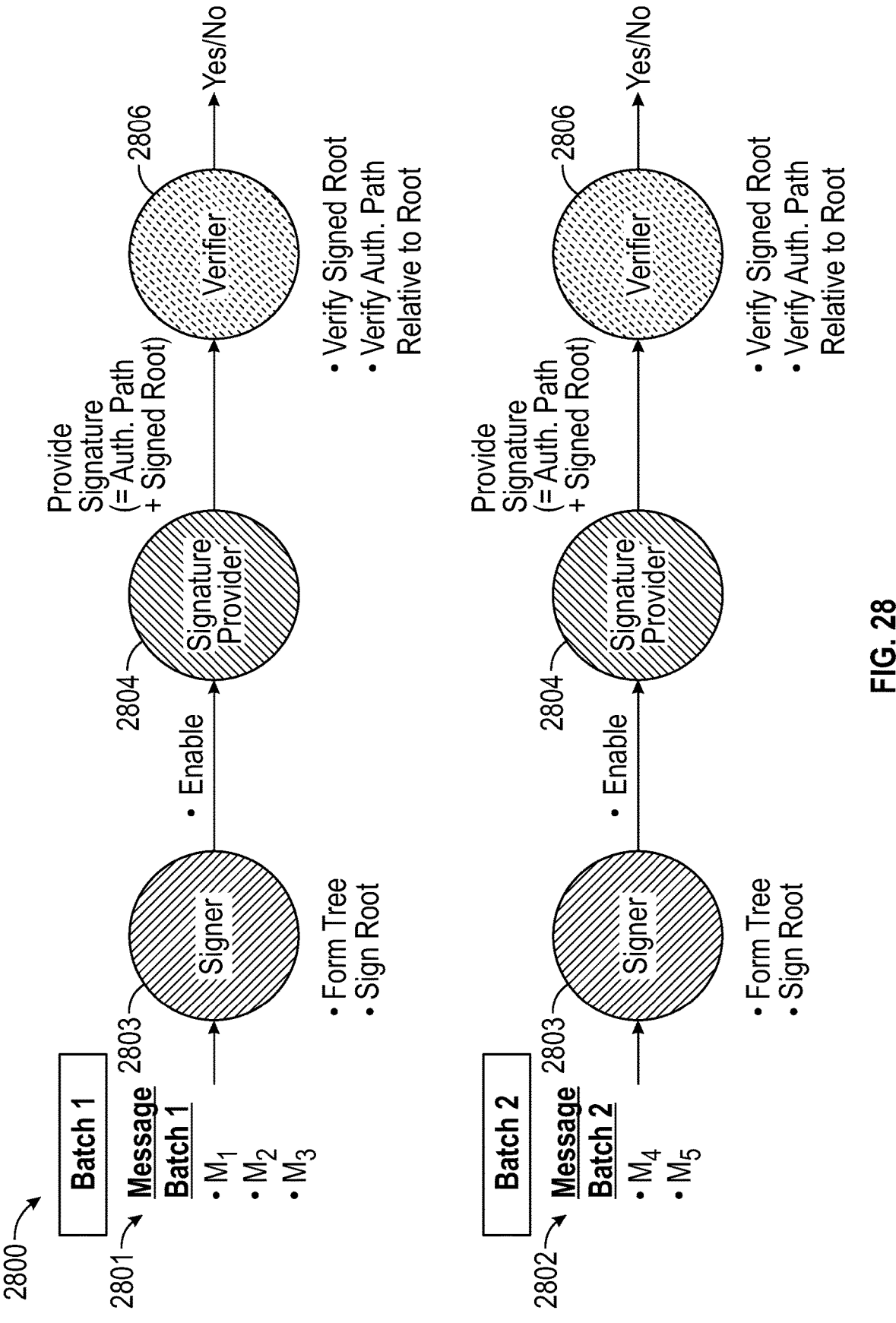
FIG. 28 depicts a block diagram of a system with conventional aspects for batch signing using a fixed Merkle tree.

FIG. 28 depicts a block diagram of a system 2800 with conventional aspects for batch signing using a fixed Merkle tree. As depicted, the system 2800 is a basic batch signing system. In the system 2800, a signer 2803 signs one or more independent message batches (e.g., a first message batch 2801, a second message batch 2802) using a fixed Merkle tree for each message batch. In this example, a first message batch 2801 includes messages $M_1$, $M_2$, and $M_3$, and the second message batch 2802 includes messages $M_4$ and $M_5$. The first message batch 2801 and the second message batch 2802 may be signed at consecutive times. Alternatively, the first message batch 2801 and the second message batch 2802 may be signed at non-consecutive times. According to some aspects, a batch may have zero or more messages.

For the first message batch 2801, the signer 2803 signs the messages $M_1$, $M_2$, and $M_3$ in a two-step process according to one or more embodiments described herein. First, the signer 2803 forms a Merkle tree from the messages. Second, the signer 2803 signs the root of the Merkle tree with an underlying signature scheme.

The signer 2803 then enables a signature provider 2804 to provide signatures on one or more messages of interest to a verifier 2806. According to one or more embodiments described herein, each signature includes a Merkle tree authentication path for the one or more messages of interest and the signed root. The signer 2803 may serve as the signature provider 2804, or the signature provider 2804 may be served by a party separate from the signer 2803. The signer 2803 may enable the signature provider 2804 to perform the operations described by providing the signature provider 2804 one or more of: the messages, their hash values, nodes of the tree; authentication paths, and signed roots.

As depicted, the verifier 2806 may use a two-step process for performing the verification. First, the verifier 2806 verifies the signed root, and second the verifier 2806 verifies the authentication path relative to the signed root.

For the second message batch 2802, the signer 2803 signs the messages $M_4$ and $M_5$ in a comparable process to the messages of the first message batch 2801 as described herein, and the signer 2803, the signature provider 2804, and the verifier 2806 perform similar functions for the messages of the second message batch 2802. According to some implementations, the knowledge of the verifier 2806 of the root for the first message batch 2801 is not used by the verifier 2806 for verifying the second message batch 2802. The verifier 2806 instead obtains a new root for each message batch to verify signatures on messages in that message batch.

Example System for Authentication with an Evolving Merkle Tree

Figure 29:
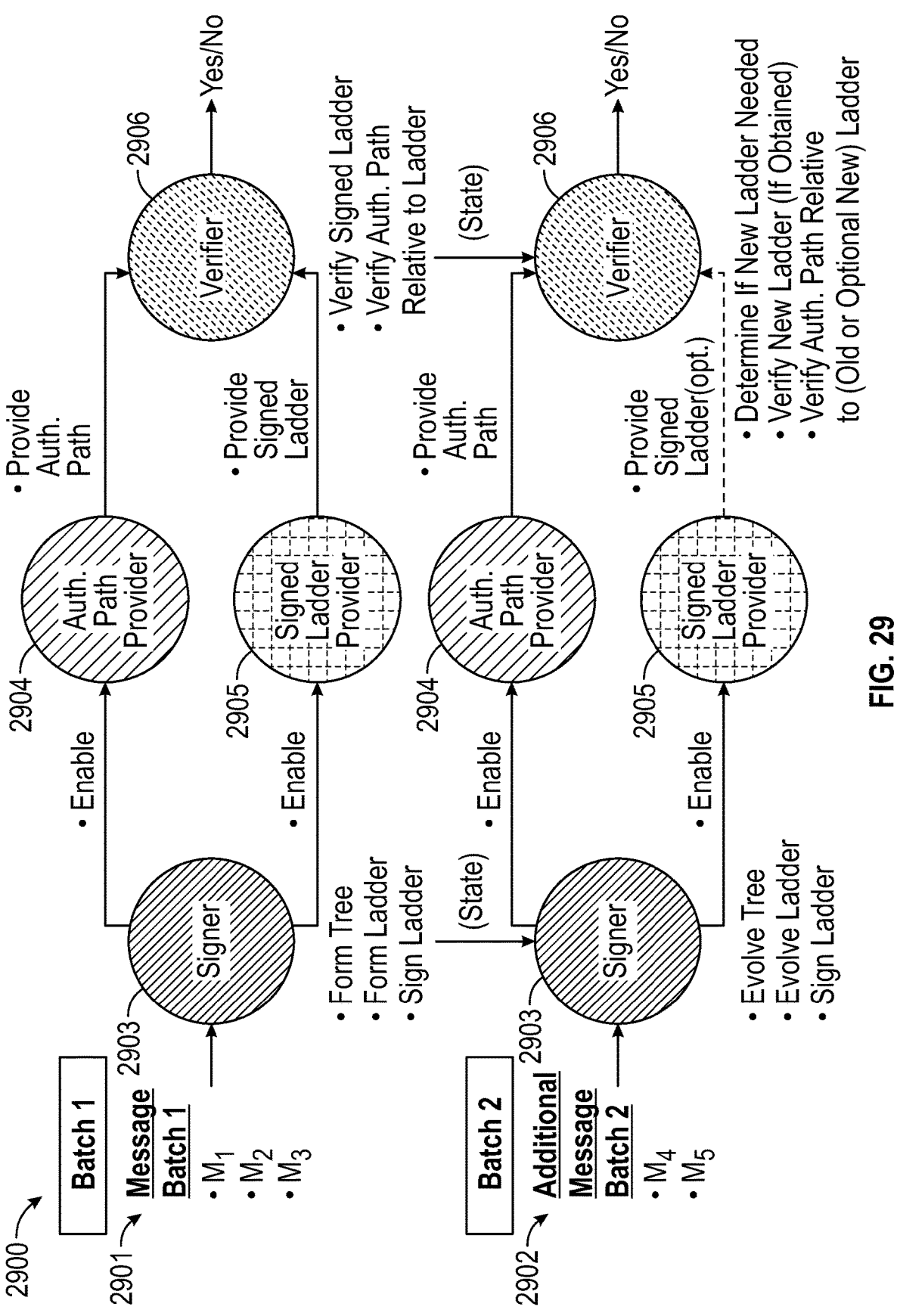
FIG. 29 depicts a block diagram of a system for authentication with an evolving Merkle tree according to one or more embodiments described herein.

FIG. 29 shows a block diagram of a system 2900 for authentication with an evolving Merkle tree according to one or more embodiments described herein. In the example of FIG. 29, two batch signing and verification processes are performed for a first message batch 2901 and a second message batch 2902. In this example, the first message batch 2901 includes messages $M_1$, $M_2$, and $M_3$, and the second message batch 2902 includes messages $M_4$ and $M_5$. According to one or more embodiments described herein, the first message batch 2901 and the second message batch 2902 may be signed at consecutive times.

The signer 2903 signs one or more sequential batches of messages (e.g., the messages $M_1$, $M_2$, and $M_3$ of the first message batch 2901) using an evolving Merkle tree that accumulates messages from each batch. For the messages of the first message batch 2901, the signer 2903 signs the messages $M_1$, $M_2$, and $M_3$ in a three-step process according to an embodiment. First, the signer 2903 forms a Merkle tree from the messages. It should be appreciated that the Merkle tree can include multiple trees in some examples and may be referred to as a node set. Second, the signer 2903 forms a ladder having one or more tree nodes selected according to a selected rung strategy (e.g., such as one of the rung strategies described herein). Third, the signer 2903 signs the ladder with an underlying signature scheme. The signer 2903 then enables an authentication path provider 2904 to provide an authentication path for one or more messages of interest to a verifier 2906. The signer 2903 also enables a signed ladder provider 2905 to provide a signed ladder for the first batch 2901 to the verifier 2906. According to an embodiment, the three steps may be performed by a single party operating as or on behalf of the signer 2903. According to another embodiment, the three steps may be performed by two or more different parties each operating as or on behalf of the signer 2903. One or more of the parties may operate a hardware security module. According to an embodiment, the signer 2903 may serve as one or both of the authentication path provider and/or the signed ladder provider, and each provider may also be served by a party separate from the signer (e.g., the same separate party for both). The signer 2903 may enable the providers 2904, 2905 to perform the operations described by providing the providers with one or more of the messages of the first message batch 2901, their hash values, nodes of the tree, authentication paths, and/or signed ladders. According to an embodiment, the authentication path provider 2904 and the signed ladder provider 2905 can be combined to form a combined provider. In such cases, the combined provider may also provide a combination of a signed ladder and an authentication path (e.g., an "uncondensed signature") in a combined operation. The verifier 2906 may then obtain an authentication path for a message of interest, and upon determining that a new signed ladder is desired, obtain a combination of a new signed ladder and the authentication path.

The verifier 2906 uses a two-step process for the first message batch 2901 according to an embodiment, upon obtaining an authentication path relative to a signed ladder from the authentication path provider 2904 and a signed ladder from the signed ladder provider 2905. First, the verifier 2906 verifies the signed ladder from the signed ladder provider 2905. Second, the verifier verifies the authentication path from the authentication path provider 2904 relative to the signed ladder. According to an embodiment, if the rung indexes are included in the ladder along with the rung hash values, and the authentication path indicates the rung that the path is computed relative thereto, then the verifier 2906 can operate without knowing which rung strategy the signer 2903 used to verify the authentication path relative to the ladder. In this way, the verifier 2906 is configured to verify authentication paths without adapting logic of the verifier 2906 to accommodate the rung strategy used by the signer 2903.

For the second message batch 2902, the signer 2903 signs the messages $M_4$ and $M_5$ of the second message batch 2902. The signer 2903 uses an incremental process with a three-step process according to an embodiment. First, the signer 2903 evolves a previous Merkle tree to include the additional messages (e.g., the messages $M_4$ and $M_5$). Second, the signer 2903 forms a new ladder using the evolved Merkle tree. As above, it is appreciated that the evolved Merkle tree can include multiple trees in some examples and may be referred to as a node set. Third, the signer 2903 signs the new ladder.

In the system 2900, the knowledge of the verifier 2906 of the ladder for the first message batch 2901 may help the 2906 verifier verify signatures on messages in the second batch. In particular, the verifier 2906 may or may not obtain a new ladder for the second message batch 2902 (or other future batches). For example, because the batches accumulate messages, the verifier 2906 can request authentication paths for messages from prior batches (e.g., the first message batch 2901) during the current batch (e.g., the second message batch 2902). If the verifier 2906 already has a signed ladder for a prior batch (e.g., the first message batch 2901), the verifier 2906 can potentially verify the authentication path provided during the current batch (e.g., the second message batch 2902) for such a message, relative to the ladder for the prior batch. A verifier may also use previously verified Merkle tree nodes in addition to and/or instead of ladders to verify the new authentication path according to embodiments.

The verifier 2906 uses a three-step process in the second and future batches according to one or more embodiments described herein, upon obtaining an authentication path relative to a signed ladder from the authentication path provider 2904: First, the verifier 2906 determines (e.g., based on information associated with the authentication path) whether a new signed ladder is desired. The determination may also consider Merkle tree nodes held by the verifier, in addition to previously verified ladders. The verifier 2906 may also request additional Merkle tree nodes from the signer or other parties, in addition to signed ladders. According to one or more embodiments described herein, if the rung indexes are included in the ladder along with the rung hash values, and the authentication path indicates the rung that the path is computed relative to, then the verifier 2906 may operate without knowing the choice, by the signer 2903, of rung strategy to determine whether a new signed ladder is desired. If a new signed ladder is desired, the verifier 2906 obtains the new signed latter. Second, the verifies the new signed ladder (if obtained). Third, the verifier 2906 verifies the authentication path relative to the signed ladder (e.g., the old signed ladder or the new signed ladder as appropriate).

Example Apparatus

Figure 30:
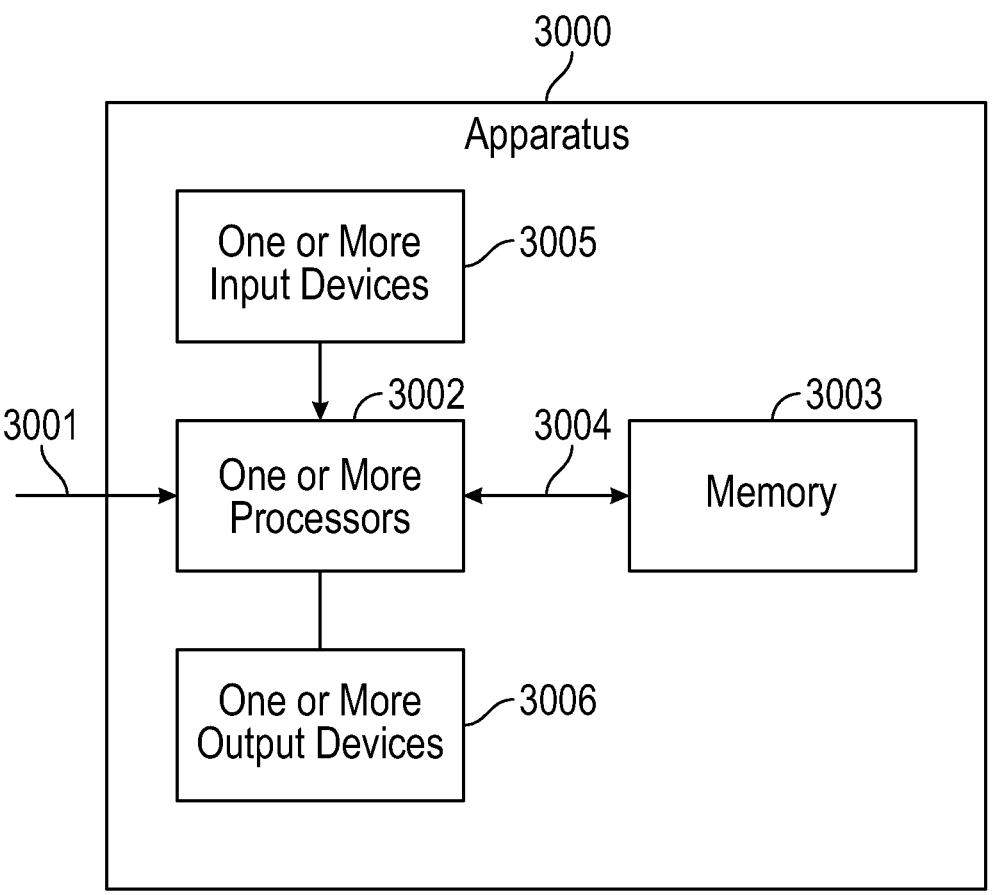
FIG. 30 depicts an exemplary apparatus to implement various embodiments and aspects thereof disclosed herein.

FIG. 30 depicts an exemplary apparatus 3000 to implement various embodiments and aspects thereof disclosed herein. In this example, the apparatus 3000 includes one or more processors 3002, one or more output devices 3006, a memory 3003, and one or more user input devices 3005. The apparatus 3000 may be used to implement any of the methods described throughout this disclosure and/or the various components of the systems described herein, such as the components of the DNS system.

The one or more processors 3002 may include a general-purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

The memory 3003 is accessible by the one or more processors 3002 via the link 3004 so that the one or more processors 3002 can read information from and write information to the memory 3003. In one example, the one or more user input collected by one or more user input devices 3005 is processed by the one or more processors 3002 and stored in the memory 3003. Memory may be integral with or separate from the processors. Examples of the memory 3003 include RAM, flash, ROM, EPROM, EEPROM, registers, disk storage, or any other form of storage medium. The memory 3003 may store instructions that when executed by the one or more processors 3002 implement one or more embodiments of the invention. The memory 3003 may store instructions that when executed by the one or more processors 3002 cause the one or more processors 3002 to implement one or more embodiments of the invention. Memory 3003 may be a non-transitory computer-readable medium that stores instructions, which when executed by a computer, cause the computer to perform one or more of the exemplary methods discussed herein.

According to certain embodiments, a computer-implemented method may include one or more of the methods described herein. Further, an apparatus may include one or more processors and one or more non-transitory computer-readable media storing instructions that, when executed by the one or more processors, cause the apparatus to perform one or more of the methods described herein. Further, a system may include one or more processors and one or more non-transitory computer-readable media storing instructions that, when executed by the one or more processors, cause the one or more processors to perform one or more of the methods described herein. Further, one or more non-transitory computer-readable media may store instructions that, when executed by one or more processors, cause the performance of one or more of the methods described herein.

ILLUSTRATIVE EMBODIMENTS

One or more embodiments provides a computer-implemented method for generating and updating Merkle trees as data series authenticators for an evolving data series, the method comprising: creating a tree; updating the tree when data elements are added, removed, or updated in a data series authenticated by a Merkle tree; merging non-overlapping data series and creating or updating a Merkle tree authenticator to authenticate the merged data series; and extracting subtrees of a Merkle tree authenticator as Merkle tree authenticators.

One or more embodiments provides a computer-implemented method for removing nodes from a Merkle tree authenticator that are no longer used for authenticating a data series, the method allowing a Merkle tree authenticator to be garbage collected after the Merkle tree authenticator is updated to authenticate an updated data series.

One or more embodiments provides a computer-implemented method for allowing applications to determine Merkle tree authenticator structure and node identifiers deterministically when a Merkle tree is not fully balanced, wherein the Merkle tree authenticates a data series that has a number of elements that is not a power of 2.

One or more embodiments provides a computer-implemented method for selecting a subseries of a data series such that a Merkle tree authenticator for the subseries will be a subtree of a Merkle tree authenticator for a containing subseries, wherein a root node of the subtree is used as a reference value, and witnesses derived from the subtree are used to authenticate data elements from the subseries.

One or more embodiments provides a computer-implemented method using tree identifiers and node identifiers as inputs to hashes that comprise nodes in Merkle trees, wherein trees with the same tree identifier are merged.

One or more embodiments provides a computer-implemented method for splitting Merkle trees into separate trees that are updated with a deterministic update algorithm, wherein split operations of the update algorithm preserve node identifiers, the node identifiers being used as inputs to calculate hashes, the hashes comprising nodes, wherein, in the Merkle trees resulting from a split, recalculation of the nodes are not performed or minimal recalculation of nodes is performed.

One or more embodiments provides a computer-implemented method for creating witnesses for data series elements using a deterministic algorithm.

One or more embodiments provides a computer-implemented method for ordering and updating data series elements to optimize reference value lifespans, the method comprising: determining ordering based on: age of a reference, number of desired reference values, likelihood of a reference value being invalid, or age of a data element; relationship of a data element to other data elements; machine learning to identify elements likely to change and elements unlikely to change; natural re-ordering based on placing new/updated elements in groupings within an encompassing data series; re-ordering based on removing modified or deleted elements from a data series; using indirection to re-order data elements so that physical ordering is distinct from logical ordering; minimization of the number of elements moved during re-ordering; or maximizing the number of consecutive elements that are re-ordered as a group.

One or more embodiments provides a computer-implemented method for publishing reference values for a series of Merkle tree authenticators for an evolving data series so as to perform a desired trade-off between likelihood that published witnesses are verifiable against a published reference value, and a number of published reference values and/or witnesses, wherein the method accounts for: limited validity periods of reference values and witnesses, constraints in transport mechanisms that limit a number of reference values that are retrieved by a verifier, or caching algorithms used for witnesses and reference values.

One or more embodiments provides a computer-implemented method for addressing changes to a data series as set operations on the data series, wherein the set operations are reflected in updates to Merkle trees that maximize a life of reference values.

One or more embodiments provides a computer-implemented method for constructing a Merkle Tree Public Key (MTPK) tree and node identifier schemes for Domain Name System Security Extensions (DNSSEC) defined based on Merkle tree authenticator construction and node identifier schemes.

One or more embodiments provides a computer-implemented method for ordering resource record sets (RRsets) of a zone as at least one data series which is then authenticated by at least one Merkle Tree Public Key (MTPK).

One or more embodiments provides a computer-implemented method for ordering for handling delete, update, and append operations for a data series comprised of resource record sets (RRsets) authenticated by a Merkle Tree Public Key (MTPK).

One or more embodiments provides a computer-implemented method for dynamic creation of Merkle Tree Public Keys (MTPK) and signatures based on data series ranges, wherein the dynamic methods being based on methods applicable to Merkle tree authenticators, reference values and witnesses that enable these capabilities, wherein the dynamic creation is based on: a frequency of changes to resource record sets (RRsets) in a zone; a frequency of publishing MTPK; a size and composition of a zone; computational capabilities; or operational complexity.

One or more embodiments provides a computer-implemented method for dynamic batch creation of Merkle Tree Public Key (MTPK) resource record signatures (RRSIGs).

One or more embodiments provides a computer-implemented method for selecting ranges of resource record sets (RRsets) in a data series to be authenticated by a Merkle Tree Public Key (MTPK).

One or more embodiments provides a computer-implemented method for evolving Merkle Tree Public Key (MTPK) Merkle trees as resource record sets (RRsets) are changed, deleted, or added to a zone for purposes, the method including: maximizing a life span of MTPKs; optimizing a number of MTPKs in a DNSKEY RRset; minimizing signature sizes taking into account Merkle tree size and subtree sizes; and selecting data series elements for subtrees based on expected frequency of responses containing signatures derived from the subtrees.

One or more embodiments provides a computer-implemented method for publishing Merkle Tree Public Keys (MTPKs) into a DNSKEY resource record set (RRset) so as to perform a desired trade-off between likelihood that cached resource record signatures (RRSIGs) are verifiable against a current MTPK or cached MTPK in a DNSKEY RRset, and a number of MTPKs in the DNSKEY RRset, wherein the method accounts for: limited validity periods for signatures, user datagram protocol (UDP) maximum transmission units (MTUs) that limit an effective size of the DNSKEY RRset, or resolver caching algorithms.

One or more embodiments provides a computer-implemented method for minimizing authentication path sizes.

One or more embodiments provides a computer-implemented method to address a Domain Name System Security Extensions (DNSSEC) specific issue that occurs due to a use of key tags specified by DNSSEC.

One or more embodiments provides a computer-implemented method for implementing Merkle trees to minimize a size of a DNSKEY resource record set (RRset).

One or more embodiments provides a method of electronically signing an evolving plurality of internet data records, the method comprising: generating, using at least one electronic processor, a first plurality of leaf nodes from the evolving plurality of internet data records; constructing, using the at least one electronic processor, a first recursive hash tree from the first plurality of leaf nodes, the first recursive hash tree comprising a first plurality of nodes, the first plurality of nodes comprising the first plurality of leaf nodes and a first root node, wherein a first subset of nodes of the first plurality of nodes each comprise a leaf node and a second subset of nodes of the first plurality of nodes each comprise a hash of data comprising one or more child nodes; deriving, using the at least one electronic processor, first information sufficient to validate the first root node based on the first root node or a hash of the first root node; publishing, as a first synthesized public key, the first information sufficient to validate the first root node; transmitting, through the internet, first information sufficient to maintain an evolving state, wherein the evolving state is sufficient to provide, through the internet, and as a first signature on a first at least one internet data record of the evolving plurality of internet data records, first validation data from the first recursive hash tree, wherein the first at least one internet data record of the evolving plurality of internet data records is validatable using at least the first validation data and the first synthesized public key by reconstructing a portion of the first recursive hash tree up to and including the first root node using the first validation data to obtain a first accumulated hash value and determining that the first signature on the first at least one internet data record of the first plurality of internet data records is valid by confirming that the first accumulated hash value is consistent with the first synthesized public key; updating, using the at least one electronic processor, the evolving plurality of internet data records; generating, using at least one electronic processor, a second plurality of leaf nodes from the updated evolving plurality of internet data records; constructing, using the at least one electronic processor, a second recursive hash tree from the second set of leaf nodes, the second recursive hash tree comprising a second plurality of nodes, the second plurality of nodes comprising the second plurality of leaf nodes and a second root node, wherein a first subset of nodes of the third plurality of nodes each comprise a leaf node and a fourth subset of nodes of the second plurality of nodes each comprise a hash of data comprising one or more child nodes; deriving, using the at least one electronic processor, second information sufficient to validate the second root node based on the second root node or a hash of the second root node; publishing, as a second synthesized public key, the second information sufficient to validate the second root node; transmitting, through the internet, second information sufficient to update the evolving state, wherein the updated evolving state is sufficient to provide, through the internet, and as a second signature on a second at least one internet data record of the evolving set of internet data records, second validation data from the second recursive hash tree, wherein the second at least one internet data record of the updated evolving set of internet data records is validatable using at least the second validation data and the second synthesized public key by reconstructing a portion of the second recursive hash tree up to and including the second root node using the second validation data to obtain a second accumulated hash value and determining that the second signature on the second at least one internet data record of the second plurality of internet data records is valid by confirming that the second accumulated hash value is consistent with the second synthesized public key.

Appendices A and B of U.S. Provisional Patent Application No. 63/356,973 filed Jun. 29, 2022, which is incorporated herein by reference, include additional disclosures of systems, methods, and apparatuses for creating, updating, and applying Merkle trees as a security authorization application.

Use of language, such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Embodiments illustrated under any heading or in any portion of the disclosure may be combined with embodiments illustrated under the same or any other heading or other portion of the disclosure unless otherwise indicated herein or otherwise clearly contradicted by context.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A computer-implemented method for authenticating messages relative to a hash-based data authentication structure, the computer-implemented method comprising:

producing a first signed data structure, wherein the first signed data structure comprises a first subset of a plurality of node hash values from the hash-based data authentication structure, wherein the first subset is selected according to a selected strategy and configured to authenticate messages relative to the hash-based data authentication structure;

producing a second signed data structure, wherein the second signed data structure comprises a second subset of the plurality of node hash values from the hash-based data authentication structure, wherein the second subset comprises the first subset with one or more of at least one added node hash value or at least one removed node hash value;

enabling a signed data structure provider to provide to a verifier the first signed data structure and the second signed data structure; and enabling an authentication path provider to provide to the verifier an authentication path formed relative to the first signed data structure or the second signed data structure, wherein the verifier determines whether to use the first signed data structure based on the authentication path, and performs a verification procedure, wherein the verifier determines whether to use the first signed data structure by:

obtaining the authentication path formed relative to the first signed data structure or the second signed data structure; and determining, based on information associated with the authentication path, whether the authentication path can be verified relative to the first signed data structure.

2. The computer-implemented method of claim 1, wherein the verification procedure further comprises the verifier:

obtaining a third signed data structure from the signed data structure provider responsive to determining that the authentication path cannot be verified relative to the first signed data structure; and verifying the authentication path relative to the first signed data structure or the third signed data structure.

3. The computer-implemented method of claim 1, wherein the verification procedure further comprises the verifier:

verifying the authentication path relative to the first signed data structure responsive to determining that the authentication path can be verified relative to the first signed data structure.

4. The computer-implemented method of claim 1, wherein the selected strategy comprises at least one or more of a full strategy, a single strategy, a basic binary strategy, an extended binary strategy, a spaced strategy, a variable spaced strategy, a bounded strategy, a spaced and bounded strategy, a spaced extended binary strategy, and a bounded extended binary strategy.

5. The computer-implemented method of claim 1, wherein producing the first signed data structure comprises grouping elements that are to be added to a data series into data series batches that have identifiers that start at one greater than a highest element identifier in a current data series authenticated by the verifier.

6. The computer-implemented method of claim 1, further comprising creating a long-lived data structure for a data series based on a subseries of the data series that is anticipated not to change during a period of time.

7. The computer-implemented method of claim 1, further comprising constructing multiple data structures that can be used as authenticators for subsets of an expanding data series.

8. The computer-implemented method of claim 1, further comprising producing and using multiple reference values from multiple data structures, wherein the multiple data structures comprise an unbalanced data structure having subtrees from which the multiple reference values are obtained.

9. The computer-implemented method of claim 1, further comprising performing a batch updating process using a merge method, wherein an initial authenticator is created with a number of leaves that is a largest power of two that is less than or equal to a number of resource record sets in a data series.

10. The computer-implemented method of claim 1, wherein the selected strategy authenticates long-lived data elements that are anticipated not to change during a period of time, and wherein another strategy authenticates changing data elements.

11. The computer-implemented method of claim 1, further comprising publishing the plurality of node hash values in the first signed data structure as synthesized public keys.

12. The computer-implemented method of claim 11, wherein at least one of the synthesized public keys is used as at least one of: a domain name system security extension (DNSSEC) key signing key or a DNSSEC zone signing key.

13. The computer-implemented method of claim 1, further comprising publishing, in an internet public key infrastructure (PKI) as a synthesized public key, information sufficient to validate the plurality of node hash values in at least one of the first signed data structure or the second signed data structures.

14. A computer-implemented method for authenticating messages relative to a hash-based data authentication structure, the computer-implemented method comprising:

obtaining, from a signed data structure provider, a first signed data structure, wherein the first signed data structure comprises a first subset of a plurality of node hash values from the hash-based data authentication structure, wherein the first subset is selected according to a selected strategy and configured to authenticate messages relative to the hash-based data authentication structure;

obtaining, from an authentication path provider, an authentication path formed relative to a second signed data structure, wherein the second signed data structure comprises a second subset of the plurality of node hash values from the hash-based data authentication structure, wherein the second subset comprises the first subset with one or more of at least one added node hash value or at least one removed node hash value;

determining, based on information associated with the authentication path, whether the authentication path can be verified relative to the first signed data structure;

responsive to determining that the authentication path cannot be verified relative to the first signed data structure, obtaining, from the signed data structure provider, a third signed data structure, wherein the third signed data structure is a modified version of the first signed data structure; and verifying the authentication path relative to the first signed data structure or the third signed data structure, and wherein verifying the authentication path comprises:

obtaining the authentication path formed relative to the first signed data structure or the second signed data structure; and determining, based on information associated with the authentication path, whether the authentication path can be verified relative to the first signed data structure.

15. The computer-implemented method of claim 14, wherein the selected strategy comprises at least one or more of a full strategy, a single strategy, a basic binary strategy, an extended binary strategy, a spaced strategy, a variable spaced strategy, a bounded strategy, a spaced and bounded strategy, a spaced extended binary strategy, and a bounded extended binary strategy.

16. The computer-implemented method of claim 14, further comprising publishing the first subset as synthesized public keys.

17. The computer-implemented method of claim 1, wherein the first subset is selected from a plurality of levels of the hash-based data authentication structure.

18. The computer-implemented method of claim 1, wherein:

the first subset is associated with a first range of node hash value identifiers, the second subset is associated with a second range of node hash value identifiers, and determining whether to use the first signed data structure comprises:

determining a third range represented by the authentication path, and determining whether the third range corresponds to the first range.

* * * * *